United States Patent
Kwak et al.

(10) Patent No.: US 11,995,308 B2
(45) Date of Patent: May 28, 2024

(54) METHOD AND DEVICE FOR PROVIDING HANDWRITING INPUT IN ELECTRONIC DEVICE

(71) Applicant: Samsung Electronics Co., Ltd., Suwon-si (KR)

(72) Inventors: Taewon Kwak, Suwon-si (KR); Jinsu Shin, Suwon-si (KR); Dohyeon Kim, Suwon-si (KR); Donghyuk Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/105,931

(22) Filed: Feb. 6, 2023

(65) Prior Publication Data
US 2023/0185448 A1    Jun. 15, 2023

Related U.S. Application Data

(63) Continuation of application No. PCT/KR2021/008737, filed on Jul. 8, 2021.

(30) Foreign Application Priority Data

Aug. 4, 2020    (KR) .......................... 10-2020-0097114

(51) Int. Cl.
*G06F 3/04883*    (2022.01)
(52) U.S. Cl.
CPC ............................... *G06F 3/04883* (2013.01)

(58) Field of Classification Search
CPC .. G06F 3/04883; G06F 3/0481; G06F 3/0484; G06F 18/00; G06V 10/24;
(Continued)

(56) References Cited

U.S. PATENT DOCUMENTS

| | | |
|---|---|---|
| 9,390,715 B2 | 7/2016 | Jeon |
| 10,007,420 B2 | 6/2018 | Jung et al. |

(Continued)

FOREIGN PATENT DOCUMENTS

| | | |
|---|---|---|
| JP | 2007316754 A | 12/2007 |
| JP | 2013012134 A | 1/2013 |

(Continued)

OTHER PUBLICATIONS

International Search Report and Written Opinion for International Application No. PCT/KR2021/008737; International Filing Date Jul. 8, 2021; dated Oct. 13, 2021; 94 Pages.

*Primary Examiner* — Md Saiful A Siddiqui
(74) *Attorney, Agent, or Firm* — CANTOR COLBURN LLP

(57) ABSTRACT

One or more embodiments of the present disclosure provide a method and a device for supporting handwriting input in an electronic device. An electronic device includes a display module and a processor, wherein the processor can: display an execution screen of an application supporting handwriting input; sense the handwriting input through the execution screen; set at least one region of interest on the basis of at least one object corresponding to the handwriting; identify, in response to an action of a user, a target object on the basis of the at least one region of interest; and perform handwriting alignment on the basis of the target object.

16 Claims, 38 Drawing Sheets

(58) Field of Classification Search
CPC ...... G06V 10/25; G06V 30/226; G06V 30/32; G06T 7/30
See application file for complete search history.

(56) References Cited

U.S. PATENT DOCUMENTS

| | | |
|---|---|---|
| 10,410,316 B2 | 9/2019 | Baudry et al. |
| 10,489,051 B2 | 11/2019 | Lee et al. |
| 2012/0318077 A1 | 12/2012 | Paca |
| 2016/0147434 A1* | 5/2016 | Lee ................... G06F 3/0482 715/838 |
| 2016/0147723 A1* | 5/2016 | Lee ................... G06F 40/171 715/268 |
| 2019/0340227 A1 | 11/2019 | Sun et al. |
| 2021/0350122 A1* | 11/2021 | Dixon ................ G06F 3/04883 |

FOREIGN PATENT DOCUMENTS

| | | |
|---|---|---|
| JP | 2014153447 A | 8/2014 |
| JP | 2018137001 A | 8/2018 |
| JP | 2019053235 A | 4/2019 |
| KR | 20110074145 A | 6/2011 |
| KR | 20140089915 A | 7/2014 |
| KR | 101467295 B1 | 12/2014 |
| KR | 20160062566 A | 6/2016 |
| KR | 20160064925 A | 6/2016 |

* cited by examiner

METHOD AND DEVICE FOR PROVIDING HANDWRITING INPUT IN ELECTRONIC DEVICE

CROSS-REFERENCE TO RELATED APPLICATION(S)

This application is a continuation application, claiming priority under § 365(c), of International Application No. PCT/KR2021/008737, filed on Jul. 8, 2021, which is based on and claims the benefit of Korean patent application number 10-2020-0097114, filed on Aug. 4, 2020 in the Korean Intellectual Property Office, the disclosures of which are incorporated by reference herein in their entireties.

TECHNICAL FIELD

One or more embodiments in the disclosure relate to a method and a device for supporting a handwriting input in an electronic device.

BACKGROUND ART

With the development of digital technology, various types of electronic devices, such as, a mobile communication terminal, a personal digital assistant (PDA), an electronic organizer, a smart phone, a tablet personal computer (PC), and a wearable device, have been widely used. In order to support and increase functions of the electronic device, hardware components and/or software components of the electronic device have been continuously improved.

As an example, the electronic device provides a memo function that enables a user to take a necessary memo anytime and anywhere even without a note or a pen. For example, the user may directly write down on a display (e.g., touchscreen) of the electronic device by using the user's hand or an electronic pen. The electronic device may receive an input of a touch trajectory (or coordinate) to touch (or contact) the display as a handwriting. The user may conveniently take a memo with nostalgic feelings by inputting a handwriting by using the user's hand or the electronic pen like writing on a notebook by using a pen.

Recently, the electronic device not only supports a handwriting input but also provides an alignment function for the input handwriting for convenience. For example, the electronic device may provide an alignment of the handwriting to the user through an automatic adjustment of a slope, a location, a paragraph, and/or a line spacing of the input handwriting in accordance with a user's selection.

DISCLOSURE OF INVENTION

Technical Problem

However, in the related art, if there are a plurality of handwritings input by the user, a function in which a user can align only some handwritings (e.g., recently input handwritings) is not supported. For example, in the related art, only the overall alignment function is provided with respect to all the handwritings without distinction of the user's already input handwriting and newly input handwriting from each other.

Solution to Problem

In one or more embodiments, a method and a device are disclosed, which can align at least some handwritings in accordance with a user's intention among the entire input handwritings in distinction of the handwritings input to an electronic device in the unit (or entirety) of the user's action.

In one or more embodiments, a method and a device are disclosed, which can distinguish the handwritings input by a user to an electronic device in the unit (or entirety) of an action and support a handwriting alignment in accordance with a user's intention based on a target object of at least one handwriting related to a recent action.

In one or more embodiments, a method and a device are disclosed, which can configure a target area of interest based on a target object of handwriting and a surrounding object related to the object when an electronic device aligns the handwriting related to a recent action, and align both the target object and the surrounding object related thereto through the target area of interest.

In one or more embodiments, a method and a device are disclosed, which can identify a surrounding object based on a target object of handwriting related to a recent action, and correct (e.g., line correction and/or size correction) the target object to correspond to the surrounding object.

An electronic device according to an embodiment of the disclosure may include: a display module; and a processor operatively connected to the display module, wherein the processor is configured to: display an execution screen of an application supporting a handwriting input, detect the handwriting input from a user input based on the execution screen, determine at least one area of interest based on at least one object corresponding to the handwriting input, identify a target object based on the at least one area of interest in response to a user's action, and perform a handwriting alignment based on the target object.

An electronic device according to an embodiment of the disclosure may include: a display module; and a processor operatively connected to the display module, wherein the processor is configured to: configure a first area of interest based on a first object corresponding to a first handwriting input and map the first object onto a first action, align the first object mapped onto the first action based on a first alignment trigger for the first action, configure a second area of interest based on a second object corresponding to a second handwriting input and map the second object onto a second action, and align the second object mapped onto the second action based on a second alignment trigger for the second action in a state where the first object mapped onto the first action is maintained, wherein the first handwriting input and the second handwriting input are divided in the unit of an action in accordance with the first action and the second action, at least a part of the first object of the first action, crossing the second object of the second action, is related to the second object, and is aligned together with the second object.

A method for operating an electronic device according to an embodiment of the disclosure may include: displaying an execution screen of an application supporting a handwriting input; detecting the handwriting input from a user input based on the execution screen; determining at least one area of interest based on at least one object corresponding to the handwriting input; identifying a target object based on the at least one area of interest in response to a user's action; and performing a handwriting alignment based on the target object.

In order to solve the above tasks, one or more embodiments of the disclosure may include a computer-readable recording medium having a program recorded therein for the processor to execute the method.

An additional range of applicability of the disclosure will become clear from the following detailed explanation. However, since various modifications and corrections within the idea and scope of the disclosure can be clearly understood by those skilled in the art, it should be understood that the detailed explanation and specific embodiments, such as preferred embodiments of the disclosure, are given only as an example.

Advantageous Effects of Invention

According to an electronic device and an operation method thereof according to one or more embodiments, since the handwritings are aligned to distinguish the handwritings in the unit (e.g., the entirety or whole) of an action, the alignment is intensively performed with respect to the handwriting intended by the user, and thus the user's usability and convenience can be increased. According to one or more embodiments, the electronic device can divide the handwriting input by the user in the unit (e.g., the entirety or whole) of an action, and intensively align only the handwriting in accordance with the user's intention based on the target object of at least one handwriting related to the recent action.

According to one or more embodiments, the electronic device can improve an aesthetic effect through clear arrangement of the handwriting and the readability of the handwriting contents through harmony (or harmony arrangement) between the target object and the surrounding object related to the target object by aligning the target object of the handwriting related to the recent action after correcting the target object to correspond to the surrounding object related to the target object.

In addition, various effects that are directly or indirectly grasped through this document can be provided.

BRIEF DESCRIPTION OF DRAWINGS

In relation to the description of the drawings, the same or similar reference numerals may be used for the same or similar constituent elements.

MODE FOR THE INVENTION

Figure 1:
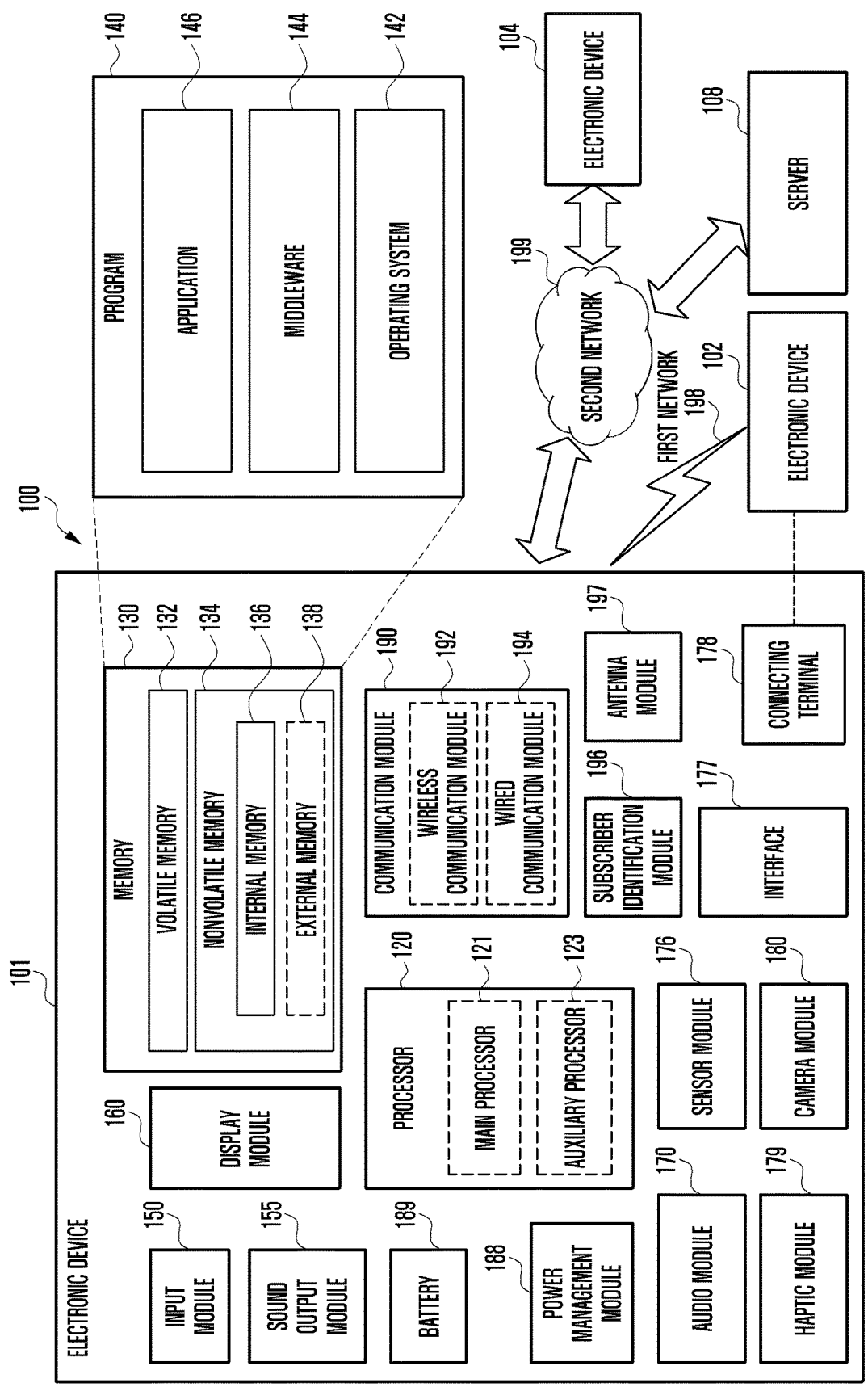
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
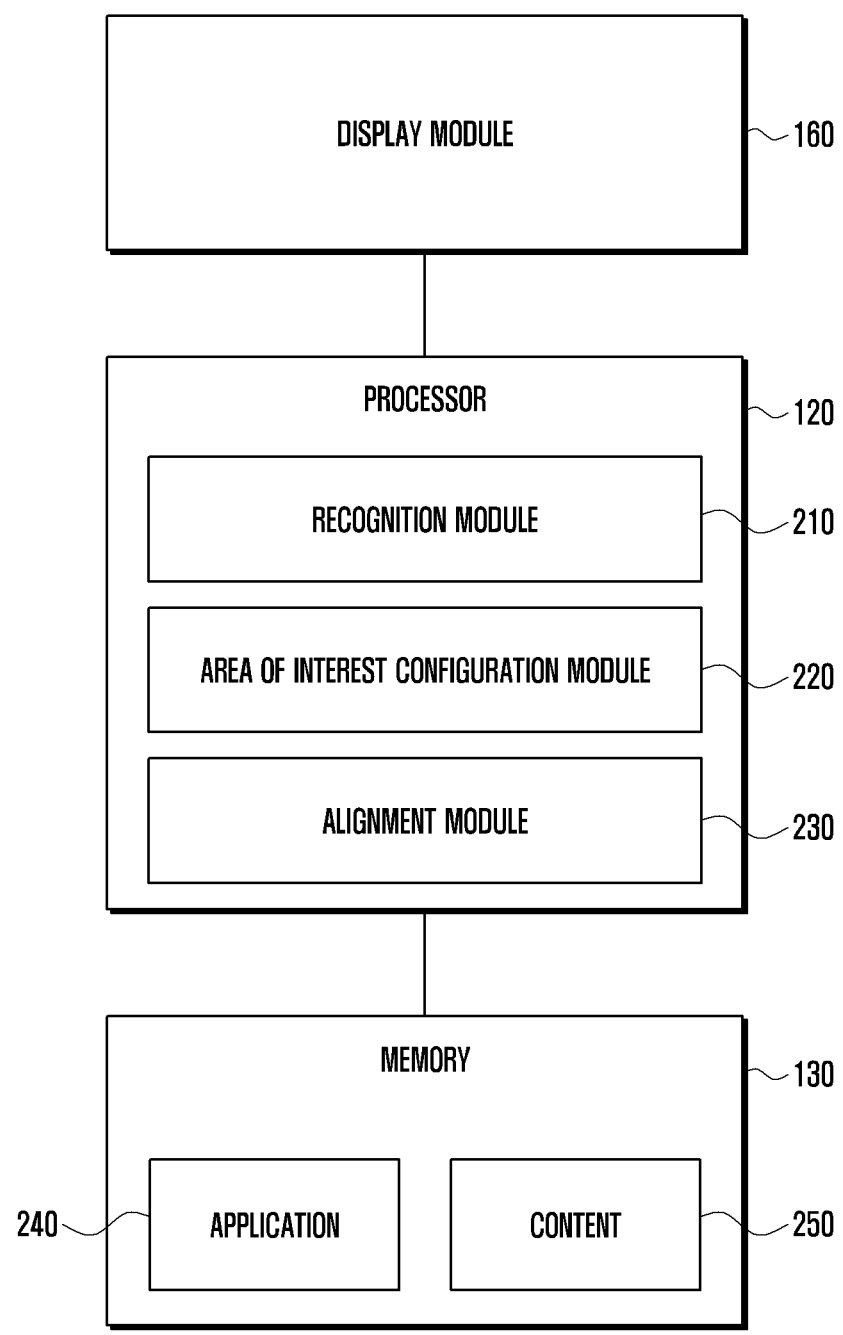
FIG. 2 is a diagram schematically illustrating the constitution of an electronic device according to various embodiments.

FIG. 2 is a diagram schematically illustrating the constitution of an electronic device according to one or more embodiments.

According to an embodiment, FIG. 2 shows example details related to supporting a user's handwriting input in an electronic device 101. According to an embodiment, the electronic device 101 exemplified in FIG. 2 may include all or at least some constituent elements of the electronic device 101 as described above in the description with reference to FIG. 1.

The electronic device 101 according to one or more embodiments has a bar type or plate type appearance, but is not limited thereto. For example, the illustrated electronic device 101 may be a part of a rollable electronic device or a foldable electronic device. In an embodiment, the "rollable electronic device" may mean an electronic device in which a bendable display (e.g., display module 160 of FIG. 1 or 2) can be wound or rolled at least partly, and can be accommodated inside a housing (not illustrated). According to a user's need, the rollable electronic device may be used to extend a screen display area by unfolding the display or exposing a wider area of the display to outside so as to be visible by the user. In an embodiment, the "foldable electronic device" may mean an electronic device that can be folded or unfolded in a direction in which two different areas of the display (e.g., display module 160 of FIG. 1 or 2) substantially face each other, or are directed opposite to each other. In general, in the foldable electronic device in a state where it is carried by a user, the display may be folded in a state where the two different areas face each other or are directed opposite to each other, and in an actual used state, the user may unfold the display (e.g., display module 160 of FIG. 1 or 2) so that the two different areas are substantially in a plate shape.

With reference to FIG. 2, the electronic device 101 may include a processor 120, a display module 160, and a memory 130. According to an embodiment, constituent elements included in the electronic device 101 may be understood as, for example, a hardware module (e.g., circuitry). According to an embodiment, the constituent elements included in the electronic device 101 may not be limited to the constituent elements (e.g., the processor 120, the display module 160, and/or the memory 130) illustrated in FIG. 2. For example, the constituent elements of the electronic device 101 illustrated in FIG. 2 may be replaced by other constituent elements, or additional constituent elements may be added to the electronic device 101. For example, the electronic device 101 may include other constituent elements, such as a sensor module (e.g., sensor module 176 of FIG. 1), a camera module (e.g., camera module 180 of FIG. 1), and/or a communication module (e.g., communication module 190 of FIG. 1).

According to an embodiment, the display module 160 may visually provide information to an outside (e.g., user) of the electronic device 101. According to an embodiment, the display module 160 may include a touch circuitry (or touch sensor) (not illustrated) or a pressure sensor, and may sense a touch input and/or a hovering input (or proximity input) by measuring a change of a signal (e.g., voltage, quantity of light, resistance, and/or amount of electric charge) for a specific location of the display module 160 based on the touch circuitry or the pressure sensor. According to an embodiment, the display module 160 may be composed of a liquid crystal display (LCD), an organic light emitting diode (OLED), an active matrix organic light emitting diode (AMOLED), or a flexible display.

According to an embodiment, under the control of the processor 120, the display module 160 may visually provide various information (e.g., note layout, handwriting object (e.g., character/letter (e.g., text and/or non-character (e.g., non-text)), and/or area of interest object) related to user's input of handwriting. For example, the display module 160 may display an execution screen of an application 240 (e.g., note application or memo application), content 250 stored in the memory 130, and/or character/letter or non-character corresponding to user's handwriting input on the execution screen of the application 240. According to an embodiment, the handwriting may represent letters that the user writes on the execution screen of the application 240 by using a hand (e.g., finger) or an electronic pen (e.g., stylus pen). For example, the handwriting may mean letters written by the hand using the finger or a direct tool of the electronic pen without passing through any mechanical process. Most handwritings are written as intuitive expressions, and can present unique and creative letter expressions.

According to an embodiment, the memory 130 may store various data being used by at least one constituent element (e.g., processor 120) of the electronic device 101. The data may include, for example, an application 240 (e.g., application 146 of FIG. 1 and/or content 250). In an embodiment, the application 240 may include an application that supports the user's handwriting input. For example, the application 240 may include various types of applications, such as a note application, a memo application, a document application, a message application, and/or a gallery application, and the types thereof may not be limited. In an embodiment, the content 250 may include user's content (e.g., memo or note prepared by the user) created by using the application 240. For example, the content may include input data and/or output data for a command related to the application 240. According to an embodiment, the application 240 and/or the content 250 may be stored as software (e.g., program 140 of FIG. 1) on the memory 130, and may be executed by the processor 120.

According to an embodiment, the processor 120 may execute the application 240 in the electronic device 101, and may store the content 250 created by the application 240 in the memory 130. According to an embodiment, the processor 120 may display the handwriting at a corresponding location on the execution screen of the application 240 based on the user's input (e.g., handwriting input) related to the handwriting while displaying the execution screen of the application 240 through the display module 160. According to an embodiment, while displaying the handwriting, the processor 120 may align and display the handwriting based on the user's input for alignment of the handwriting. According to an embodiment, the processor 120 may process operations related to the alignment of the handwriting (e.g., area of interest (e.g., dirty rectangle (DirtyRect)) creation operation, action identification operation, target object identification operation of the area of interest corresponding to an action, and/or alignment operation based on the target object).

According to an embodiment, the processor 120 may include a recognition module 210 (or recognition means), an area of interest configuration module 220 (or area of interest configuration means), and/or an alignment module 230 (or alignment means). According to an embodiment, functions of the recognition module 210, the area of interest configuration module 220, and/or the alignment module 230, which can be performed by the processor 120, may be implemented in the form of instructions (or commands) and stored in the memory 130. For example, the constituent elements (e.g., the recognition module 210, the area of interest configuration module 220, and/or the alignment module 230) included in the processor 120 may be understood as, for example, hardware modules (e.g., circuitry), but various embodiments are not limited thereto. For example, the constituent elements (e.g., the recognition module 210, the area of interest configuration module 220, and/or the alignment module 230) included in the processor 120 may include a software structure additionally or alternatively in addition to the hardware structure.

According to an embodiment, the constituent elements (e.g., the recognition module 210, the area of interest configuration module 220, and/or the alignment module 230) included in the processor 120 may be implemented as software (e.g., program 140 of FIG. 1) including one or more instructions stored in a storage medium (e.g., memory 130) that can be read by the processor 120. According to an embodiment, the operations being performed by the recognition module 210, the area of interest configuration module 220, and/or the alignment module 230 may be stored in the memory 130, and when executed, the operations may be executed by the instructions for operating the processor 120.

According to an embodiment, the recognition module 210 may recognize an object corresponding to the handwriting that is input by the user. According to an embodiment, data for the handwriting may represent, for example, data physically composed of strokes, and the strokes may represent data composed of a combination of a plurality of points, and may be semantically divided into a character/letter (e.g., text) and/or a non-character (e.g., non-text). According to an embodiment, the recognition module 210 may detect the handwriting input from the user on the execution screen of the application 240, and recognize the input handwriting (e.g., handwriting data) as one object. The recognition operation according to an embodiment will be described in detail with reference to the drawings to be described later.

According to an embodiment, the area of interest configuration module 220 may configure the area of interest based on the object recognized through the recognition module 210. According to an embodiment, the area of interest (e.g., DirtyRect) may include an area of a set rectangle (e.g., DirtyRect) that is virtually configured based on the outermost part of the recognized object by using the outermost points of the object. For example, the area of interest may be configured by connecting the outermost points at the top, bottom, left, and right to form a rectangle among all the points constituting the handwriting. According to an embodiment, the area of interest configuration module 220 may divide the area of interest for each action performed by the user, and may divide one or more areas of interest for each action. The area of interest configuration operation according to an embodiment will be described in detail with reference to the drawings to be described later.

According to an embodiment, the alignment module 230 may perform alignment based on the area of interest. According to an embodiment, the alignment module 230 may perform the alignment with respect to at least one area of interest related to the recent action. For example, the alignment module 230 may identify the area of interest of the target of alignment based on the recent action, and may perform the alignment in a designated alignment method with respect to the object in the identified area of interest. According to an embodiment, the alignment module 230 may associate the object in the identified area of interest with the object of another area of interest (e.g., object on a specific line) related to the object in the identified area of interest and align the associated objects in the designated alignment method.

According to an embodiment, the alignment module 230 may perform various alignments, for example, such as a slope correction (e.g., deskew) of handwriting, location alignment (e.g., indentation) of handwriting for each line, line spacing alignment of handwriting, letter size (e.g., height) normalization, and/or harmony arrangement of a non-text (e.g., underline, figure, sketch, and/or drawing). The alignment operation according to an embodiment will be described in detail with reference to the drawings to be described later.

The electronic device 101 according to various embodiments of the disclosure may include: a display module 160; and a processor 120 operatively connected to the display module 160, wherein the processor 120 may be configured to: display an execution screen of an application supporting a handwriting input, detect the handwriting input from a user input based on the execution screen, determine at least one area of interest based on at least one object corresponding to the handwriting input, identify a target object based on the at least one area of interest in response to a user's action, and perform a handwriting alignment based on the target object.

According to one or more embodiments of the disclosure, the processor 120 may be configured to: divide the at least one object corresponding to the handwriting input in the unit of the user's action, and configure the at least one area of interest based on at least one handwriting related to a recent action, wherein the user's action includes a user input related to switching of the application and/or executing a function based on a function object.

According to one or more embodiments of the disclosure, the processor 120 may be configured to align the target object related to a user's intention based on the target object of the at least one handwriting input related to the recent action.

According to one or more embodiments of the disclosure, the processor 120 may be configured to: identify a first object of the at least one area of interest, identify a second object related to the first object among objects of handwriting inputs in accordance with a previous action, and determine the first object and the second object as the target object.

According to one or more embodiments of the disclosure, the processor 120 may be configured to: configure a target area of interest including the first object of the at least one area of interest and the surrounding second object related to the first object, and align the first object and the second object together based on the target area of interest.

According to one or more embodiments of the disclosure, the processor 120 may be configured to correct the first object to correspond to the second object.

According to one or more embodiments of the disclosure, the processor 120 may be configured to: determine whether to perform line correction and/or size correction of the first object based on the second object, and correct at least one of a line and/or a size of the first object based on the result of determination.

According to one or more embodiments of the disclosure, the processor 120 may be configured to: correct the first object to correspond to the second object, and align the first object and the second object in a state where correction of the first object is applied.

According to one or more embodiments of the disclosure, the processor 120 may be configured to: configure a first area of interest related to a first action based on at least one first object corresponding to a first handwriting input, perform alignment of the first object related to the first action based on a first alignment trigger for the first action, configure a second area of interest related to a second action based on at least one second object corresponding to a second handwriting input, and perform alignment of the second object related to the second action based on a second alignment trigger for the second action in a state where at least a part of the first object is maintained.

According to one or more embodiments of the disclosure, the processor 120 may be configured to: identify at least one third object related to the second object among the first object, correct the second object based on the third object, and perform alignment of the second object having been corrected and the third object in association.

An electronic device 101 according to one or more embodiments of the disclosure may include: a display module 160; and a processor 120 operatively connected to the display module 160, wherein the processor 120 is configured to: configure a first area of interest based on at least one first object corresponding to a first handwriting input and map the first object onto a first action, align the first object mapped onto the first action based on a first alignment trigger for the first action, configure a second area of interest based on at least one second object corresponding to a second handwriting input and map the second object onto a second action, and align the second object mapped onto the second action based on a second alignment trigger for the second action in a state where the first object mapped onto the first action is maintained, wherein the first handwriting input and the second handwriting input are divided in the unit of an action in accordance with the first action and the second action, at least a part of the first object of the first action, crossing the second object of the second action, is related to the second object, and is aligned together with the second object.

Hereinafter, a method for operating an electronic device 101 according to one or more embodiments will be described in detail. According to one or more embodiments, the operations being performed by the electronic device 101 to be described later may be executed by the processor 120 including at least one processing circuitry of the electronic device 101. According to an embodiment, the operations being performed by the electronic device 101 may be stored in the memory 130, and when executed, may be executed by the instructions for operating the processor 120.

Figure 3:
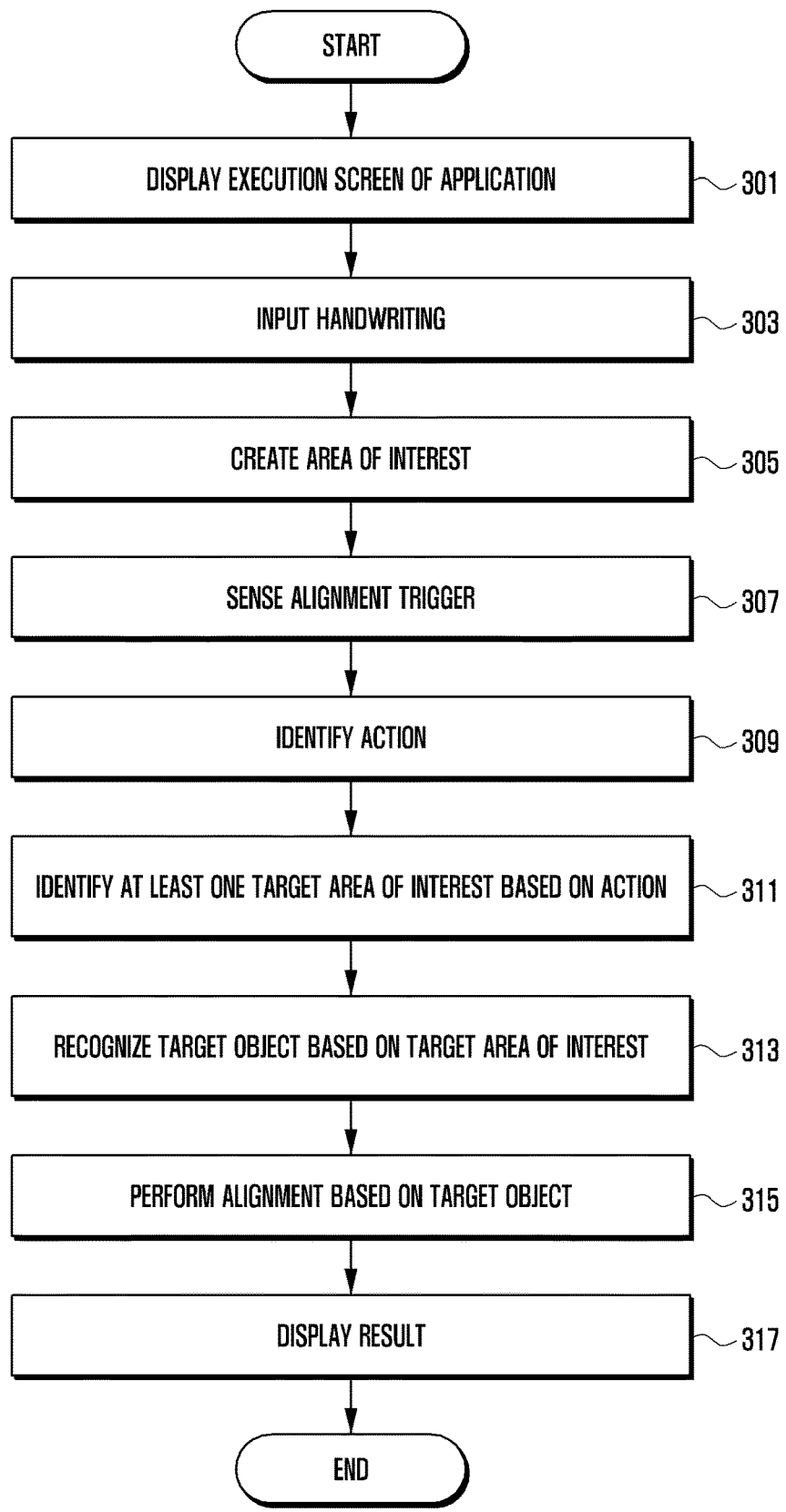
FIG. 3 is a flowchart illustrating an operation of an electronic device according to various embodiments.

FIG. 3 is a flowchart illustrating an operation of an electronic device according to one or more embodiments.

With reference to FIG. 3, in step 301, the processor 120 of the electronic device 101 may display an execution screen of an application. According to an embodiment, the processor 120 may execute an application (e.g., note application or memo application) capable of inputting (or supporting) the handwriting based on a user's input. According to an embodiment, the processor 120 may control the display module 160 to display the execution screen of the application including various information (or objects) (e.g., note layout) related to the input of the handwriting based on the execution of the application.

In step 303, the processor 120 may sense the handwriting input through the display module 160. According to an embodiment, the processor 120, while displaying the execution screen, may receive the handwriting input from a user, and may display the input handwriting on the execution screen.

In step 305, the processor 120 may configure an area of interest. According to an embodiment, the processor 120 may configure at least one area of interest based on at least one object corresponding to the handwriting. According to an embodiment, the processor 120 may detect the handwriting input from the user on the execution screen, and may recognize the input handwriting (e.g., handwriting data) as one object. According to an embodiment, the processor 120 may configure the area of interest based on the recognized object.

According to an embodiment, the processor 120 may configure an area of a set rectangle (e.g., DirtyRect) that is virtually configured based on the outermost part of the object by using the outermost points of the recognized object. For example, the processor 120 may configure the area of interest by connecting the outermost points at the top, bottom, left, and right to form a rectangle among all the points constituting the handwriting. The area of interest configuration operation according to an embodiment will be described in detail with reference to the drawings to be described later.

In step 307, the processor 120 may sense an alignment trigger. According to an embodiment, the processor 120 may sense the user's input based on the object (e.g., alignment object) designated to execute the handwriting alignment that is provided to a designated area of the execution screen (or note layout) of the application.

In step 309, the processor 120 may identify (or divide) the actions based on the sensing of the alignment trigger. According to an embodiment, the processor 120 may identify the action (or recent action) last performed by the user. According to an embodiment, the processor 120 may divide the area of interest based on at least one object corresponding to the handwriting input by the user in the unit (e.g., the execution) of an action. For example, a first area of interest based on a first object of a first handwriting input may be configured by a first action, a second area of interest based on a second object of a second handwriting input may be configured by a second action, and a third area of interest based on a third object of a third handwriting input may be configured by a third action.

According to an embodiment, when the first action is performed after the first handwriting is input, the processor 120 may map the first area of interest of the first handwriting input onto the first action (or first action group). For example, the first action may correspond to the recent action. According to an embodiment, when the second handwriting is input after the first action, and the second action is performed, the processor 120 may map the second area of interest of the second handwriting input onto the second action (or second action group). For example, the second action may correspond to the recent action.

In step 311, the processor 120 may identify at least one target area of interest based on the action. According to an embodiment, the processor 120 may identify the area of interest corresponding to the recent action, for example, the area of interest configured based on the object of the handwriting input between the previous action and the recent action. According to an embodiment, the processor 120 may determine the target area of interest for alignment based on the user's action with respect to the area of interest based on at least one object corresponding to the handwriting input by the user. According to an embodiment, the processor 120 may divide the actions being performed by the user, or may map (or group) at least one area of interest corresponding to the handwriting for each action.

In step 313, the processor 120 may recognize the target object based on the target area of interest. According to an embodiment, each area of interest being divided for each action may be composed of at least one object corresponding to the handwriting input in the unit of actions being divided. According to an embodiment, the processor 120 may recognize the at least one object constituting the area of interest corresponding to the recent action as the target object for the alignment. According to an embodiment, the target object may include at least some of objects of another area of interest related to the object of the area of interest.

According to an embodiment, the processor 120 may associate the target object in association with the object of the identified area of interest with the object of another area of interest (e.g., object on a specific line) related to the object in the identified area of interest and determine the associated objects as the target object. For example, the processor 120 may identify at least one third object (line) related to the second object of the second area of interest among the first object of the first area of interest, and may determine the target object is in association with the second object and the third object. The operation of determining the target object according to an embodiment will be described in detail with reference to the drawings to be described later.

In step 315, the processor 120 may perform the alignment based on the target object. According to an embodiment, the processor 120 may perform the alignment using an alignment method designated with respect to the target object. For example, the processor 120 may designate the target object based on the action among a plurality of objects corresponding to the handwriting, and may perform the alignment with respect to the designated target object. According to an embodiment, based on the target object, the processor 120 may perform various alignments, such as a slope correction (e.g., deskew) of handwriting, location alignment (e.g., indentation) of handwriting for each line, line spacing alignment of handwriting, letter size (e.g., height) normalization, and/or harmony arrangement of a non-text (e.g., underline, figure, sketch, and/or drawing). The alignment operation according to an embodiment will be described in detail with reference to the drawings to be described later.

In step 317, the processor 120 may display the result of performing the alignment. According to an embodiment, the processor 120 may control the display module 160 to display the result of the handwriting alignment performed by designating the target object on the execution screen.

Figure 4:
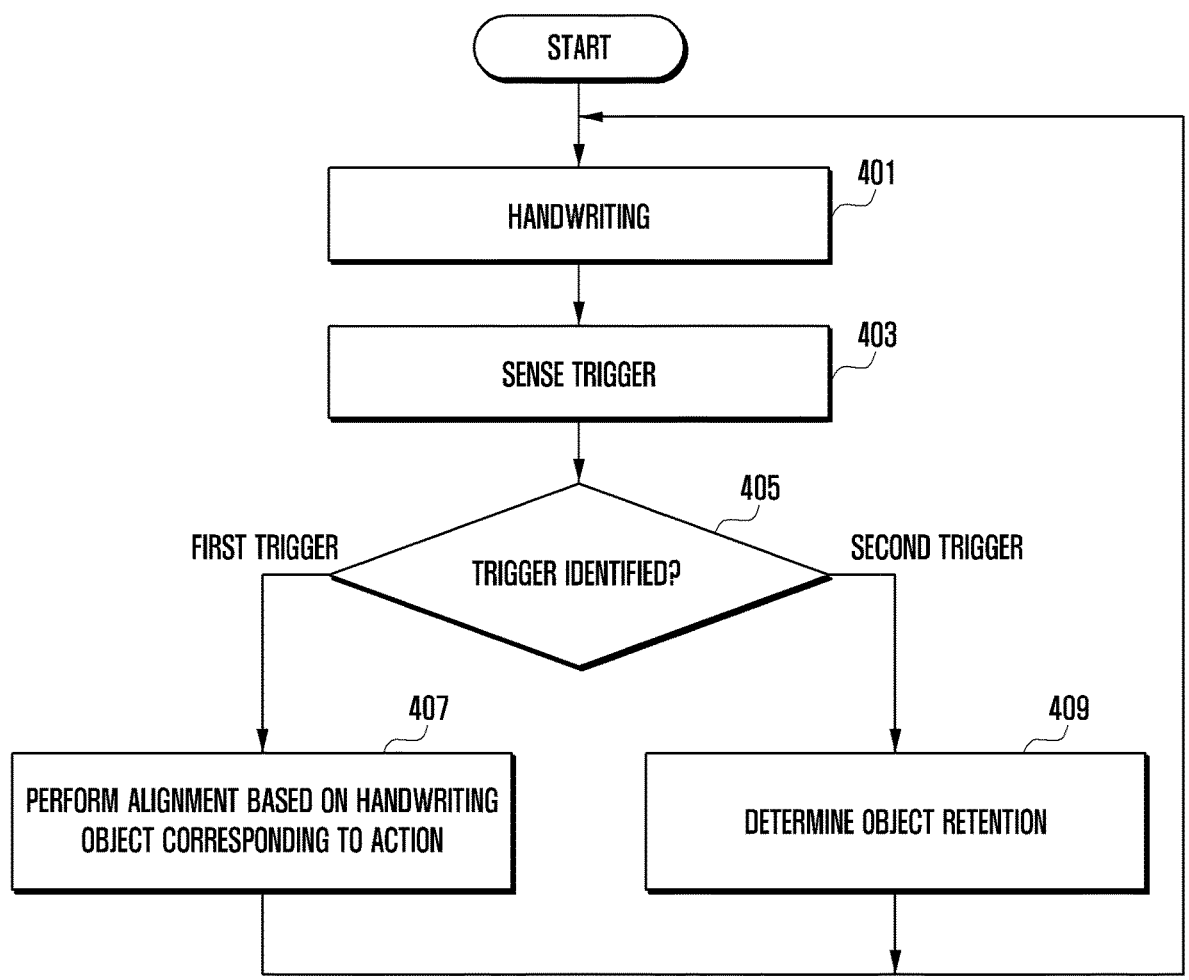
FIG. 4 is a flowchart illustrating an operation of an electronic device according to various embodiments.

FIG. 4 is a flowchart illustrating an operation of an electronic device according to one or more embodiments.

With reference to FIG. 4, in step 401, the processor 120 of the electronic device 101 may sense the handwriting input through the display module 160. According to an embodiment, the processor 120 may receive the handwriting input from the user while displaying the execution screen, and may display the handwriting being input on the execution screen.

In step 403, the processor 120 may sense a trigger (or user input) by the user after the handwriting input. According to an embodiment, the trigger (or user input) may include various triggers, such as a first trigger (e.g., alignment trigger) related to performing of the alignment, a second trigger (e.g., function trigger) related to performing a function, and/or a third trigger (e.g., end trigger) related to an end of the handwriting input, and the types of trigger may not be limited. According to an embodiment, the first trigger, the second trigger, and/or the third trigger may be respective actions being performed by the user.

In step 405, the processor 120 may identify the type of trigger based on the trigger sensing. According to an embodiment, after the handwriting is input, the processor 120 may identify the type of trigger based on the object corresponding to the user input on the execution screen (or note layout) of the application. According to an embodiment, when the first object (e.g., alignment object) designated to execute the handwriting alignment on the execution screen (or note layout) is selected (e.g., touched), the processor 120 may identify the trigger as the first trigger (e.g., alignment trigger). According to another embodiment, when the second object (e.g., eraser object, clip object, text conversion object, storage object, and/or screen change object) designated to execute another function (or option) (e.g., another function other than the alignment function) related to the handwriting is selected (e.g., touched) on the execution screen, the processor 120 may identify the trigger as the second trigger (e.g., function trigger).

In an embodiment, another function (or option) other than the alignment function related to the handwriting may include various types of functions, for example, an eraser function for erasing at least a part of the handwriting, a clip function for clipping the handwriting, a conversion function for converting the handwriting into a text, a color selection function for changing the color of the handwriting, and/or a storage function for storing the handwriting, and the types may not be limited.

In step 405, if the trigger is determined as the first trigger (e.g., "first trigger" in step 405), the processor 120, in step 407, may perform the alignment based on the handwriting object corresponding to the action. Thereafter, the processor 120 may perform an operation of aligning or maintaining a new handwriting object corresponding to the first trigger or the second trigger after a new handwriting is input by the user as in step 401.

In step 405, if the trigger is determined as the second trigger (e.g., "second trigger" in step 405), the processor 120, in step 409, may determine to maintain (or fix) the handwriting object. According to an embodiment, if the second trigger is sensed after the handwriting input, the processor 120 may identify that the action is changed over, exclude the handwriting object (e.g., handwriting object input between the previous action and the recent action (e.g., action according to the second trigger)) input up to the action change from the alignment target, and maintain the form input by the user. Thereafter, when the alignment is performed after the new handwriting is input by the user as in step 401, the processor 120 may exclude (maintain the current form) the handwriting object determined to be maintained (or fixed) from the alignment target, and may perform the alignment through designation of only the new handwriting object.

Figure 5A:
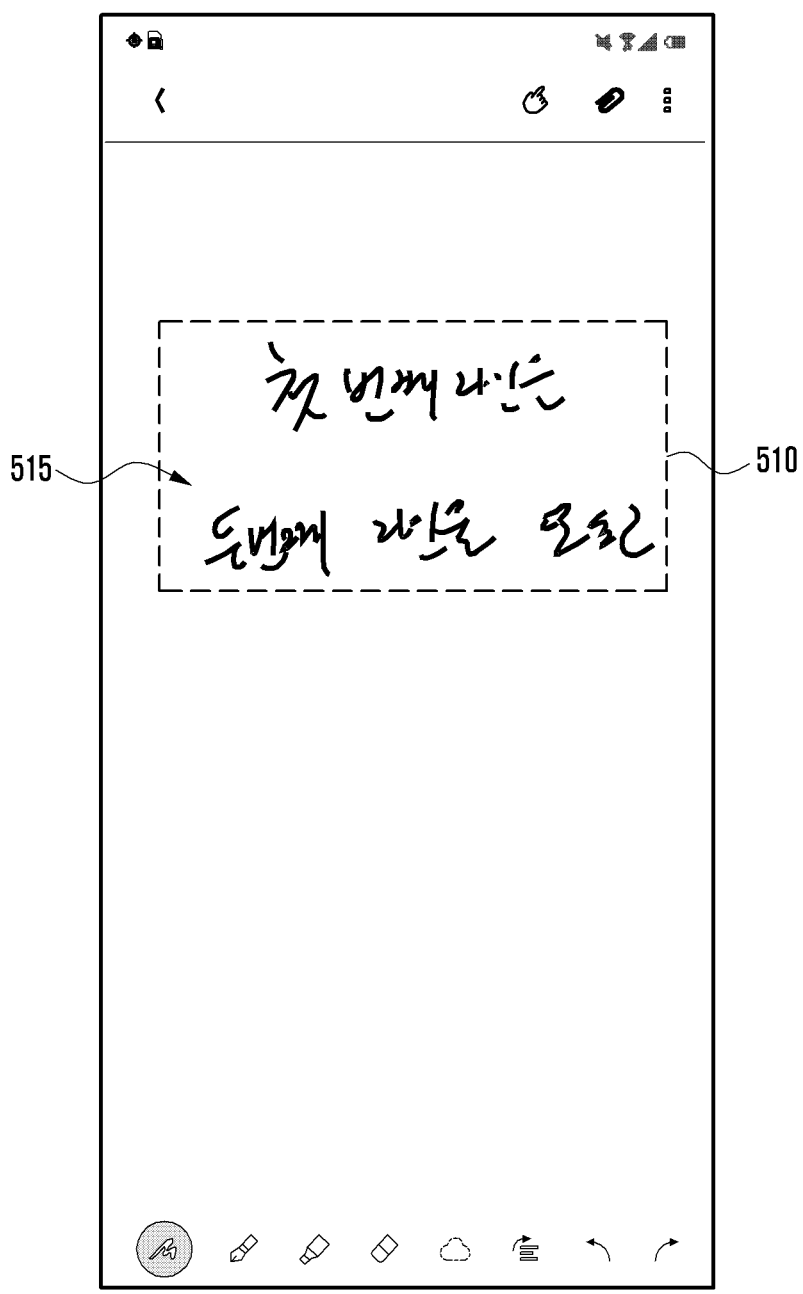
FIGS. 5A, 5B, and 6 are diagrams explaining examples of configuring an area of interest for each action in an electronic device according to various embodiments.
Figure 5B:
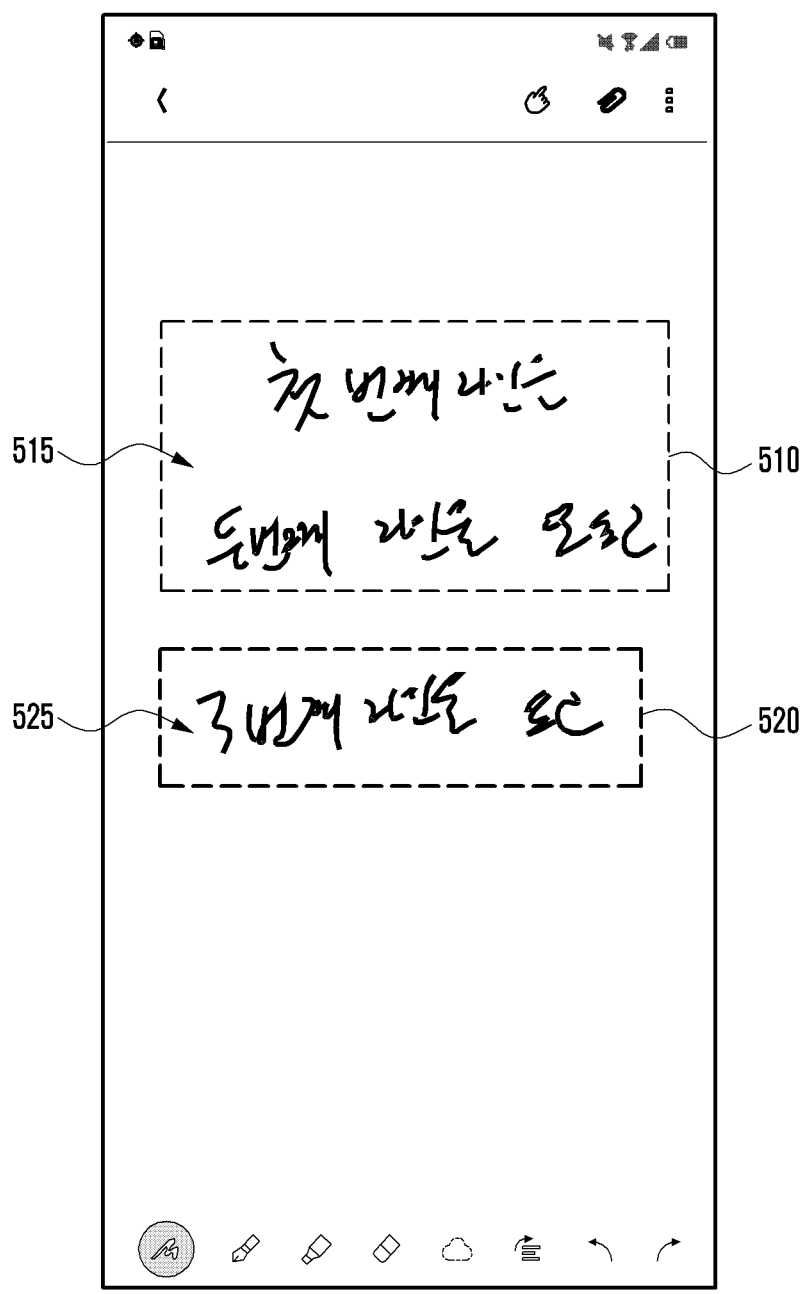
Figure 6:
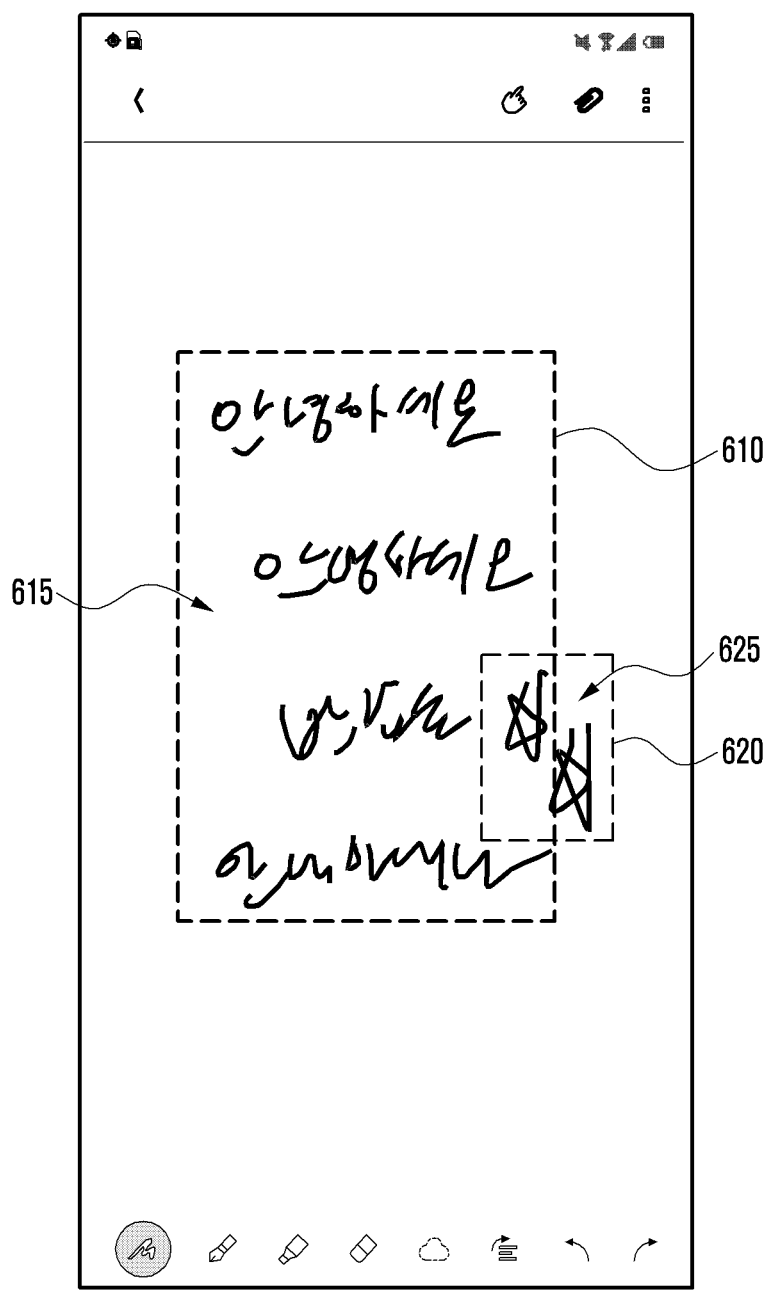

FIGS. 5A, 5B, and 6 are diagrams explaining examples of configuring an area of interest for each action in an electronic device according to one or more embodiments.

With reference to FIGS. 5A, 5B, and 6, the user may repeatedly input the handwriting and action performed on the execution screen of the application.

As exemplified in FIG. 5A, the user may input a first handwriting 515. According to an embodiment, the electronic device 101 may configure a first area of interest 510 based on an object corresponding to the first handwriting 515. According to an embodiment, the electronic device 101 may configure the first area of interest 510 based on at least one object (e.g., strokes) corresponding to the first handwriting 515. According to an embodiment, the electronic device 101 may configure an area of a set rectangle (e.g., DirtyRect) that is virtually configured based on the outermost (e.g., outermost perimeter) of the object by using the outermost points of the at least one object corresponding to the first handwriting 515 as the first area of interest 510. For example, the processor 120 may configure the area of interest by connecting the outermost points at the top, bottom, left, and right to form a rectangle among all the points constituting the first handwriting 515.

According to an embodiment, when the first action is performed after the first handwriting 515 is input, the electronic device 101 may map the first area of interest 510 of the first handwriting 515 onto the first action (or first action group). For example, the electronic device 101 may map the first area of interest 510 of the first handwriting 515 onto the first action.

As exemplified in FIG. 5B, the user may input the first handwriting 515, and perform the first action, and then input a second handwriting 525. According to an embodiment, the electronic device 101 may configure a second area of interest 520 based on the object corresponding to the second handwriting 525. According to an embodiment, the electronic device may configure the second area of interest 520 based on at least one object (e.g., strokes) corresponding to the second handwriting 525.

According to an embodiment, when the second handwriting 525 is input after the first action, and a second action is performed, the electronic device 101 may map the second area of interest 520 of the second handwriting 525 onto the second action (or second action group).

As exemplified in FIG. 6, the user may input a third handwriting 615 corresponding to the explanation with reference to FIGS. 5A and 5B, and may input a fourth handwriting 625 after performing a third action. According to an embodiment, the electronic device 101 may configure a third area of interest 610 based on the object corresponding to the third handwriting 615, and may configure a fourth area of interest 620 based on the object corresponding to the fourth handwriting 625.

According to an embodiment, the user may use all of the character/letter (e.g., text) (e.g., the first handwriting 515, second handwriting 525, and third handwriting 615), and/or the non-character (e.g., non-text) (e.g., the fourth handwriting 625)) as the handwritings.

As exemplified in FIGS. 5A, 5B, and 6, according to one or more embodiments, when performing the alignment in a state where the first object of the area of interest (e.g., the first area of interest 510 or the third area of interest 610) corresponding to the previous action (e.g., the first action or the third action) and the second object of the area of interest (e.g., the second area of interest 520 or the fourth area of interest 620) corresponding to the recent action (e.g., the second action or the fourth action) coexist, the electronic device 101 may perform the alignment based on the second object corresponding to the recent action and the object of the line (e.g., the third and fourth lines of the third handwriting 615 of FIG. 6) related to the second object. As noted herein, an action may be performed by the user, and actions may include the first trigger, the second trigger, and/or the third trigger.

As exemplified in FIGS. 5A, 5B, and 6, according to one or more embodiments, the electronic device 101 may configure at least one area of interest based on at least one object corresponding to the handwriting input through the execution screen of the application. According to an embodiment, the electronic device 101 may recognize the target object (e.g., a new object and an object of the line related to the new object) based on the target area of interest (e.g., the area of interest corresponding to the recent action) among the at least one area of interest, and may perform the handwriting alignment by designating only the target object through the action division.

For example, the electronic device 101 may configure the first area of interest corresponding to the first handwriting input, and based on the first alignment trigger, may perform the alignment by designating the target object based on the first area of interest. As another example, the electronic device 101 may configure the second area of interest corresponding to the second handwriting input, and based on the second alignment trigger, may perform the alignment by designating the target object based on the second area of interest.

Figure 7:
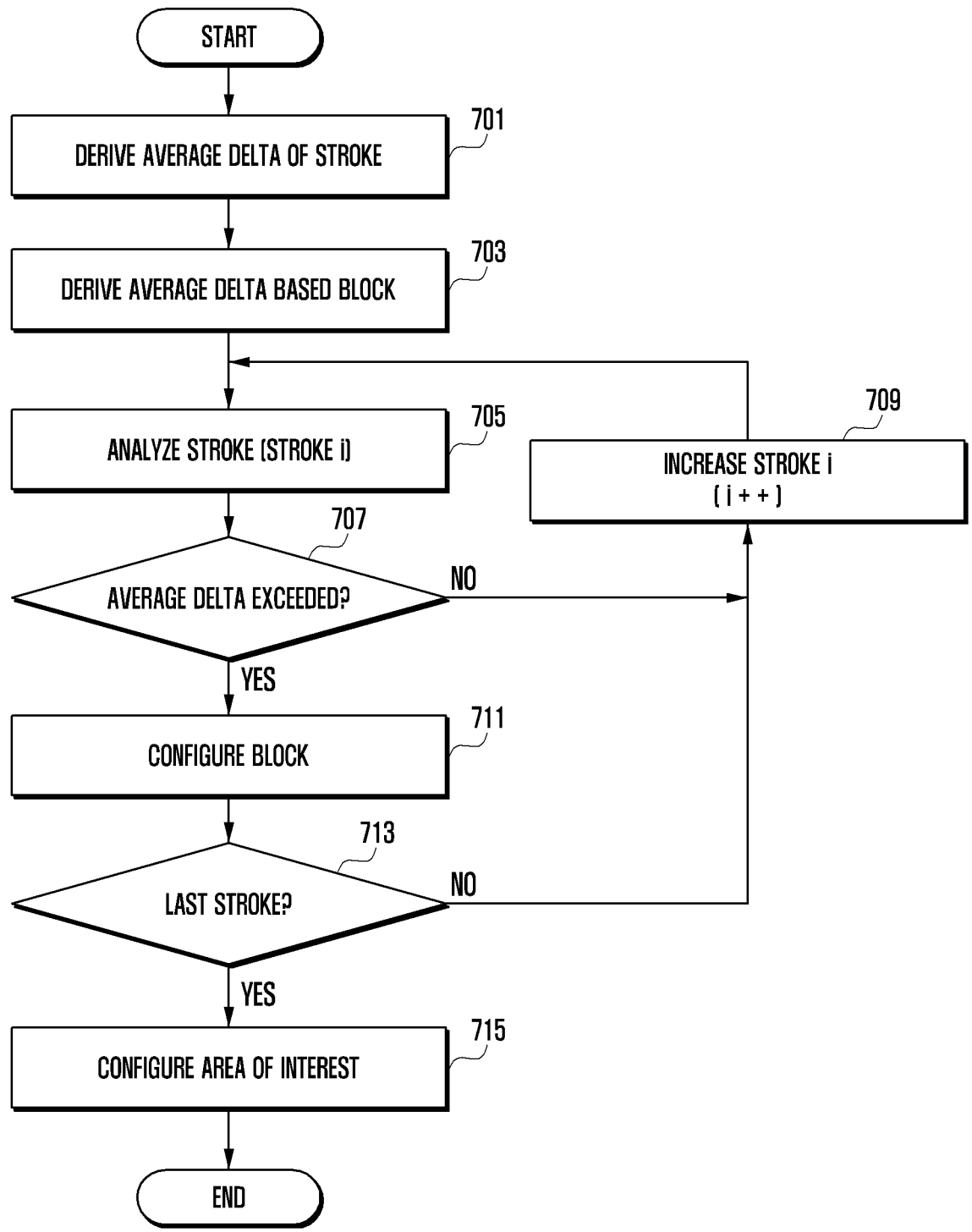
FIG. 7 is a flowchart illustrating an operation of an electronic device according to various embodiments.
Figure 8:
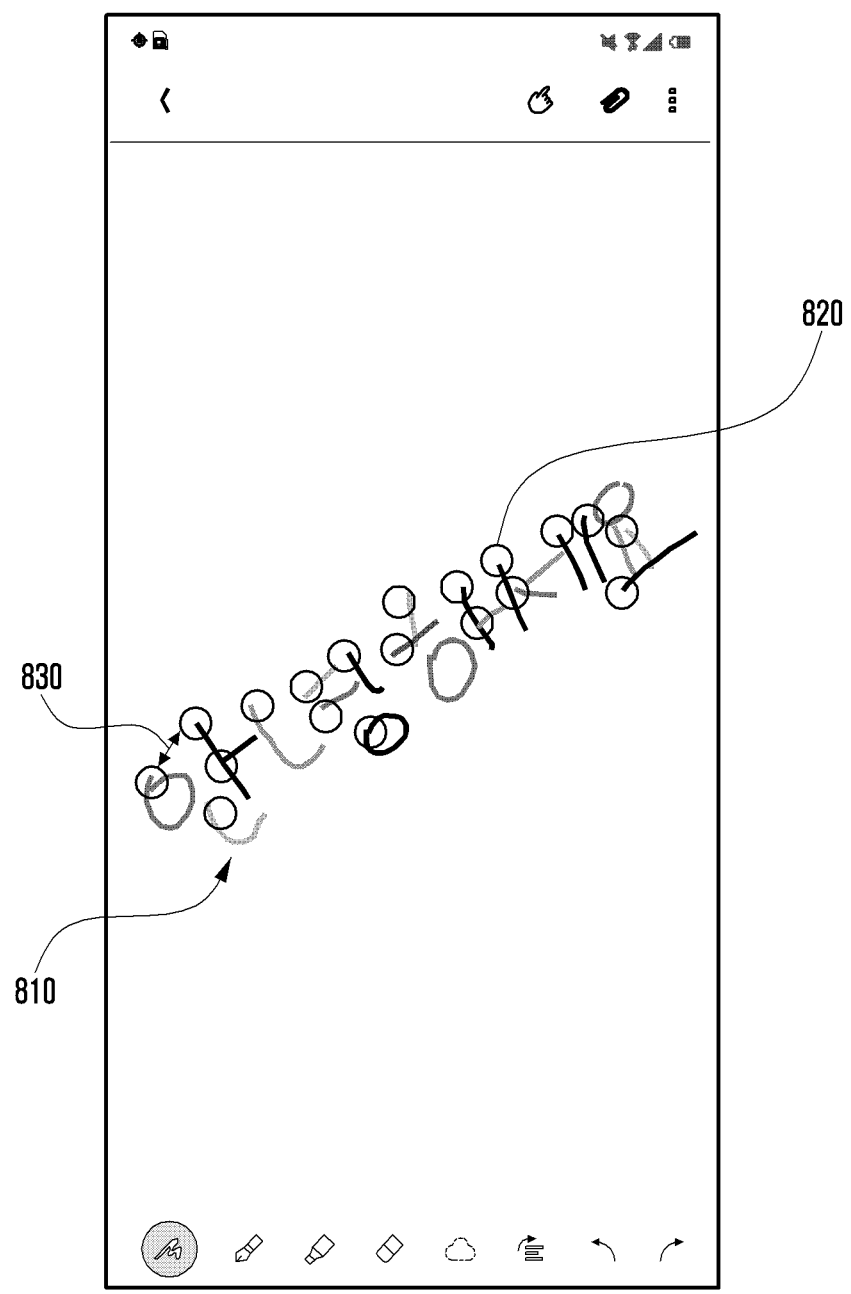
FIG. 8 is a diagram explaining an example of obtaining an average delta in an electronic device according to various embodiments.
Figure 9:
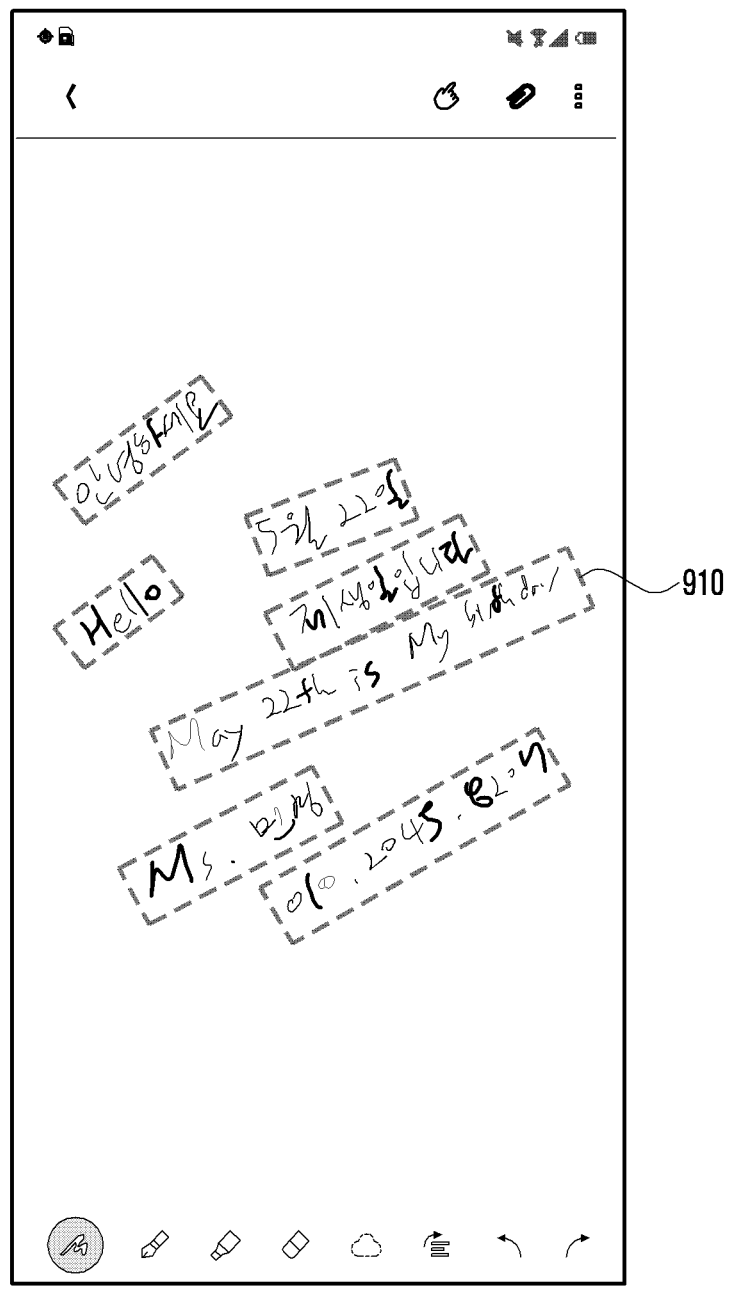
FIG. 9 is a diagram explaining an example of configuring a plurality of areas of interest for each handwriting in an electronic device according to various embodiments.

FIG. 7 is a flowchart illustrating an operation of an electronic device according to one or more embodiments. FIG. 8 is a diagram explaining an example of obtaining an average delta in an electronic device according to one or more embodiments. FIG. 9 is a diagram explaining an example of configuring a plurality of areas of interest for each handwriting in an electronic device according to one or more embodiments.

According to an embodiment, FIGS. 7, 8, and 9 may represent an operation example of configuring a plurality of areas of interest through block division with respect to handwritings. For example, when a plurality of DirtyRects exist corresponding to the input handwritings, the electronic device 101 may perform blocking and division through analysis of strokes in the DirtyRect of the existing action and strokes in the DirtyRect of the recent action, and FIGS. 7, 8, and 9 may represent an example of forming the blocks.

With reference to FIG. 7, in step 701, the processor 120 of the electronic device 101 may derive an average delta of the strokes (e.g., handwriting data). According to an embodiment, data for the handwriting may represent data composed of at least one stroke, and the stroke may represent data composed of a combination of a plurality of points, and may be divided into/by the character/letter (e.g., text) and/or the non-character (e.g., non-text). According to an embodiment, the processor 120 may calculate the average delta by analyzing the strokes of the input handwriting. An example thereof is illustrated in FIG. 8.

With reference to FIG. 8, the processor 120 may analyze respective strokes of the input handwriting 810, and may calculate the delta based on the distance 830 (e.g., distance between first points 820 of the strokes) between the plurality of points 820 (e.g., in case of Hangul, about 10 to 100 points for each stroke) constituting each stroke. In an embodiment, the processor 120 may calculate the delta by adding a weight value (e.g., sensitivity) with respect to horizontal (e.g., X coordinate) and/or vertical (e.g., Y coordinate) changes in consideration of the line separation of the handwriting. According to an embodiment, the processor 120 may calculate the average delta by calculating an average of the deltas calculated based on the distances 830 between the respective points 820. According to an embodiment, the average delta may be used to divide the blocks in the following operation.

In step 703, the processor 120 may derive a block (e.g., DirtyRect) for the handwriting based on the derived average delta.

In step 705, the processor 120 may analyze the stroke (e.g., i-th stroke, i=1). For example, the processor 120 may compare the distance between the strokes and the average delta with each other, starting with the i-th (e.g., first, i=1) stroke among the strokes of the handwriting.

In step 707, the processor 120 may determine whether the corresponding stroke exceeds the average delta. For example, the processor 120 may determine whether the distance between the strokes has a difference that is equal to or larger than the average delta.

In the step 707, if the distance between the strokes does not exceed the average delta (e.g., "No" in step 707), the processor 120, in step 709, may increase the stroke i (e.g., i++). For example, the processor 120 may perform analysis of the next stroke. For example, the processor 120 may proceed with the step 705, and may perform analysis of the second (e.g., i=2) stroke.

In the step 707, if the distance between the strokes exceeds the average delta (e.g., "Yes" in step 707), the processor 120, in step 711, may configure (e.g., create) the block. According to an embodiment, if the distance between the strokes exceeds the average delta, the processor may configure the block up to the corresponding stroke, and may configure a new block with respect to the next stroke.

In step 713, the processor 120 may determine whether the currently analyzed stroke corresponds to the last stroke. According to an embodiment, the processor 120 may determine whether the analysis has been performed with respect to all the strokes corresponding to the handwriting.

In the step 713, if the analyzed stroke is not the last stroke, (e.g., "No" in step 713), the processor 120, in the step 709, may increase the stroke i (i++). For example, the processor 120 may perform the analysis of the next stroke. For example, the processor 120 may proceed with the step 705, and may perform the analysis of the second (e.g., i=2) stroke.

In the step 713, if the analyzed stroke is the last stroke (e.g., "Yes" in step 713), the processor 120, in step 715, may configure at least one DirtyRect based on the configured block. For example, if three blocks are configured based on the handwriting, for example, if three blocks have the distance that is equal to or larger than the average delta, the processor 120 may configure the three corresponding blocks as the DirtyRect. According to an embodiment, the DirtyRect itself may be configured as the area of interest, or may be configured as the area of interest in association with another object surrounding the DirtyRect.

According to an embodiment, an example of the result in accordance with the operations of FIGS. 7 and 8 is illustrated in FIG. 9. As exemplified in FIG. 9, if the distance 830 between the grouped strokes has a difference that is equal to or larger than the average delta, the processor 120 may create a plurality of blocks 910 based on the handwriting object having the difference that is equal to or larger than the average delta in each handwriting as exemplified in FIG. 9. For example, the processor 120 may divide the block by analyzing locations of the independent handwritings, and based on this, may derive the respective DirtyRects. According to an embodiment, respective dotted rectangles representing the blocks in FIG. 9 are illustrated for explanation, and may not actually be seen.

Figure 10:
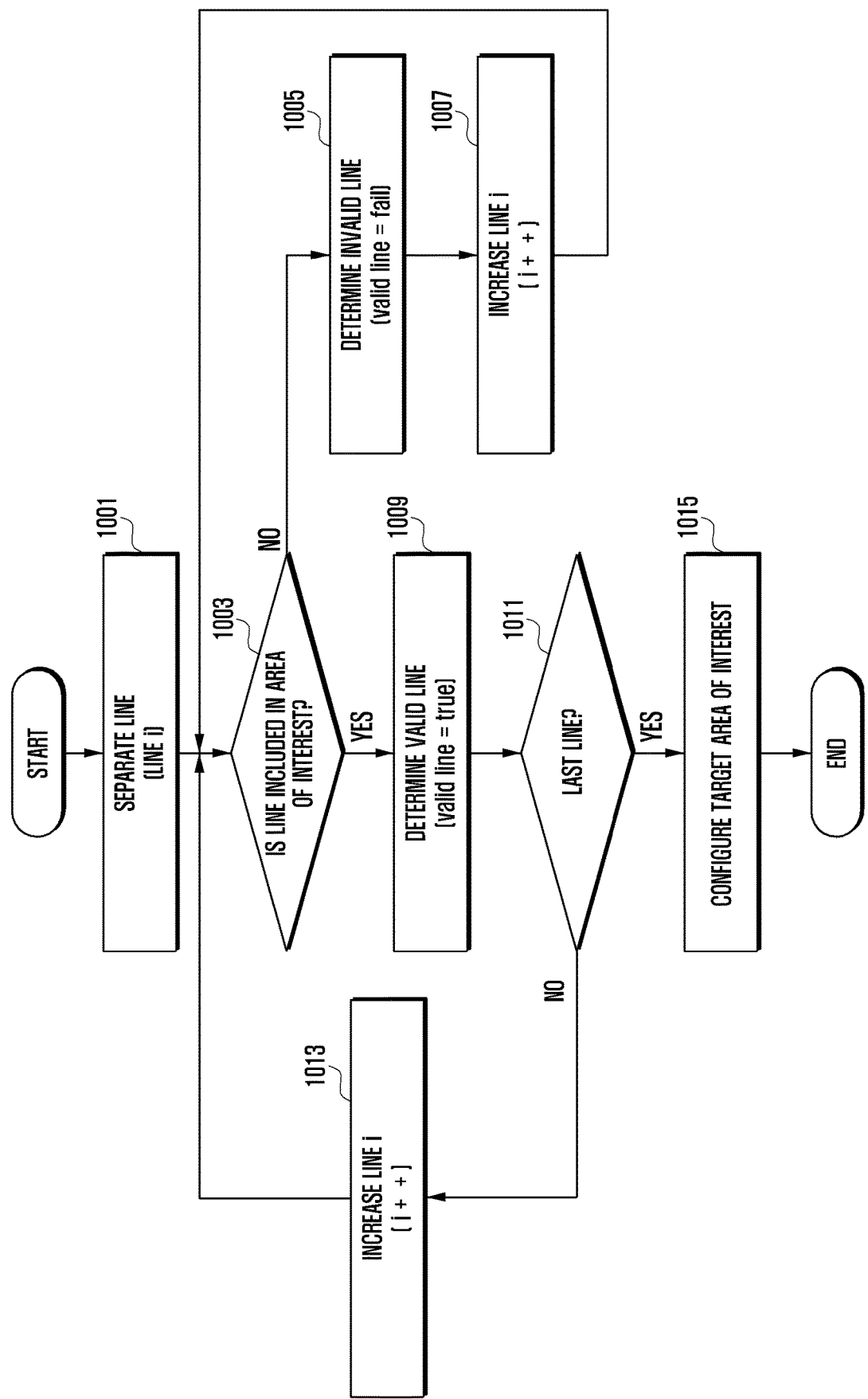
FIG. 10 is a flowchart illustrating an operation of an electronic device according to various embodiments.

FIG. 10 is a flowchart illustrating an operation of an electronic device according to one or more embodiments.

According to an embodiment, FIG. 10 may represent an operation example of configuring an area of interest (or target object) of the alignment target according to the action through division of the handwriting object (or line) related to the configured DirtyRect as exemplified in FIGS. 7, 8, and 9.

With reference to FIG. 10, in step 1001, the processor 120 of the electronic device 101 may perform separation of the line (e.g., i-th line, i=1) based on the handwriting. For example, the processor 120 may separate and divide the i-th (e.g., first, i=1) line from a plurality of lines of the handwriting after configuring the area of interest (e.g., DirtyRect) for the handwriting as exemplified in FIG. 7.

In step 1003, the processor 120 may determine whether the separated line is included in the area of interest. According to an embodiment, the processor 120 may compare the separated line with the configured block as exemplified in FIG. 7, and may determine whether at least a part of the separated line (or object of the line) crosses the block.

In the step 1003, if the separated line is not included in the area of interest (e.g., "No" in step 1003), the processor 120, in step 1005, may determine the corresponding line (e.g., first line) as an invalid line (e.g., valid line=fail). For example, the processor 120 may determine that the corresponding line does not cross the area of interest.

In step 1007, the processor 120 may increase line i (e.g., i++). For example, the processor 120 may perform the analysis of the next line. For example, the processor 120 may proceed with the step 1003, and may perform the analysis of the second (e.g., i=2) line.

In the step 1003, if the separated line is included in the area of interest (e.g., "Yes" in step 1003), the processor 120, in step 1009, may determine the corresponding line (e.g., first line) as a valid line (e.g., valid line=true). For example, the processor 120 may determine that the corresponding line crosses the area of interest.

In step 1011, the processor 120 may determine whether the analyzed line corresponds to the last line. According to an embodiment, the processor 120 may determine whether the analysis has been performed with respect to all the lines corresponding to the handwriting.

In the step 1011, if the analyzed line is not the last line (e.g., "No" in step 1011), the processor 120, in step 1013, may increase the line i (e.g., i++). For example, the processor 120 may perform the analysis of the next line. For example, the processor 120 proceeds with the step 1003, and may perform the analysis of the second (e.g., i=2) line.

In the step 1011, if the analyzed line is the last line (e.g., "Yes" in step 1011), the processor 120, in step 1015, may configure the target area of interest. According to an embodiment, the processor 120 may configure the block (or DirtyRect) including the object of the area of interest and the object of the line that crosses the object of the area of interest, and may configure the corresponding block as the target area of interest. For example, the processor 120 may configure the target area of interest so that the target area of interest includes the object of the area of interest and the object of another area of interest (e.g., based on the separated line) related to the object of the area of interest. According to an embodiment, the processor 120 may determine the target object in association with the object of the area of interest and the object of another area of interest (e.g., object on a specific line) related to the object in the area of interest. For example, the processor 120 may identify at least one third object (line) related to the second object of the second area of interest among the first object of the first area of interest, determine the target object in association with the second object and the third object, and perform the alignment by designating the target object.

Figure 11:
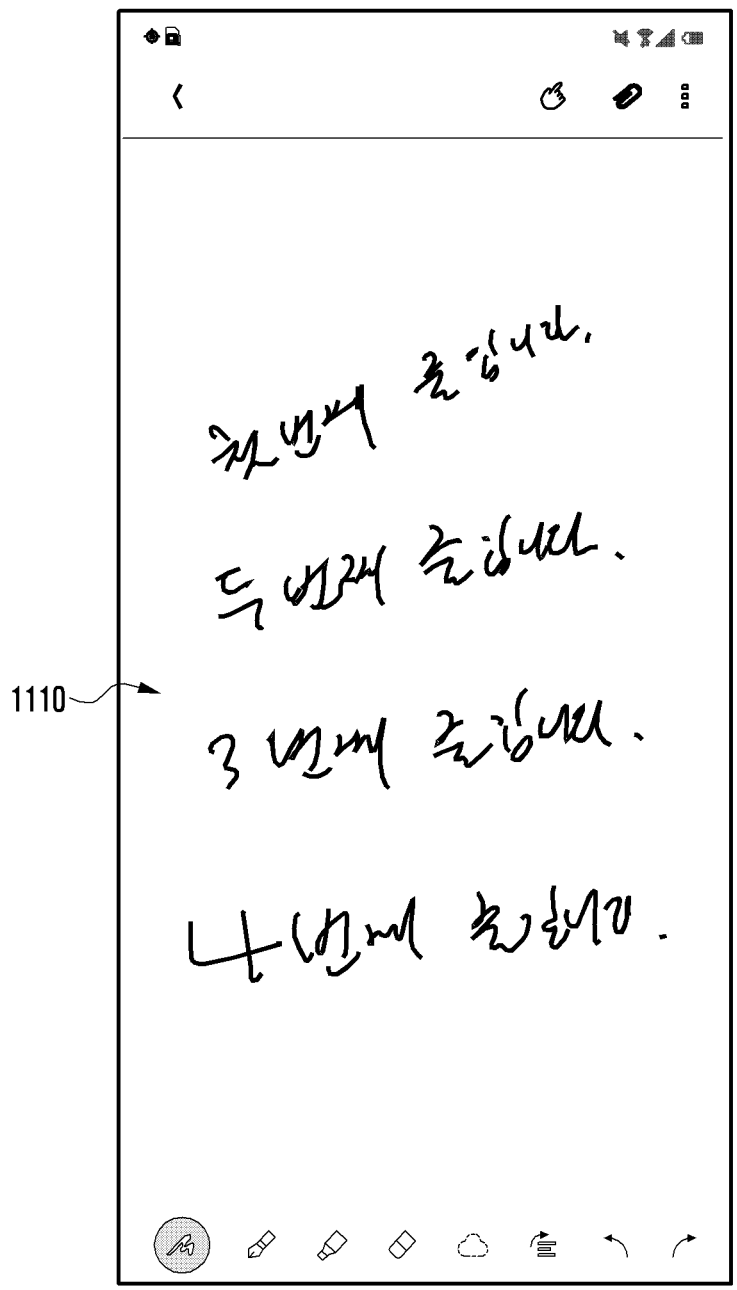
FIGS. 11 and 12 are diagrams explaining an example of configuring a target area of interest in an electronic device according to various embodiments.
Figure 12:
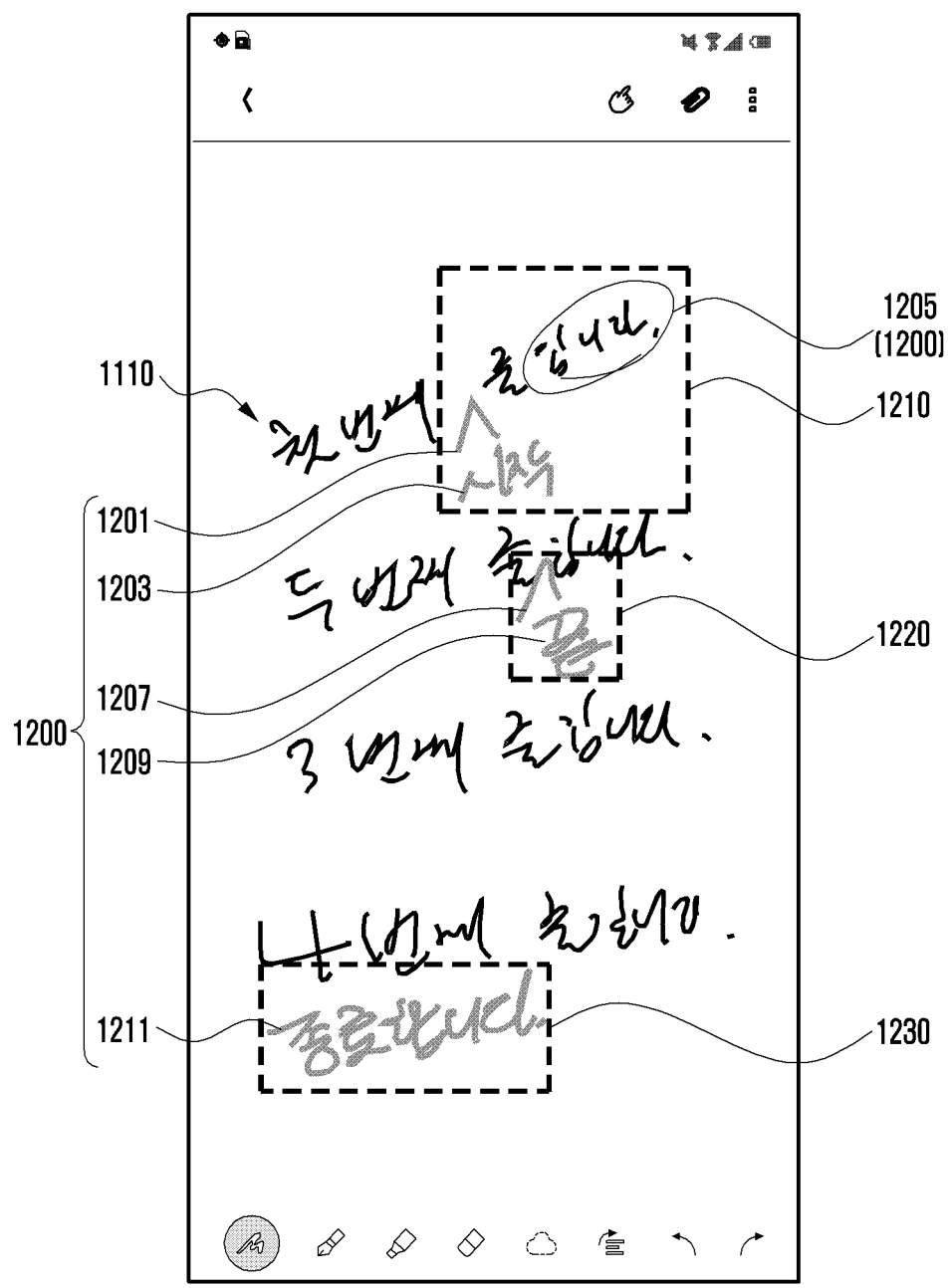

FIGS. 11 and 12 are diagrams explaining an example of configuring a target area of interest in an electronic device according to one or more embodiments.

According to an embodiment, FIGS. 11 and 12 may represent an example of configuring the target area of interest so that the object of the line that crosses the area of interest is the alignment target object as exemplified in FIG. 10. For example, FIGS. 11 and 12 may represent an example of configuring at least a part of the handwriting of the existing action as the target area of interest for the handwriting alignment in association with the handwriting of the recent action.

As exemplified in FIG. 11, the user may input the first handwriting 1110 composed of four lines, and may perform the first action. According to an embodiment, the electronic device 101 may configure the first handwriting 1110 as the first area of interest, and may map the first area of interest of the first handwriting 1110 corresponding to the first action onto the first action.

As exemplified in FIG. 12, the user may input the first handwriting 1110, perform the first action, and then input the second handwriting 1200 (e.g., 1201, 1203, 1205, 1207, 1209, and 1211) crossing (overlapping) the first handwriting 1110. According to an embodiment, the electronic device 101 may divide the second handwriting 1200 into a plurality of blocks (e.g., first block 1210, second block 1220, and third block 1230) through blocking (e.g., the block creation process) as described in the above description with reference to FIGS. 7, 8, and 9.

According to an embodiment, when the first handwriting 1110 composed of four lines is input, the first action is performed, and the second handwriting 1200 is input, the electronic device 101 may virtually configure the first block 1210, the second block 1220, and the third block 1230 that are displayed as dotted rectangles by designating the objects or object groups corresponding to the second handwriting 1200. For example, the first block 1210, the second block 1220, and the third block 1230 may represent three clusters at distances equal to or larger than the average delta. According to an embodiment, the dotted rectangles forming the blocks in FIG. 12 are illustrated for explanation, but may not actually be seen. According to an embodiment, each of the plurality of blocks 1210, 1220, and 1230 may represent the DirtyRect (e.g., second area of interest). For example, the electronic device 101 may configure the second area of interest related to the second action based on the plurality of DirtyRects. According to a certain embodiment, when configuring the second area of interest, the electronic device 101 may configure the target area of interest so as to include at least one object (or line) related to each DirtyRect among the first handwriting 1110 designated as the first area of interest.

FIGS. 13, 14, 15, and 16 are diagrams explaining an example of an action usable in an electronic device according to one or more embodiments.

According to an embodiment, while executing an application, the electronic device 101 may divide actions based on various user inputs. For example, while executing the application, the electronic device 101 may divide the actions in accordance with the user inputs, and may perform the alignment by designating the handwriting related to the recent action.

In the related art, if the handwriting alignment is performed in a state where the first handwriting previously input by the user and the second handwriting newly input by the user exist, the alignment is performed with respect to all the handwritings (e.g., first handwriting and the second handwriting). In one or more embodiments, the electronic device 101 may divide the handwritings input in the unit of an action, divide the first handwriting previously input and the second handwriting newly input in the unit of an action, and intensively perform the alignment with respect to the second handwriting. According to an embodiment, the electronic device 101 may perform the alignment of the first handwriting in association with at least a part of the first handwriting related to (e.g., crossing or overlapping) the second handwriting.

According to an embodiment, various types of user inputs (e.g., action occurrences) for action division are included as exemplified in FIGS. 13, 14, 15, and 16, and the types are not limited thereto.

Figure 13:
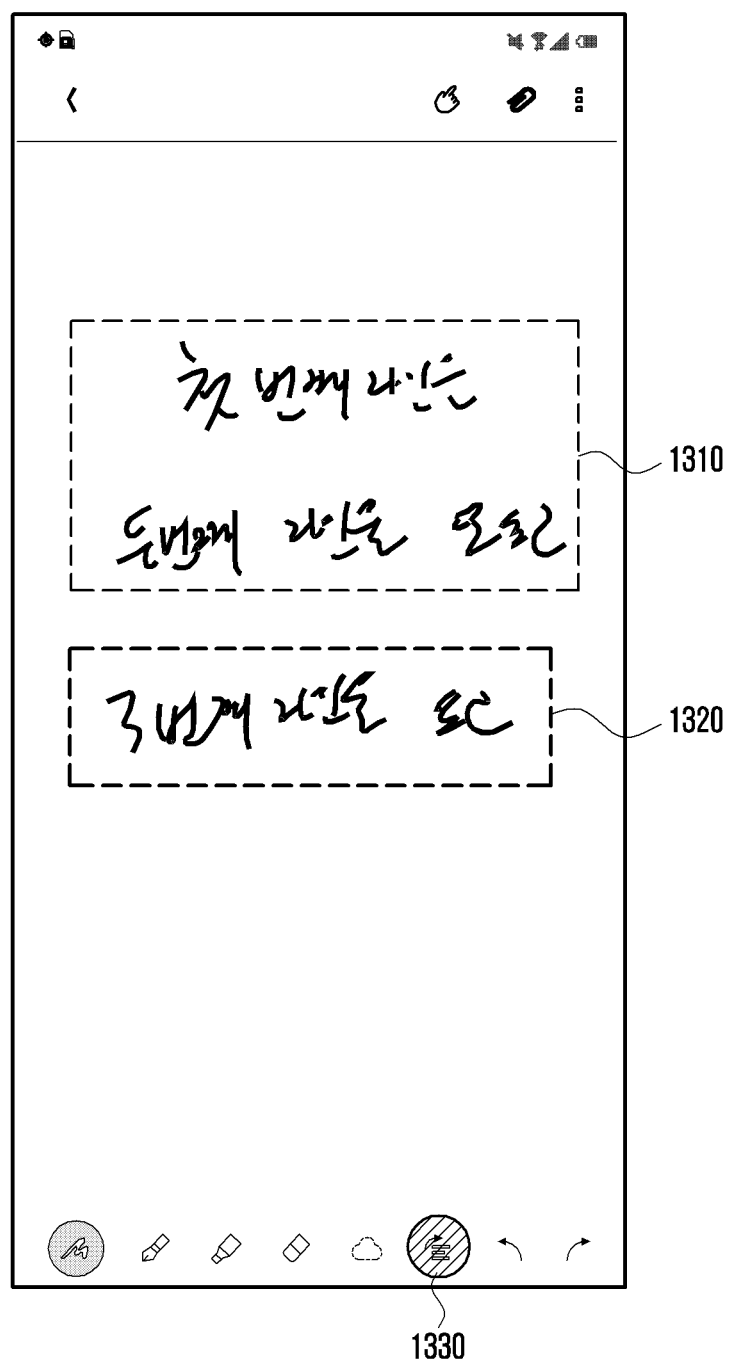
FIGS. 13 to 16 are diagrams explaining an example of an action usable in an electronic device according to various embodiments.

According to an embodiment, FIG. 13 may represent an example of dividing the action in accordance with the user input based on the object 1330 (e.g., alignment object) designated to execute the handwriting alignment, which is provided to a designated area of the execution screen (or note layout) of the application. According to an embodiment, if the first handwriting 1310 is input, and the alignment object 1330 is selected, the electronic device 101 may identify the first action in response to the selection of the alignment object 1330, and may perform the alignment with respect to the first handwriting 1310 related to the first action.

According to an embodiment, if the second handwriting 1320 is input after the first action, and the alignment object 1330 is selected, the electronic device 101 may identify the second action in response to the selection of the alignment object 1330, and may perform the alignment with respect to the second handwriting 1320 related to the second action (e.g., recent action) in a state where the form of the first handwriting 1310 related to the first action is maintained.

Figure 14:
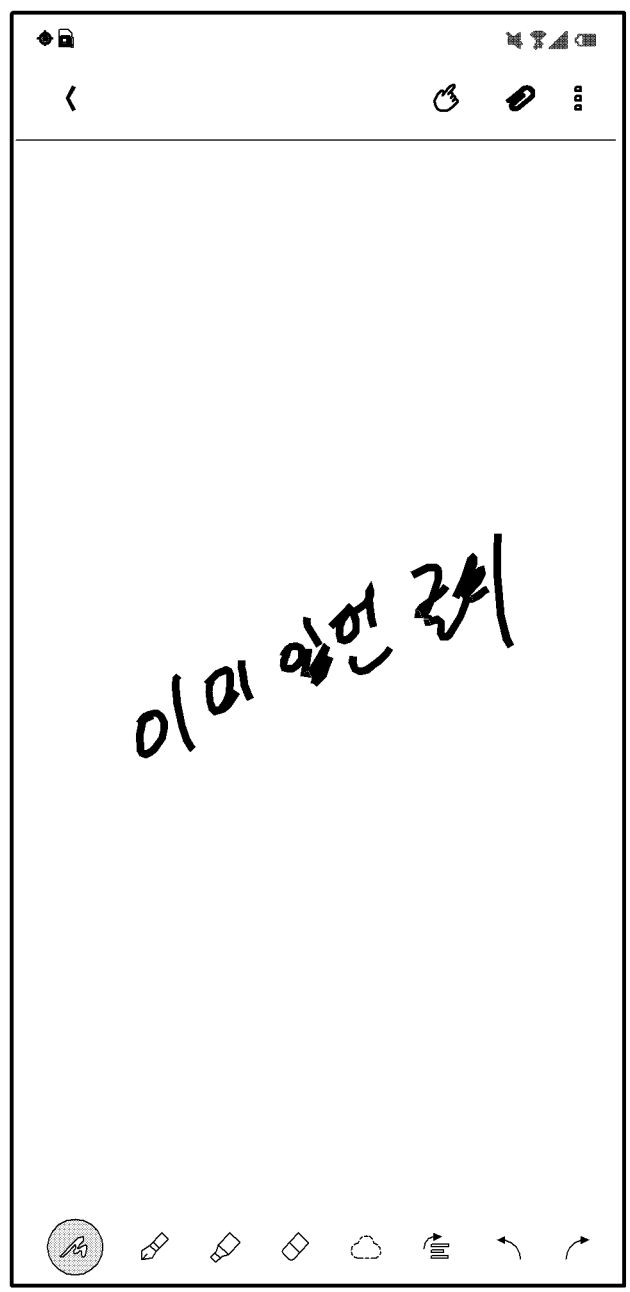

According to an embodiment, FIG. 14 may represent an example when a handwriting work (e.g., note or memo preparation) newly starts through the application. For example, in accordance with the user input to start a new note file or to load a new note file, the actions may be divided.

Figure 15:
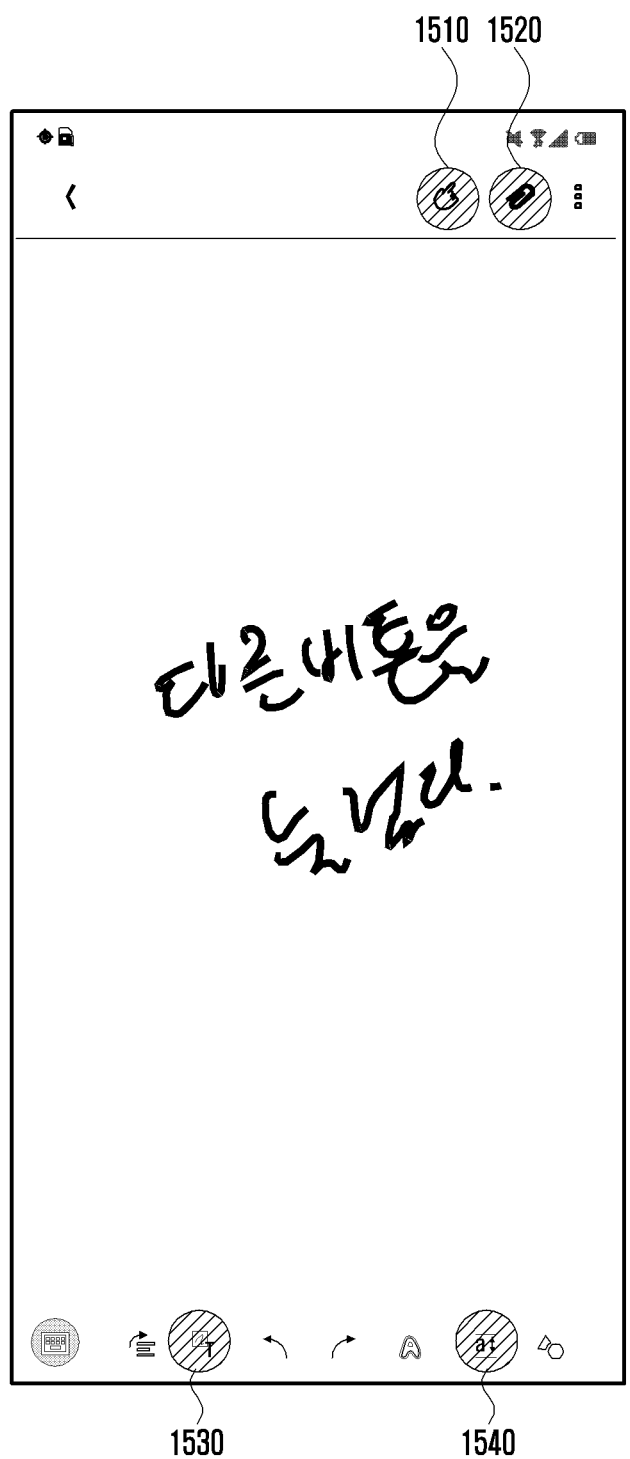

According to an embodiment, FIG. 15 may represent an example when the user performs other functions in addition to the alignment function. For example, in accordance with the user input to execute other functions based on other function objects (e.g., eraser object 1510, clip object 1520, text conversion object 1530, storage object 1540, and/or screen change object) in addition to the alignment object 1330, the actions may be divided. According to an embodiment, if the function objects (e.g., 1510, 1520, 1530, and 1540) corresponding to the user input are selected on the execution screen (or note layout) of the application, the electronic device 101 may identify the action in response to the selection of the function objects 1510, 1520, 1530, and 1540.

According to an embodiment, the electronic device 101 may identify the action when a function object designated to execute other functions (or options) (e.g., other functions in addition to the alignment function) related to the handwriting is selected (e.g., touched) on the execution screen (or note layout).

Figure 16:
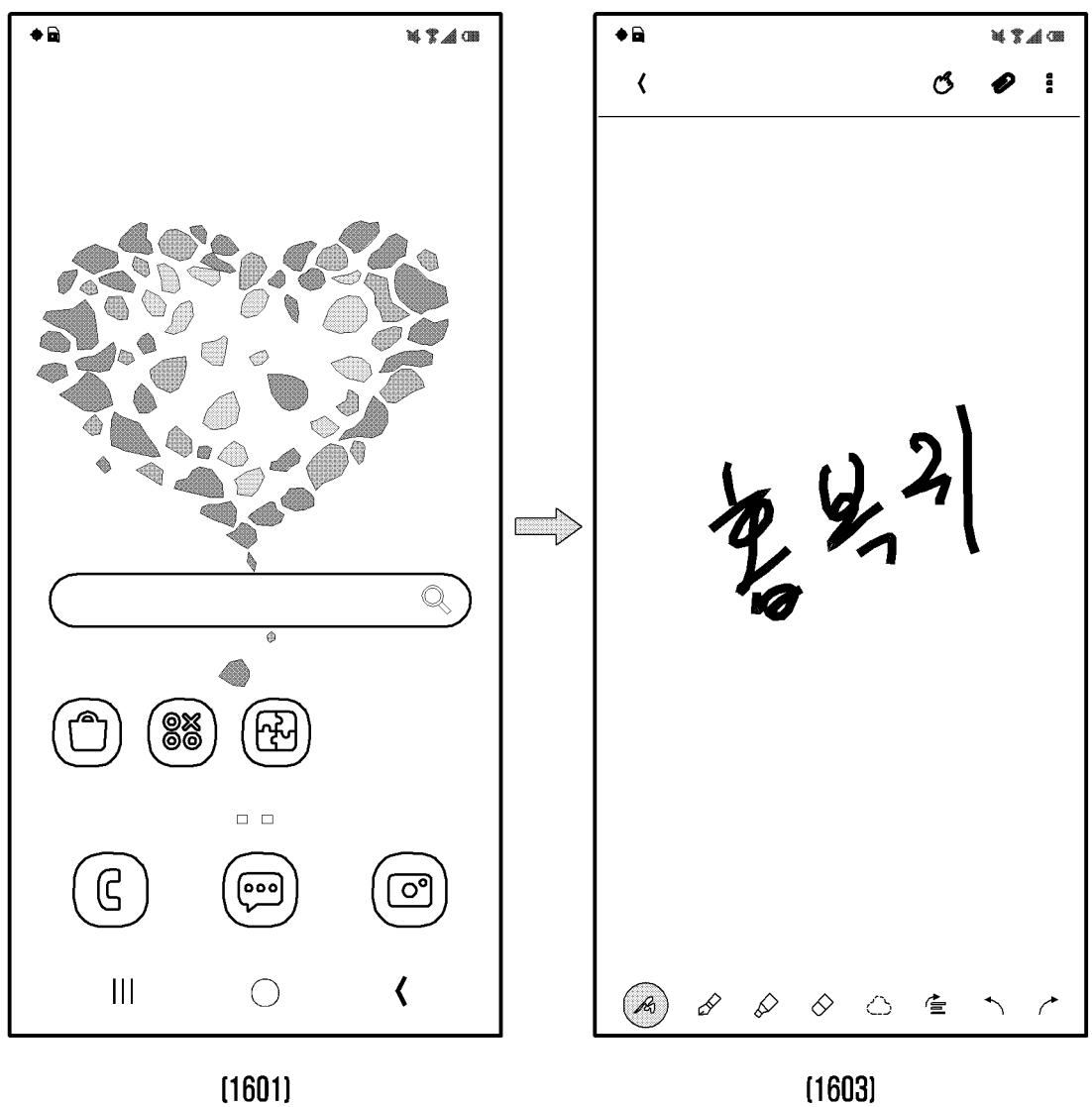

According to an embodiment, FIG. 16 may represent an example in which the action is divided in accordance with the user input to resume the application after a pause. According to an embodiment, as exemplified in FIG. 16, the electronic device 101 may identify the action in response to the user input to return (e.g., example screen 1603) after moving to a home screen (e.g., example screen 1601) while executing the application. According to another embodiment, when resuming after the pause of the application, a screen turn-on/off operation or a recovery operation after focus movement to another application may be included.

Figure 17:
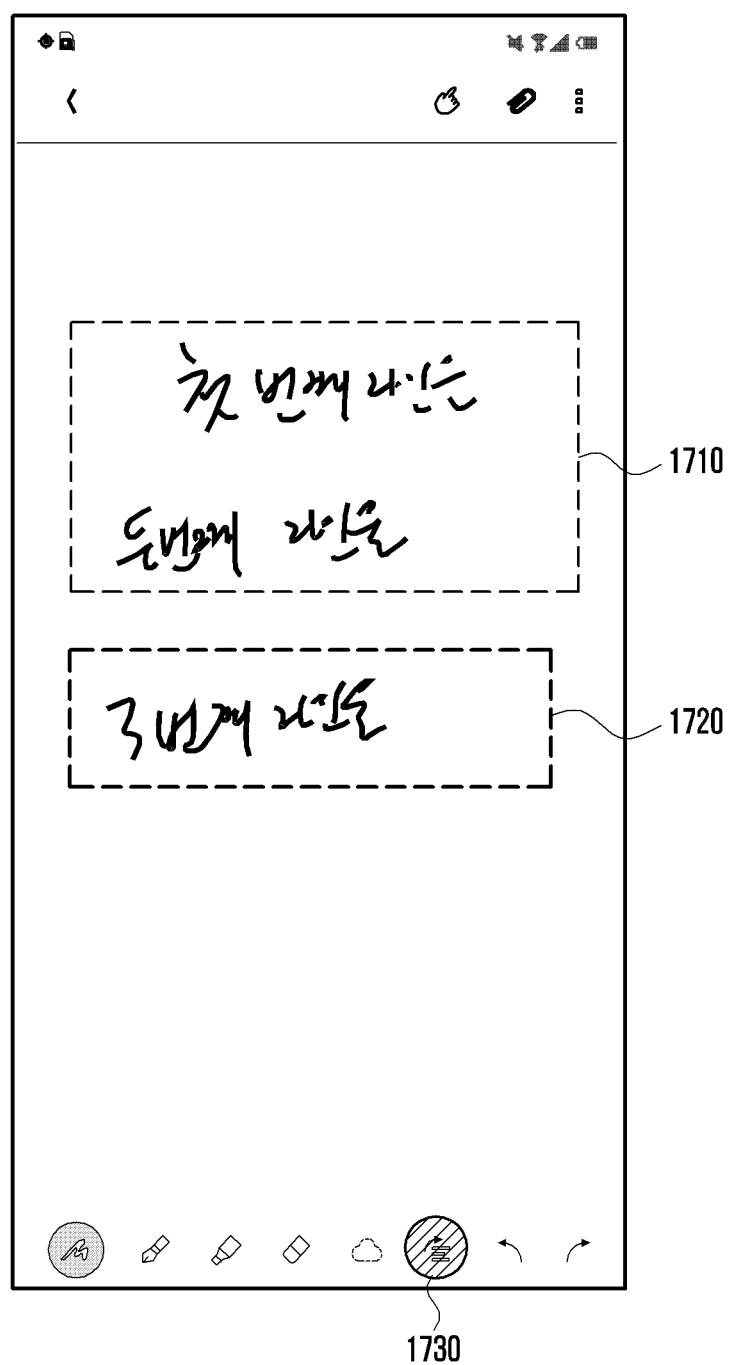
FIGS. 17 to 19 are diagrams explaining an example of dividing an alignment target object in the unit of an action in an electronic device according to various embodiments.
Figure 18:
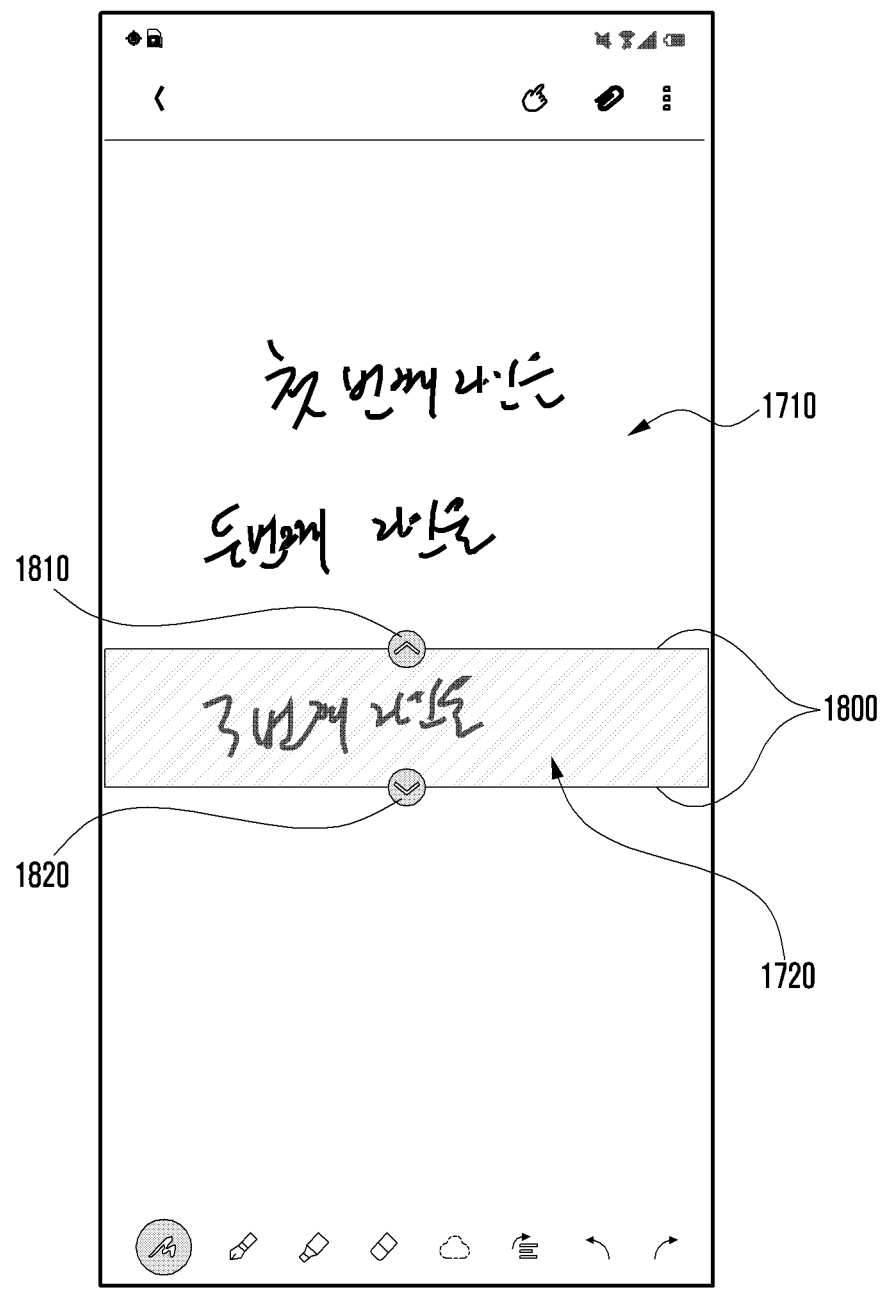
Figure 19:
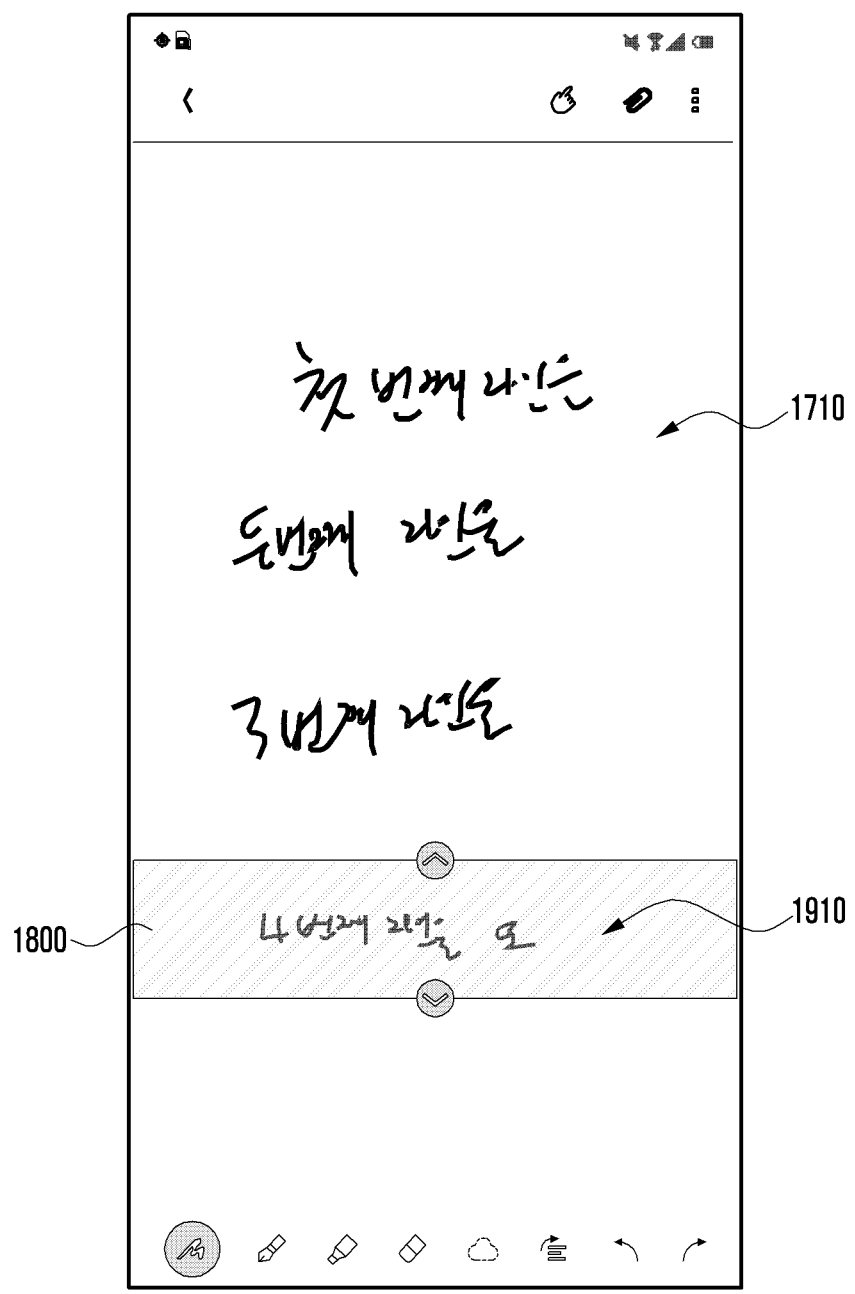

FIGS. 17, 18, and 19 are diagrams explaining an example of dividing an alignment target object in the unit of an action in an electronic device according to one or more embodiments.

According to an embodiment, FIGS. 17, 18, and 19 may represent an example of configuring a target area of interest for alignment based on the handwriting of the recent action in a state where the handwriting of the existing action is maintained.

According to an embodiment, as exemplified in FIG. 17, FIG. 17 may represent an example of a state where a user inputs a first handwriting 1710 composed of two lines (e.g., first line and second line), performs the first action (e.g., alignment command by selecting the alignment object 1730), and then inputs a second handwriting 1720. According to an embodiment, the electronic device 101 may configure the first handwriting 1710 as the first area of interest, and may perform the alignment by designating the first handwriting 1710 corresponding to the first action. According to an embodiment, the user may input the second handwriting 1720 after the first action, and may perform the second action (e.g., the alignment of the second handwriting 1720) based on selecting the alignment object 1730.

According to an embodiment, as exemplified in FIG. 18, FIG. 18 may represent an example of a state where a user inputs the second handwriting 1720 and performs the second action by selecting the alignment object 1730. According to an embodiment, when the second handwriting 1720 is input after the first action, and the second action is performed, the electronic device 101 may not perform the alignment with respect to the first handwriting 1710 (e.g., first line and second line), but may perform the alignment by designating (or targeting) the second handwriting 1720 (e.g., third line).

According to an embodiment, when performing the handwriting alignment by the alignment object 1730, the electronic device 101 may provide a guide object 1800 (or an area of interest object representing the target area of interest) for guiding (or designating) the object of the alignment target to the user.

As exemplified in FIG. 18, the guide object 1800 may be provided in a designated form (e.g., rectangle, ellipse, or geometric shape) including the target object. According to an embodiment, the guide object 1800 may include at least one adjustment object 1810 and 1820 for changing (e.g., extending or reducing) the range (or size) of the area of interest. For example, the user may change the area of interest designated in accordance with the action by the electronic device 101 through upward/downward movement of the adjustment objects 1810 and 1820. According to an embodiment, the user may input the third handwriting 1910 (e.g., as depicted in FIG. 19) after the second action, and may perform the third action based on the alignment object 1730.

According to an embodiment, as exemplified in FIG. 19, FIG. 19 may represent an example of a state where a user inputs the third handwriting 1910 and performs the third action by selecting the alignment object 1730. According to an embodiment, when the third handwriting 1910 is input after the second action, and the third action is performed, the electronic device 101 may not perform the alignment with respect to the first handwriting 1710 (e.g., first line and second line) and the second handwriting 1720 (e.g., third line), but may perform the alignment by designating (or targeting) the third handwriting 1910 (e.g., fourth line). According to an embodiment, when performing the handwriting alignment by selecting the alignment object 1730, the electronic device 101 may provide the guide object 1800 (or an area of interest object representing the target area of interest) for guiding (or designating) the object of the alignment target to the user.

Figure 20:
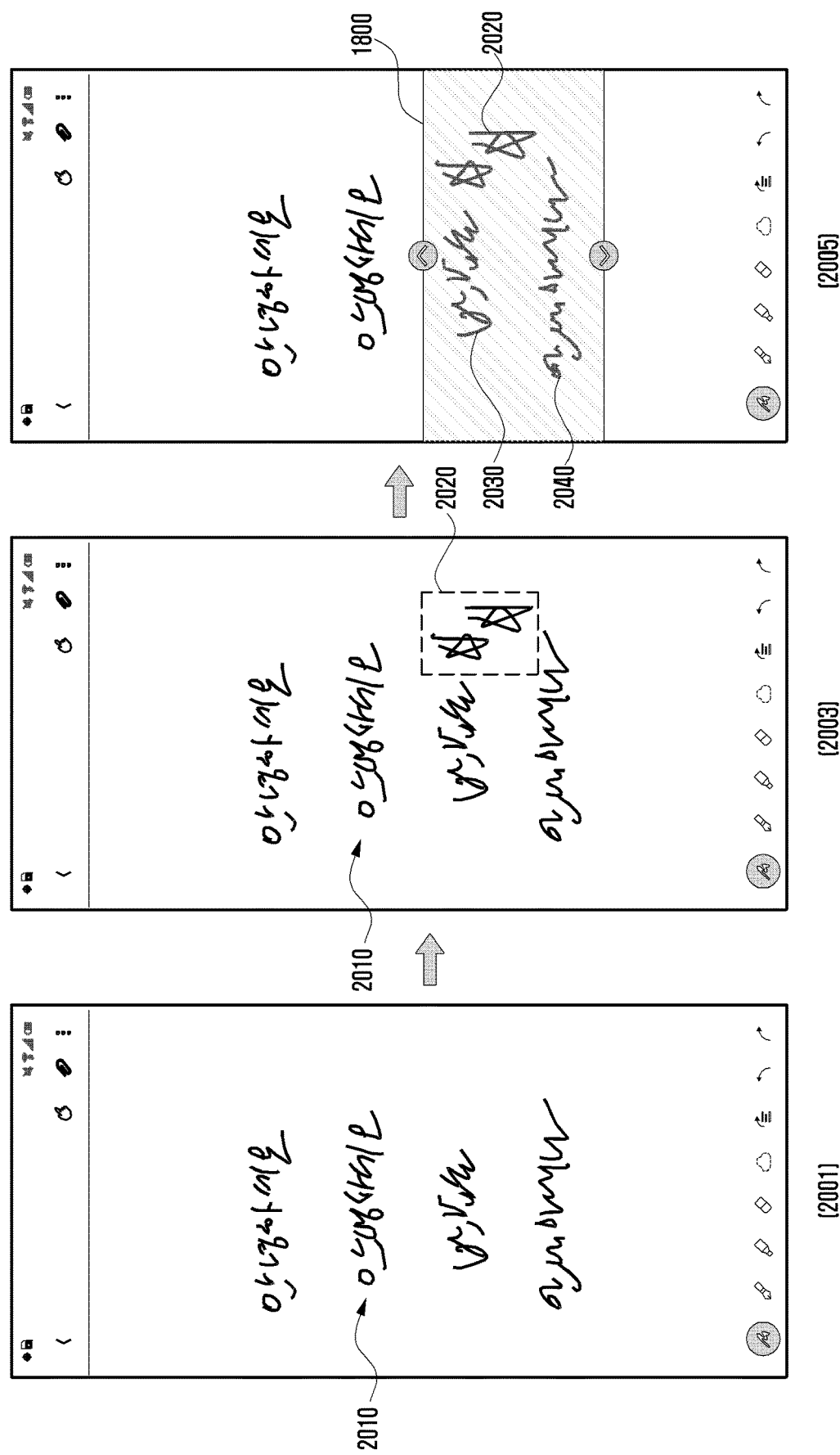
FIG. 20 is a diagram explaining an example of configuring a target area of interest in an electronic device according to various embodiments.

FIG. 20 is a diagram explaining an example of configuring a target area of interest in an electronic device according to one or more embodiments.

According to an embodiment, FIG. 20 may represent an example of configuring (extending) the target area of interest so as to include the object of the line crossing the area of interest as exemplified in FIG. 10 in the alignment target object. For example, FIG. 20 may represent an example of configuring at least a part (e.g., line) of the handwriting of the existing action as the target area of interest for the handwriting alignment in association with the handwriting of the recent action. According to an embodiment, FIG. 20 may represent an example when one area of interest (e.g., DirtyRect) is being configured in accordance with the recent action.

With reference to FIG. 20, as exemplified in an example screen 2001, the user may input the first handwriting 2010 composed of four lines, and may perform the alignment of the first handwriting 2010 by performing the first action (e.g., alignment command). As exemplified in an example screen 2003, the user may input the second handwriting 2020 after the first action near or overlapping at least one line of the first handwriting 2010. According to an embodiment, the user may perform the second action (e.g., alignment command) after inputting the second handwriting 2020.

As exemplified in an example screen 2005, if the second handwriting 2020 is input, and the second action is performed, the electronic device 101 may perform the handwriting alignment based on the second handwriting 2020 and the lines (e.g., third line and fourth line, or the object thereof) related to (or crossing) the second handwriting 2020. For example, the target object being aligned with respect to the second action may be the second handwriting 2020. In one or more embodiments, when the second handwriting 2020 is aligned corresponding to the second action, the second handwriting 2020 according to the second action and at least a part of another object (e.g., first handwriting 2010 mapped onto the previous first action) related to the second handwriting may be included together as the alignment target object. For example, the electronic device 101 may configure the target area of interest by including the second handwriting 2020 and at least one other object crossing the second handwriting 2020.

According to an embodiment, when deriving the second action, the electronic device 101 may determine whether the first handwriting 2010 of the first action crosses the second handwriting 2020 of the second action by analyzing the lines of the first handwriting 2010 of the first action. For example, the electronic device 101 may perform the alignment by including the line of the handwriting of the previous action that crosses the area of interest (e.g., DirtyRect) of the handwriting of the recent action in the recent action. For example, as exemplified in the example screen 2005, the electronic device 101 may identify that the third line 2030 and the fourth line 2040 of the first handwriting 2010 of the first action cross the area of interest (e.g., DirtyRect) of the second handwriting 2020.

According to an embodiment, the electronic device 101 may determine the corresponding lines (e.g., third line 2030 and the fourth line 2040) if the first handwriting 2010 crossing the area of interest of the second handwriting as a valid line (e.g., valid line=true), and may configure the second handwriting 2020 and the valid line together as the target area of interest. For example, as exemplified in the example screen 2005, the electronic device 101 may configure the target area of interest through extension so that the area of interest for the second handwriting 2020 includes the valid lines (e.g., third line 2030 and the fourth line 2040). According to an embodiment, the electronic device 101 may perform the alignment with respect to the target objects (e.g., the object of the second handwriting 2020 and the object of the valid line) of the target area of interest.

Figure 21:
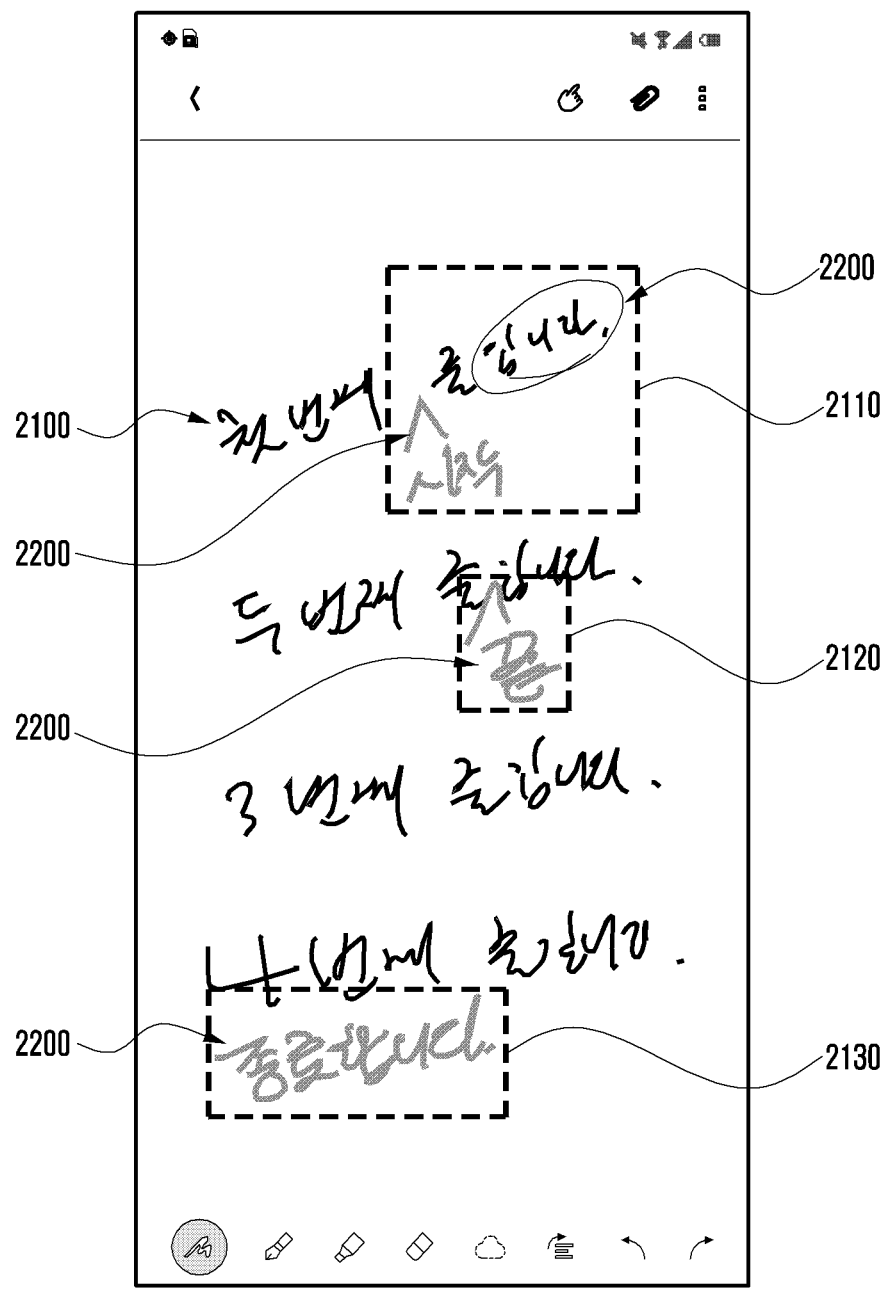
FIGS. 21 and 22 are diagrams explaining an example of configuring a target area of interest in an electronic device according to various embodiments.
Figure 22:
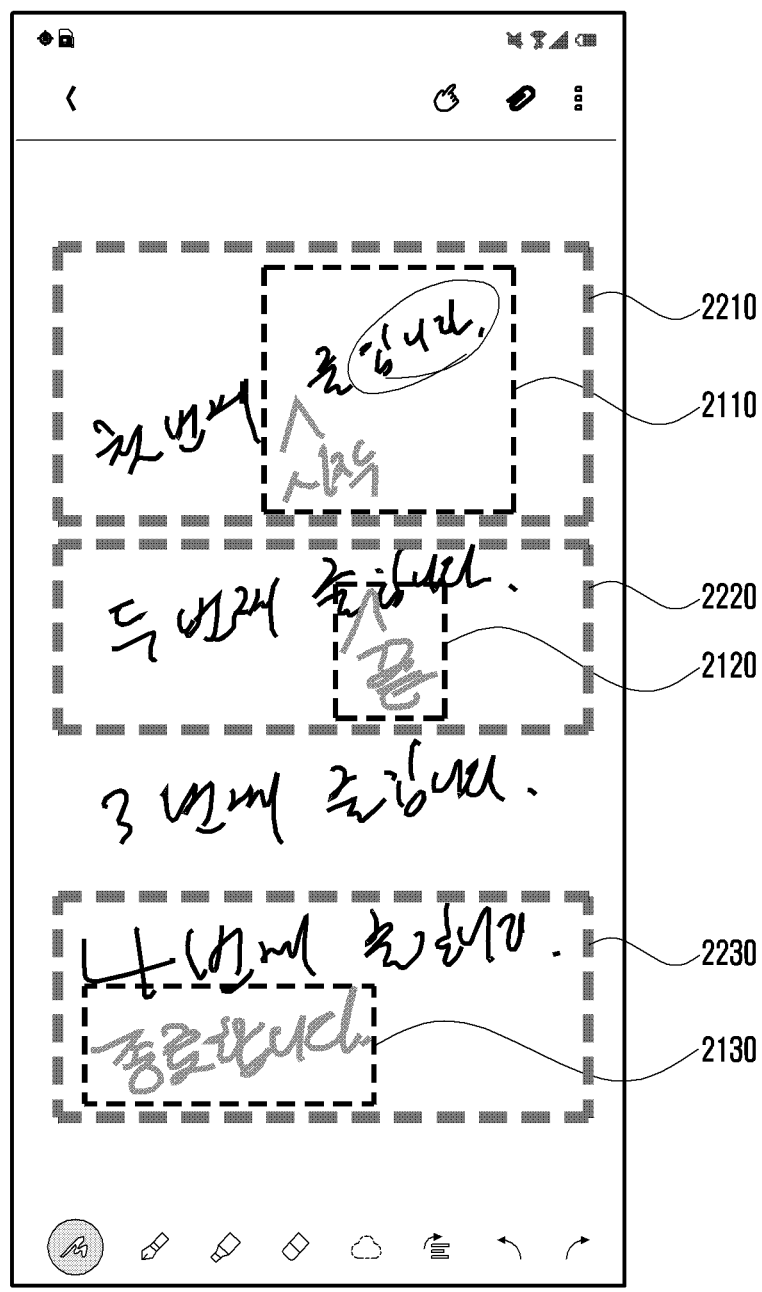

FIGS. 21 and 22 are diagrams explaining an example of configuring a target area of interest in an electronic device according to one or more embodiments.

According to an embodiment, FIGS. 21 and 22 may represent an example of configuring (extending) the target area of interest so as to include the object of the line crossing the area of interest as exemplified in FIG. 10 in the alignment target object. For example, FIGS. 21 and 22 may represent an example of configuring at least a part (e.g., line) of the handwriting of the existing action as the target area of interest for the handwriting alignment in association with the handwriting of the recent action. According to an embodiment, FIGS. 21 and 22 may represent an example where a plurality of areas of interest (e.g., DirtyRect) are being configured in accordance with the second action.

As exemplified in FIG. 21, the user may input the first handwriting 2100 composed of four lines, perform the first action, and then input the second handwriting 2200 crossing (or overlapping) the first handwriting 2100. According to an embodiment, the electronic device 101 may block and divide the second handwriting 2200 into a plurality of blocks (e.g., first block 2110, second block 2120, and third block) as described in the above description with reference to FIGS. 7, 8, and 9.

According to an embodiment, when the first handwriting 2100 composed of four lines is input, the first action is performed, and the second handwriting 2200 is input, the electronic device 101 may virtually configure the first block 2110, the second block 2120, and the third block 2130 that are displayed as dotted rectangles by designating the objects or object groups corresponding to the second handwriting 2200. For example, the first block 2110, the second block 2120, and the third block 2130 may represent three clusters at distances equal to or larger than the average delta. According to an embodiment, the dotted rectangles in FIGS. 21 and 22 are illustrated for explanation, and may not actually be seen. According to an embodiment, each of the plurality of blocks 2110, 2120, and 2130 may represent the DirtyRect (e.g., area of interest). For example, the electronic device 101 may configure the second area of interest related to the second action based on the plurality of DirtyRects.

As exemplified in FIG. 22, when configuring the second area of interest, the electronic device 101 may configure the target area of interest by including at least one object (or line) related to each DirtyRect among the first handwriting 2100 designated as the first area of interest. For example, as exemplified in FIG. 22, if the second handwriting 2200 is input, and the second action is performed, the electronic device 101 may configure a plurality of target areas of interest 2210, 2220, and 2230 based on the second handwriting 2200 and the lines (e.g., first line, second line, and fourth line of the first handwriting 2100, or the object thereof) related to (or crossing) the second handwriting 2200.

According to an embodiment, when deriving the second action, the electronic device 101 may determine whether the first handwriting 2100 of the first action crosses the second handwriting 2200 of the second action by analyzing the lines of the first handwriting 2100 of the first action. For example, the electronic device 101 may perform the alignment by including the line of the handwriting of the previous action that crosses the area of interest (e.g., DirtyRect) of the handwriting of the recent action in the recent action. For example, as exemplified in FIG. 22, the electronic device 101 may identify that the first line, the second line, and the fourth line of the first handwriting 2100 cross the respective areas of interest 2110, 2120, and 2130 (e.g., DirtyRect) of the second handwriting 2200.

According to an embodiment, the electronic device 101 may determine the corresponding lines (e.g., first line, second line, and fourth line) of the first handwriting 2100 that cross the area of interest of the second handwriting 2200 as a valid line (e.g., valid line=true), and may configure the second handwriting 2200 and the valid line together as the target areas of interest 2210, 2220, and 2230. For example, as exemplified in FIG. 22, the electronic device 101 may configure the target areas of interest 2210, 2220, and 2230 through extension so that the area of interest for the second handwriting 2200 includes the valid lines (e.g., first line, second line, and fourth line of the first handwriting 2100). According to an embodiment, the electronic device 101 may perform the alignment with respect to the target objects (e.g., the object of the second handwriting 2200 and the object of the valid lines) of the target areas of interest 2210, 2220, and 2230.

Figure 23:
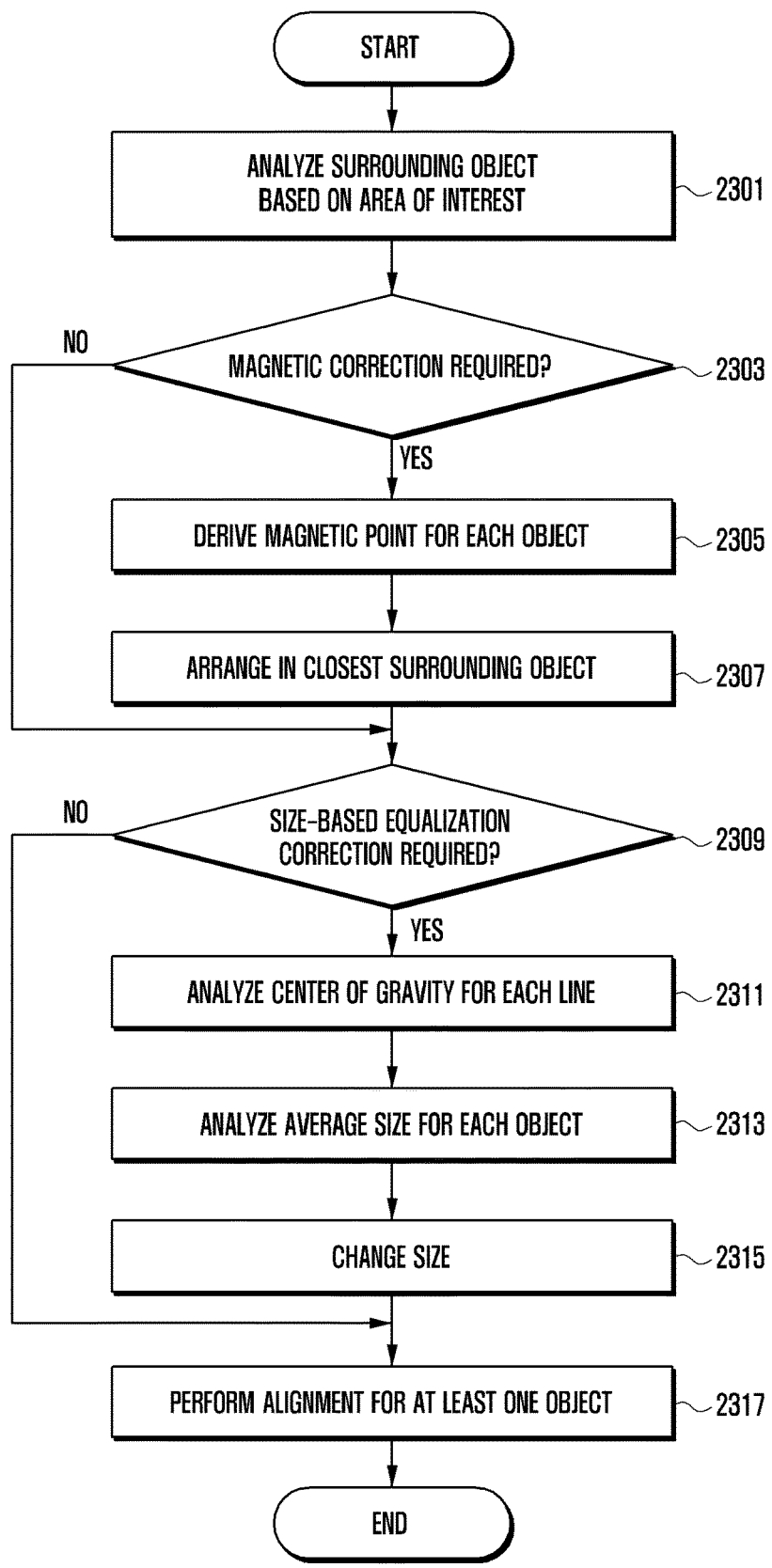
FIG. 23 is a flowchart illustrating an operation of an electronic device according to various embodiments.

FIG. 23 is a flowchart illustrating an operation of an electronic device according to one or more embodiments.

According to an embodiment, FIG. 23 may represent an example of correcting the handwriting divided in the unit of an action. According to an embodiment, the electronic device 101 may provide line correction and/or size correction with respect to the target object of the alignment target by using the action-divided characteristic. For example, the electronic device 101 may provide various alignments, such as a slope correction (e.g., deskew) of handwriting, location alignment (e.g., indentation) of the handwriting for each line, line spacing alignment of the handwriting, letter size (e.g., height) normalization, and/or harmony arrangement of a non-text (e.g., underline, figure, sketch, and/or drawing). According to an embodiment, the processor 120 may identify whether there is the handwriting of the previous action that crosses (or overlaps) and/or approaches the handwriting-based area of interest (e.g., DirtyRect) of the recent action. For example, the processor 120 may determine whether there is a line being relatable to the area of interest.

With reference to FIG. 23, in step 2301, the processor 120 of the electronic device 101 may analyze the surrounding object based on the area of interest related to the recent action. According to an embodiment, the processor 120 may identify whether there is the handwriting of the previous action that crosses (or overlap) and/or approaches the handwriting-based area of interest (e.g., DirtyRect) of the recent action. For example, the processor 120 may determine whether there is a line relatable to the area of interest.

In step 2303, the processor 120 may determine whether magnetic correction (or configuration) is necessary based on the result of analyzing the surrounding object. According to an embodiment, if the handwriting (e.g., handwriting on which at least a part of the line crosses or approaches the DirtyRect) of the previous action that crosses or approaches the area of interest is identified, the processor 120 may determine to perform the magnetic correction. A magnetic correction operation according to an embodiment will be described in detail with reference to the drawings to be described later.

In the step 2303, if the magnetic correction is not necessary (e.g., "No" in step 2303), the processor 120 may proceed with step 2309, and may perform operations below the step 2309.

In the step 2303, if the magnetic correction is necessary (e.g., "Yes" in step 2303), the processor 120, in step 2305, may derive magnetic points for each object. The magnetic points according to an embodiment will be described in detail with reference to the drawings to be described later.

In step 2307, the processor 120 may move and arrange the target object of the area of interest to the nearest surrounding object based on the magnetic points. According to an embodiment, the processor 120 may identify the nearest surrounding object based on the magnetic points, and may perform the line correction to match the lines between the surrounding object and the target object by moving the target object to the nearest surrounding object. The line correction according to an embodiment will be described in detail with reference to the drawings to be described later.

In the step 2309, the processor 120 may determine whether size-based equalization correction is necessary. According to an embodiment, the processor 120 may compare the size of the handwriting of the previous action that crosses or approaches the area of interest with the size of the target object, and if there is a difference that is equal to or larger than a predetermined value between them, the processor 120 may determine to process the size-based equalization correction.

In the step 2309, if the size-based equalization correction is not necessary (e.g., "No" in step 2309), the processor 120 may proceed with step 2317, and may perform operations of the step 2317.

In the step 2309, if the size-based equalization correction is necessary (e.g., "Yes" in step 2309), the processor 120, in step 2311, may analyze the center of gravity for each line. According to an embodiment, the processor 120 may identify the center of gravity of the line (or surrounding object) corresponding to the handwriting of the existing action and the center of gravity of the target object corresponding to the handwriting of the recent action.

In step 2313, the processor 120 may analyze an average size for each object. According to an embodiment, the processor 120 may analyze an average size of the surrounding object based on the center of gravity of the surrounding object, and may identify the average size of the target object based on the center of gravity of the target object.

In step 2315, the processor 120 may change the size of the target object. According to an embodiment, the processor 120 may compare the average size of the surrounding object with the average size of the target object, and if there is a deviation, the processor 120 may perform size correction to match (or change) the average size of the target object with the size corresponding to the average size of the surrounding object. According to an embodiment, the processor 120 may further perform the line correction to move and arrange the location of the target object corresponding to the size change of the target object. The size correction according to an embodiment will be described in detail with reference to the drawings to be described later.

In step 2317, the processor 120 may perform the alignment with respect to at least one object. According to an embodiment, the processor 120 may configure the target area of interest including the line-corrected and/or size-corrected target object and the surrounding object, and may perform the handwriting alignment with respect to all objects in the target area of interest.

According to an embodiment, although FIG. 23 illustrates that the line correction operation and the size correction operation are sequentially performed. The line correction operation and the size correction operation are not limited to the illustrated order, but may be performed in parallel, in reverse order, or heuristically.

Figure 24:
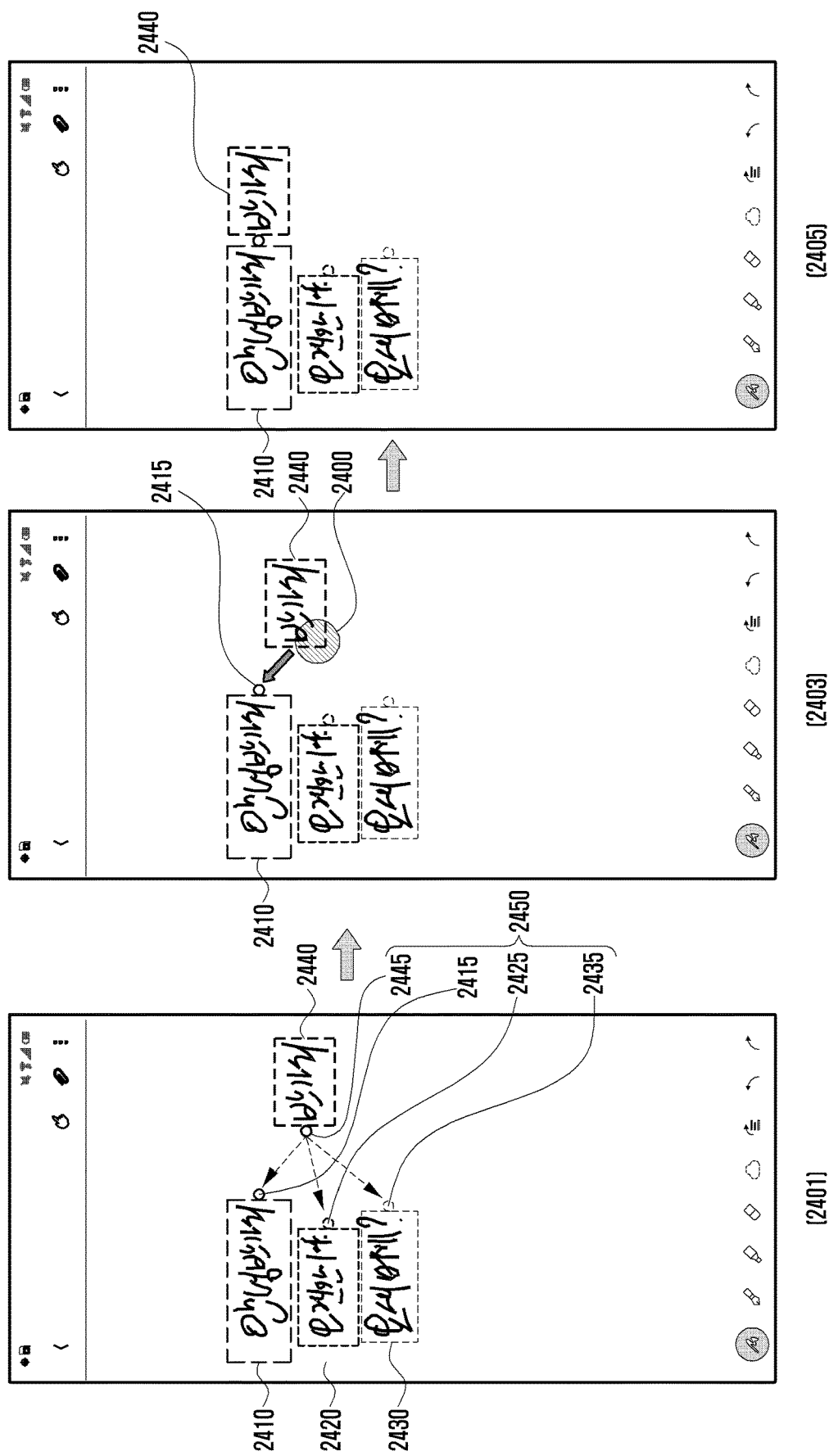
FIG. 24 is a diagram explaining an example of line correction in an electronic device according to various embodiments.

FIG. 24 is a diagram explaining an example of line correction in an electronic device according to one or more embodiments.

According to an embodiment, FIG. 24 may represent an example of providing line correction for handwritings for each action unit based on a magnetic user interface (UI).

With reference to FIG. 24, as exemplified in an example screen 2101, the user may input a second handwriting 2440 in relation to (or near) at least one line of first handwritings 2410, 2420, and 2430 after the first handwritings 2410, 2420, and 2430 according to the previous action (e.g., first action). According to an embodiment, the user may input the second handwriting 2440, and may perform a second action (e.g., alignment command).

According to an embodiment, if the second action (e.g., alignment command) is sensed, the electronic device 101 may determine whether to perform line correction automatically or manually. According to an embodiment, as exemplified in FIG. 23, the electronic device 101 may determine whether to perform magnetic correction, and based on the result of determination, may automatically perform the line correction. According to an embodiment, the electronic device 101 may divide the actions, and if a plurality of actions exists, the electronic device 101 may make the line correction be manually performed by the user by providing a magnetic user interface as exemplified in an example screen 2401 when executing the recent action (e.g., alignment command). For example, the electronic device 101 may create and provide magnetic points 2450 of a specific shape (e.g., circle, rhombus, ellipse, or rectangle) based on the first handwritings 2410, 2420, and 2430 and the second handwriting 2440 (or DirtyRect corresponding to each handwriting).

According to an embodiment, the electronic device 101 may create magnetic points for each line of the handwritings 2410, 2420, 2430, and 2440. For example, the electronic device 101 may separate the lines with respect to all the handwritings 2410, 2420, 2430, and 2440 related to the previous action and the recent action, and may create the magnetic points 2415, 2425, 2435, and 2445 for each line (or object). According to an embodiment, on example screens 2401, 2403, and 2405, the magnetic points 2415, 2425, 2435, and 2445 and dotted rectangles are illustrated for explanation, and may be visually displayed or may not be displayed. For example, the magnetic points 2415, 2425, 2435, and 2445 may be visually displayed for user recognition (e.g., in case of a manual line correction), or the magnetic points 2415, 2425, 2435, and 2445 may be internally used, and may not be displayed for associated line determination of the respective objects (e.g., in case of an automatic line correction).

According to an embodiment, as exemplified in an example screen 2403, the user may move (e.g., drag, swipe, and/or flick) to a location designated by the user (e.g., location of a certain line (or object) among the first handwritings 2410, 2420, and 2430 corresponding to the previous action) by selecting (e.g., touching 2400) the second handwriting 2440 (or object) corresponding to the recent action. For example, the user may perform the user input to move (e.g., drag) the second handwriting 2440 in a line (e.g., first line 2410) direction of a specific location among the first handwritings 2410, 2420, and 2430 in a state where the user touches 2400 of the second handwriting 2440.

According to an embodiment, based on the user input, the electronic device 101 may move the second handwriting 2440 in a direction of the line of the first handwriting 2410 designated by the user, and may automatically append the second handwriting 2440 to the corresponding line of the first handwriting 2410 near (e.g., in a designated distance range) the corresponding line 2410. According to an embodiment, the electronic device 101 may visually provide a process of appending the second handwriting 2440. According to an embodiment, the result of appending the second handwriting 2440 to the corresponding line of the first handwriting 2410 (e.g., the result of line correction) is illustrated on the example screen 2405.

As exemplified in the example screen 2405, the second handwriting 2440 of the recent action may be aligned (e.g., line spacing alignment (e.g., line spacing) and location alignment (e.g., indentation)) and appended to the designated line of the first handwriting 2410 among the first handwritings 2410, 2420, and 2430 of the previous action.

According to an embodiment, in FIG. 24, an example of providing the line correction manually by the user input has been described based on a magnetic user interface, but is not limited by one or more embodiments. For example, without visual display (e.g., display of magnetic points) of the magnetic user interface as exemplified in FIG. 24, the electronic device 101 may internally determine whether to perform the magnetic correction as exemplified in FIG. 23, and may automatically append and align the handwriting objects by using the magnetic points based on the result of the determination. For example, the electronic device 101 may provide user experience (UX) in that the lines of the handwriting of the previous action are separated, and the handwriting of the recent action is dragged in the location close to the handwriting of the previous action, and is appended to the location adjacent to the handwriting (e.g., line of the target) of the previous action (e.g., magnetic effect). Examples thereof will be described with reference to FIGS. 25 to 28.

FIGS. 25 to 28 are diagrams explaining an operation example of line correction in an electronic device according to various embodiments.

According to an embodiment, in FIGS. 25, 26, 27, and 28, magnetic points 2450 and a rectangular box are illustrated for explanation, but may not be displayed on an actual screen.

Figure 25:
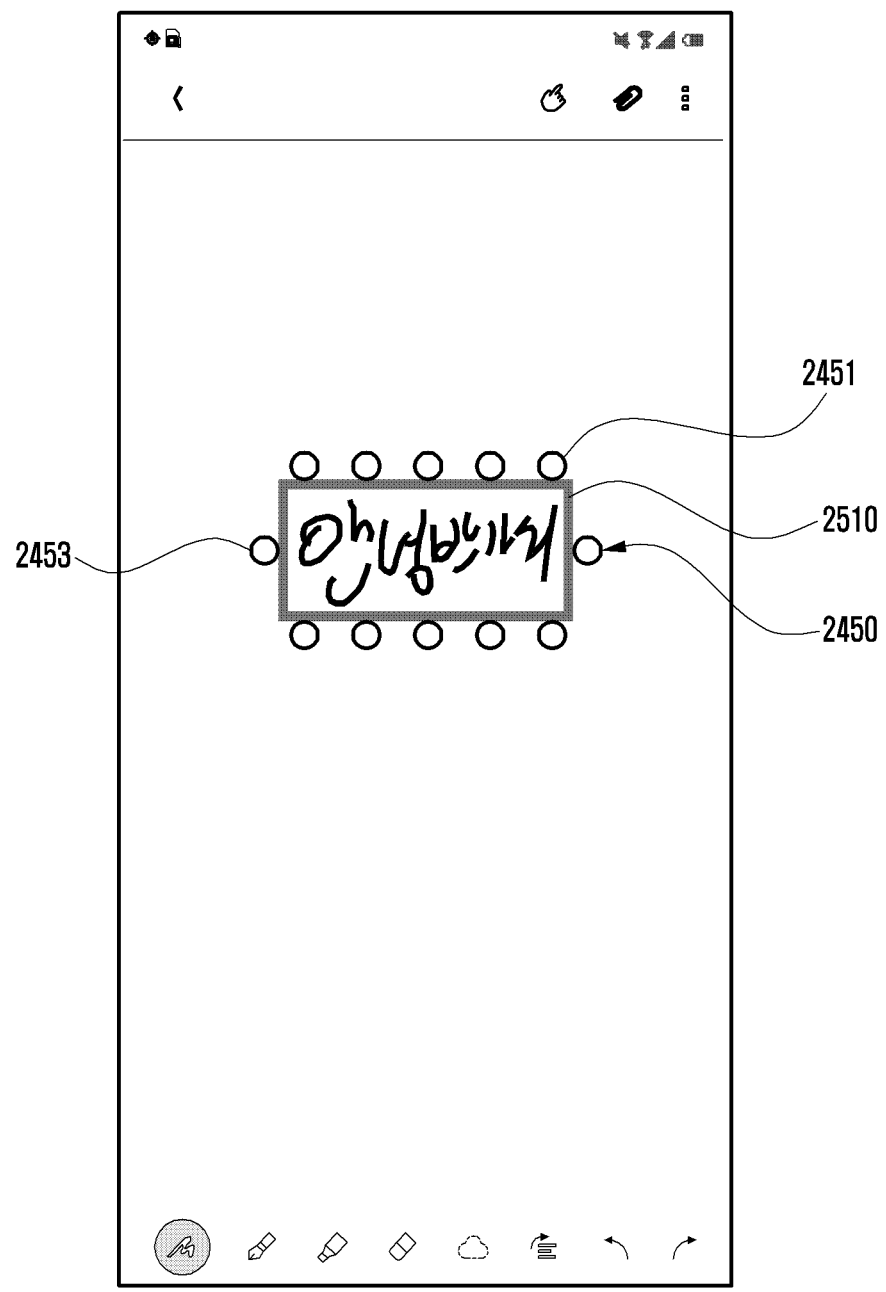
FIGS. 25 to 28 are diagrams explaining an operation example of line correction in an electronic device according to various embodiments.

According to an embodiment, FIG. 25 may represent an example of creating the magnetic points 2450 on the handwriting 2510 (e.g., object). As exemplified in FIG. 25, the magnetic points 2450 may be created to include, for example, at least one magnetic point 2451 at the top and the bottom in a vertical direction of the handwriting 2510, and each magnetic point 2453 on the left and the right in a horizontal direction. According to an embodiment, the magnetic points 2450 may include a plurality of magnetic points in the horizontal direction and/or the vertical direction in accordance with the length and/or the height of the handwriting 2510 (e.g., object). According to an embodiment, the magnetic points 2450 may include a shape surrounding the handwriting 2510 based on the outermost (e.g., perimeter) of the handwriting 2510.

Figure 26:
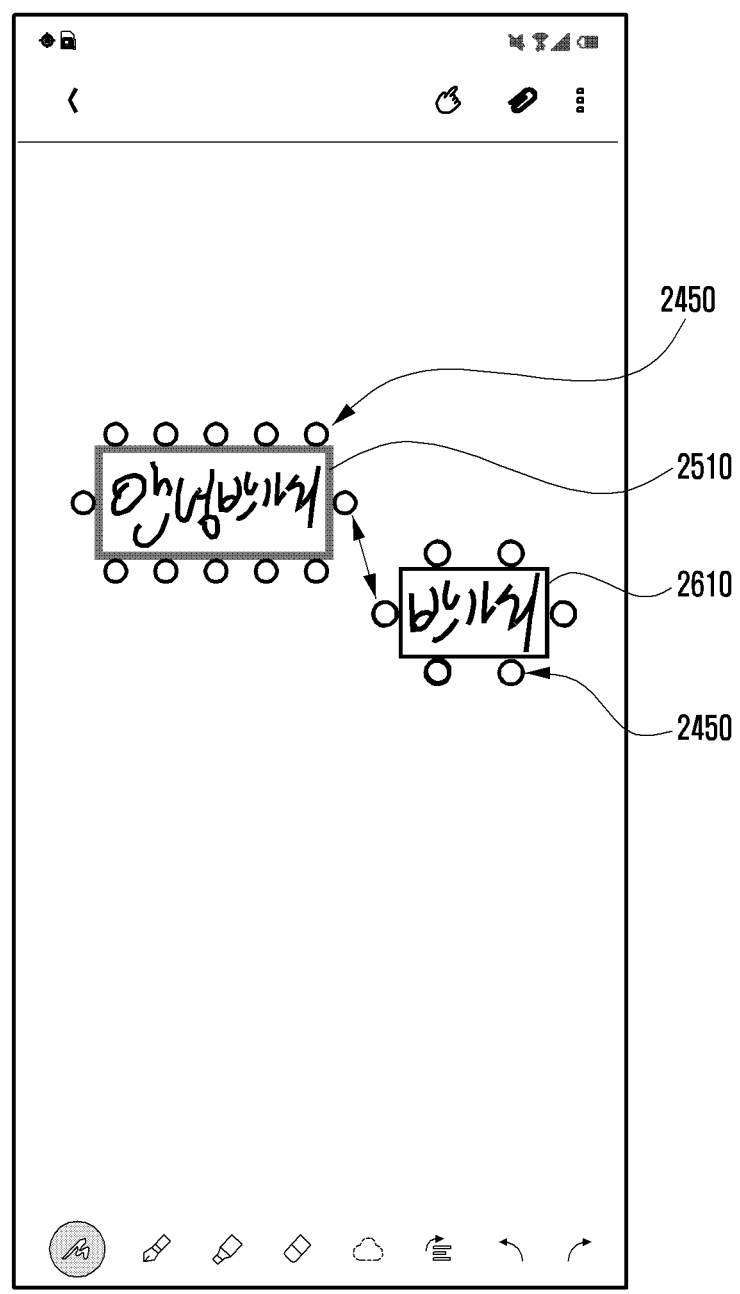

According to an embodiment, FIG. 26 may represent a state where a new handwriting 2610 (hereinafter, second handwriting 2610) is input after the existing handwriting 2510 (hereinafter, first handwriting 2510). For example, as exemplified in FIG. 26, the second handwriting 2610 may be input near the first handwriting 2510.

According to an embodiment, if the second handwriting 2610 is input, the magnetic points 2450 may be created based on the first handwriting 2510 and the second handwriting 2610. According to an embodiment, if the second handwriting 2610 is input near the first handwriting 2510, magnetic points of the append target may be determined based on distances between the magnetic points of the first handwriting 2510 and the magnetic points of the second handwriting 2610. For example, the electronic device 101 may determine, one by one, the magnetic points having the closest Euclidean distance between the magnetic points of the first handwriting 2510 and the magnetic points of the second handwriting 2610 for the handwritings 2510 and 2610. An example thereof is illustrated in FIG. 27.

Figure 27:
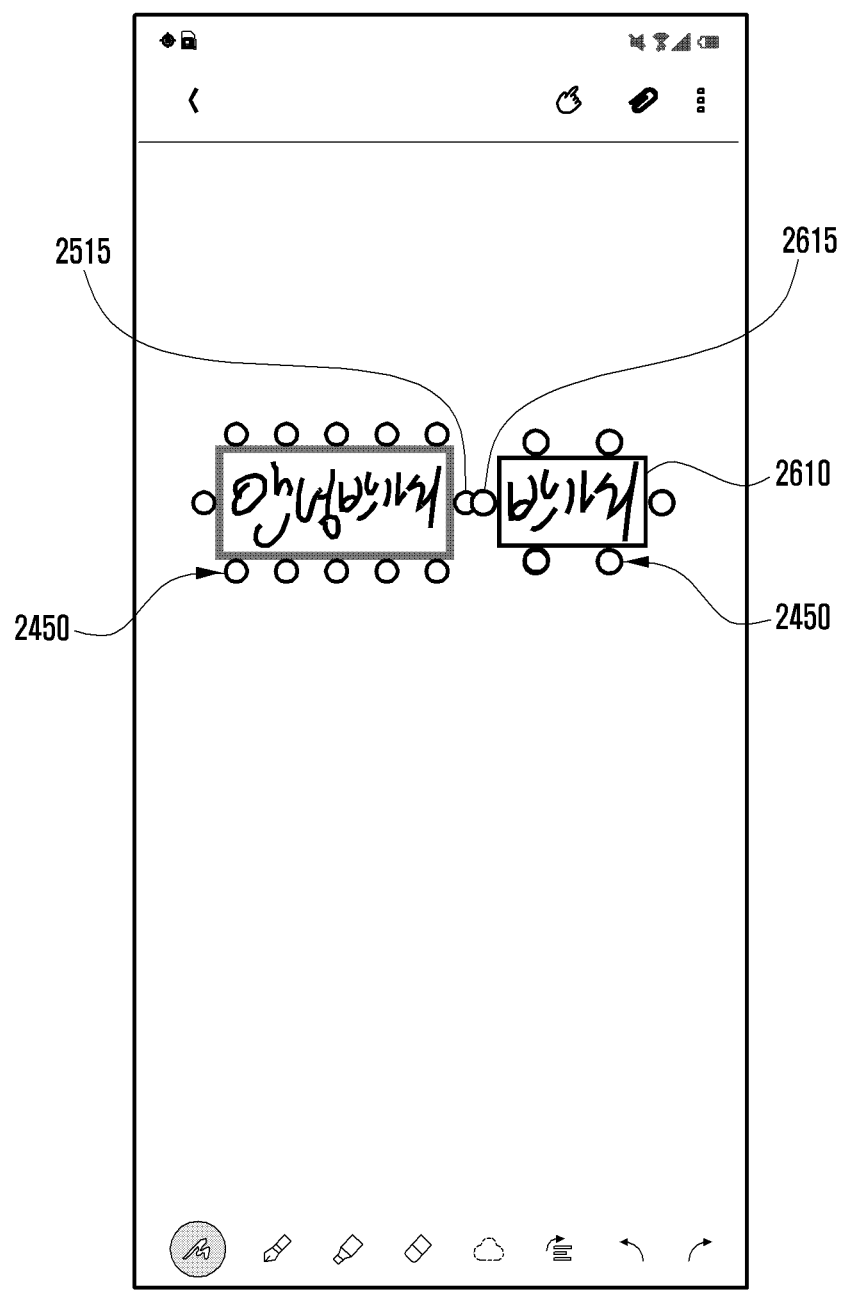

According to an embodiment, as exemplified in FIG. 27, FIG. 27 may represent an example in which it is determined that the horizontal direction (e.g., right magnetic point 2515) among the magnetic points 2450 of the first handwriting 2510 and the horizontal direction (e.g., left magnetic point 2615) among the magnetic points 2450 of the second handwriting 2610 are closest to each other in the Euclidean distance. For example, the second handwriting 2610 may be aligned and appended to the right side of the first handwriting 2510.

Figure 28:
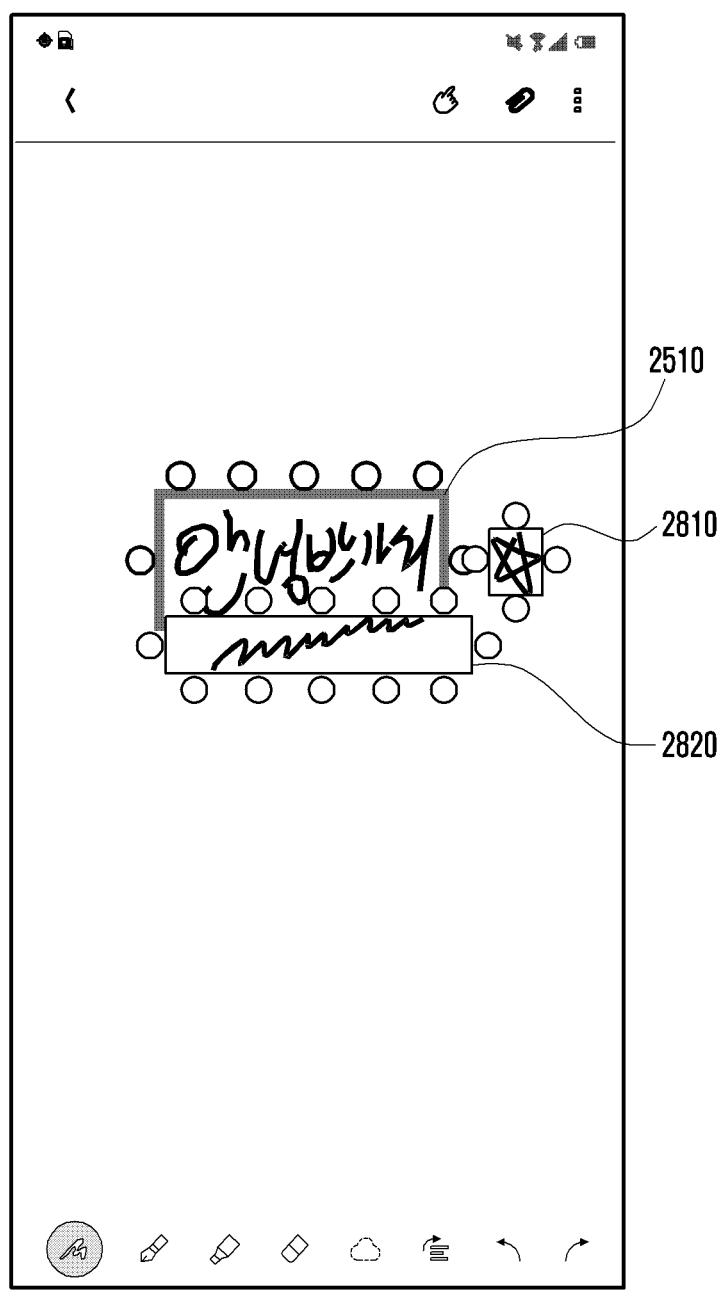

According to an embodiment, FIG. 28 may represent a state where new non-text based handwritings 2810 and 2820 (hereinafter, third handwritings 2810 and 2820) are input to the first handwriting 2510. For example, as exemplified in FIG. 28, the third handwritings 2810 and 2820 may be input in the horizontal direction and in the vertical direction of the first handwriting 2510.

According to an embodiment, when the third handwritings 2810 and 2820 are input in the horizontal direction and in the vertical direction based on the first handwriting 2510, the magnetic points for the appending target may be determined based on the distance between the magnetic points of the first handwriting 2510 and the magnetic points of the third handwritings 2810 and 2820. For example, the electronic device 101 may determine, one by one, the magnetic points having the closest Euclidean distance between the magnetic points of the first handwriting 2510 and the magnetic points of the third handwritings 2810 and 2820 for the handwritings 2510, 2810, and 2820. According to an embodiment, as exemplified in FIG. 28, the second handwritings 2810 and 2820 may be appended to the closest side in the Euclidean distance in the horizontal direction and in the vertical direction of the first handwriting 2510 based on the Euclidean distance.

Figure 29:
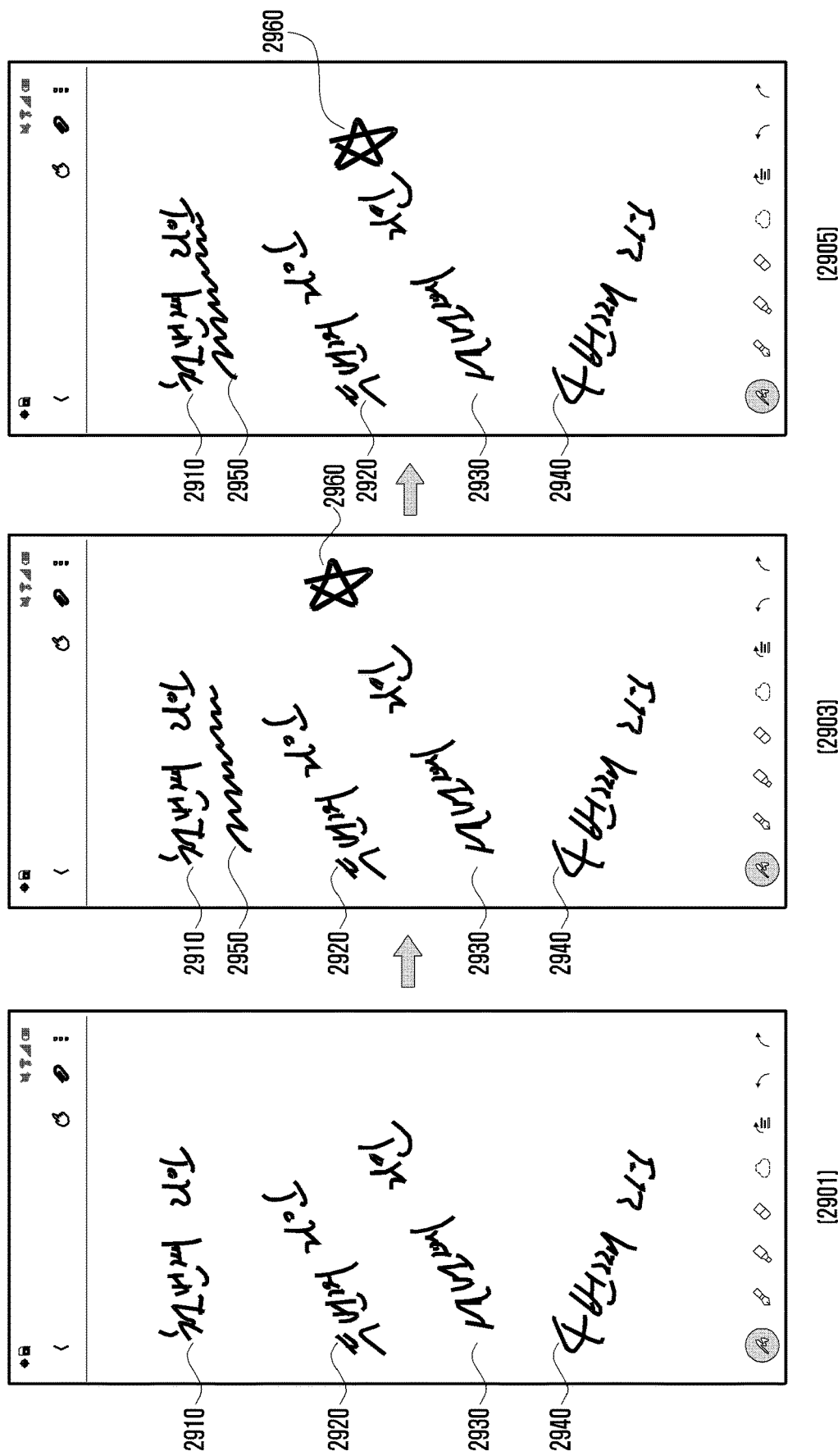
FIGS. 29 to 31 are diagrams explaining an operation example of line correction in an electronic device according to various embodiments.
Figure 30:
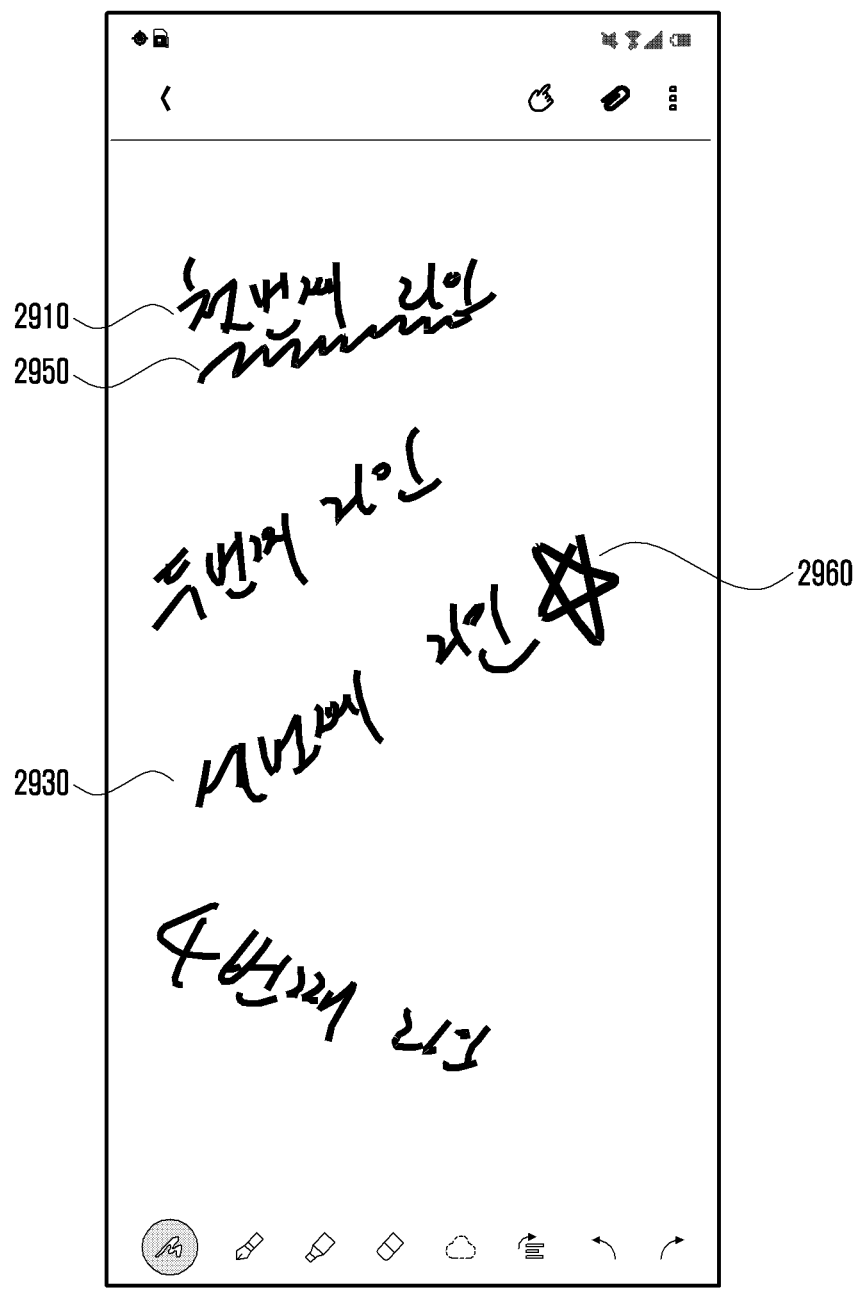
Figure 31:
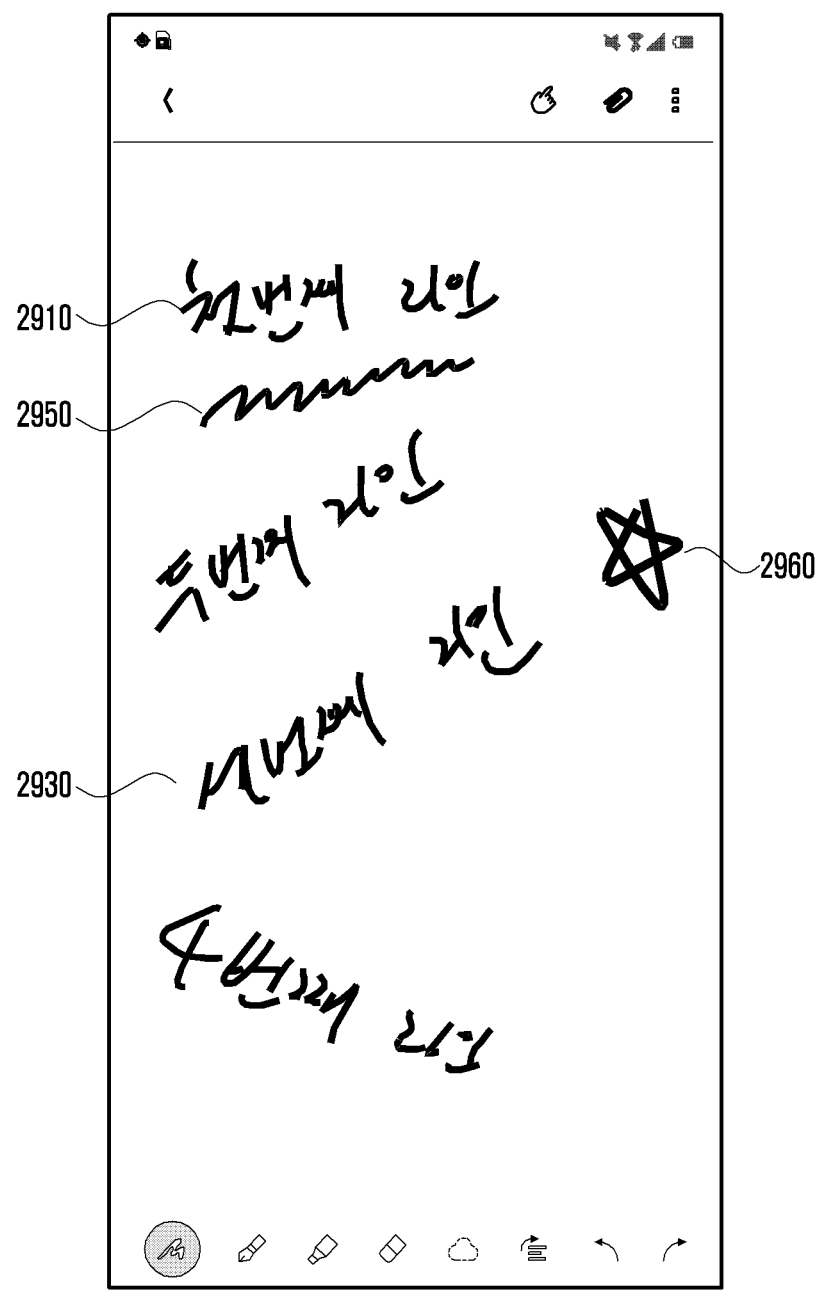

FIGS. 29, 30, and 31 are diagrams explaining an operation example of line correction in an electronic device according to one or more embodiments.

With reference to FIG. 29, as exemplified in an example screen 2901, after the first handwritings 2910, 2920, 2930, and 2940 according to the previous action (e.g., at least one first action), as exemplified in an example screen 2903, the user may input the second handwritings 2950 and 2960 in association with certain lines (e.g., handwriting 2910 of the first line and the handwriting 2930 of the third line among the first handwritings 2910, 2920, and 2930) of the first handwritings 2910, 2020, 2930, and 2940. For example, as exemplified in the example screen 2903, the user may input the second handwriting 2950 corresponding to an "underline" in association with the handwriting 2910 of the first line, and may input the second handwriting 2960 corresponding to an "asterisk" in association with the handwriting 2930 of the third line. According to an embodiment, the user may input the second handwritings 2950 and 2960, and may perform the second action (e.g., alignment command).

According to an embodiment, the electronic device 101 may process line correction (e.g., perform magnetic function) with respect to the second handwritings 2950 and 2960 in response to the second action (e.g., alignment command). For example, as exemplified in an example screen 2905, the electronic device 101 may perform the line correction with respect to the second handwritings 2950 and 2960 in association with the corresponding handwritings 2910 and 2930 among the first handwritings 2910, 2920, 2930, and 2940. For example, the example screen 2905 may represent an example in which the magnetic correction is applied in accordance with the second action, and the second handwritings 2950 and 2960 may move to the closest first handwritings 2910 and 2930 and may be arranged thereon.

According to an embodiment, in the state of the line correction as exemplified in the example screen 2905, the electronic device 101 may perform the handwriting alignment in response to the second action (e.g., alignment command). Examples of the results of alignment performed depending on whether or not to apply the line correction are illustrated in FIGS. 30 and 31. For example, according to one or more embodiments, the line correction (e.g., magnetic function) and the alignment for each line may be applied simultaneously or selectively, and the results as exemplified in FIG. 30 or 31 may be provided depending on whether or not to apply the line correction (e.g., magnetic function).

With reference to FIG. 30, FIG. 30 may represent an example of the result of the alignment for each line in accordance with the application of the line correction. As exemplified in FIG. 30, when the alignment is performed after application of the line correction (e.g., magnetic function) with respect to the second action is completed, the second handwritings 2950 and 2960 may be appended to the corresponding lines (e.g., first line for first handwriting 2910 and the third line for first handwriting 2930) of the first handwritings 2910, 2920, 2930, and 2940, and in accordance with the designation of the target area of interest by the second handwritings 2950 and 2960 of the second action, the second handwritings 2950 and 2960 in the line-corrected state may be aligned and provided together with the first line for first handwriting 2910 and the third line 2930. For example, FIG. 30 may represent a case that the second handwritings 2950 and 2960 are aligned after being arranged and classified more neatly by automatically associating (or including) the second handwritings 2950 and 2960 with the corresponding line.

With reference to FIG. 31, FIG. 31 may represent an example of the result of the alignment for each line in accordance with non-application of the line correction. As exemplified in FIG. 31, when the alignment is performed through non-application of the line correction (e.g., magnetic function) with respect to the second action, the first line for first handwriting 2910 and the third line for first handwriting 2930 may be aligned and provided at the location where the second handwritings 2950 and 2960 are first input without the line correction in accordance with the designation of the target area of interest by the second handwritings 2950 and 2960 of the second action. For example, FIG. 31 may represent a case that the second handwritings 2950 and 2960 are aligned with an omission of the line correction function if the user intends to maintain the input type of the second handwritings 2950 and 2960.

Figure 32:
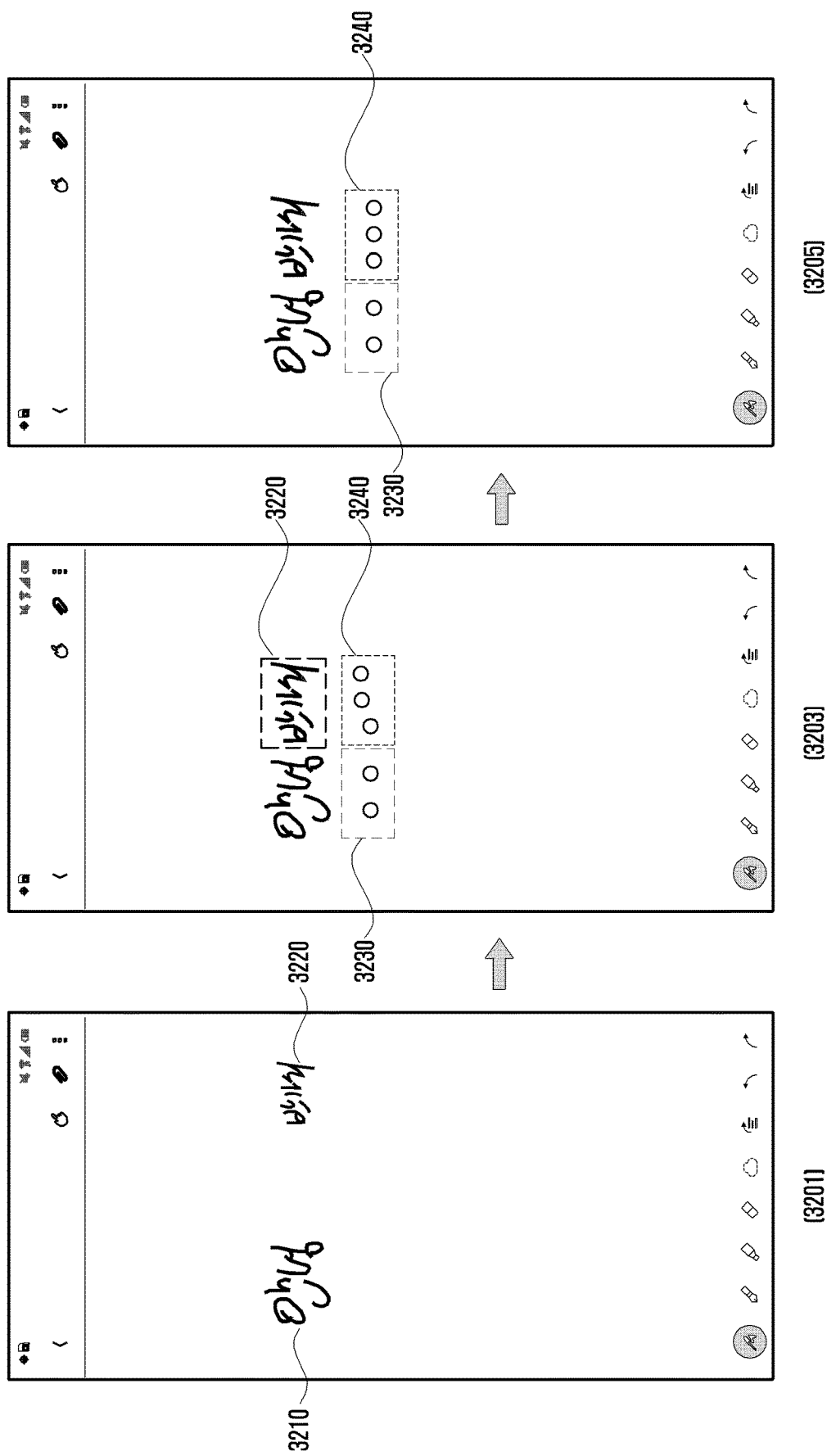
FIG. 32 is a diagram explaining an example of size correction in an electronic device according to various embodiments.

FIG. 32 is a diagram explaining an example of size correction in an electronic device according to one or more embodiments.

According to an embodiment, FIG. 32 may represent an example of providing a size correction with respect to the handwritings for each action unit based on size-based equalization. For example, FIG. 32 may represent an example of performing appending (e.g., line correction) by changing the size of the handwriting input by the recent action based on the size of the handwriting existing in the existing action. According to an embodiment, a rectangular box is illustrated in FIG. 32 for explanation, and may not be displayed on an actual screen.

With reference to FIG. 32, as exemplified in an example screen 3201, the user may input the second handwriting 3220 after the first handwriting 3210 according to the previous action (e.g., first action). According to an embodiment, the user may input the second handwriting 3220, and may perform the second action (e.g., alignment command).

According to an embodiment, when sensing the second action (e.g., alignment command), the electronic device 101 may correct the size of the second handwriting 3220 to a size corresponding (or similar) to the size of the first handwriting 3210 (or object of the line related to the first handwriting 3210) by comparing the size of the first handwriting 3210 of the first action with the size of the second handwriting 3220 of the second action. According to an embodiment, the electronic device 101 may process the line correction in parallel with respect to the size-corrected second handwriting 3220. An example thereof is illustrated in an example screen 3203.

According to an embodiment, as exemplified in the example screen 3203, the second handwriting 3220 may be changed to a size corresponding to the size of the first handwriting 3210, and may move to a location close to the first handwriting 3210 to be provided. According to an embodiment, the size correction and the line correction do not have a temporal relationship with each other, and the line correction after the size correction, the size correction after the line correction, or the size correction and the line correction may be performed in parallel.

According to an embodiment, in the example screen 3203, a third handwriting 3230 and a fourth handwriting 3240 may be illustrated to explain an additional example. For example, when the third handwriting 3230 and the fourth handwriting 3240, in accordance with the line correction and the size correction, are exemplified in the example screen 3205, the fourth handwriting 3240 may be changed to the size corresponding to the size of the third handwriting 3230, and may be provided in line alignment to the third handwriting 3230. Examples thereof will be described with reference to FIGS. 33 to 37.

Figure 33:
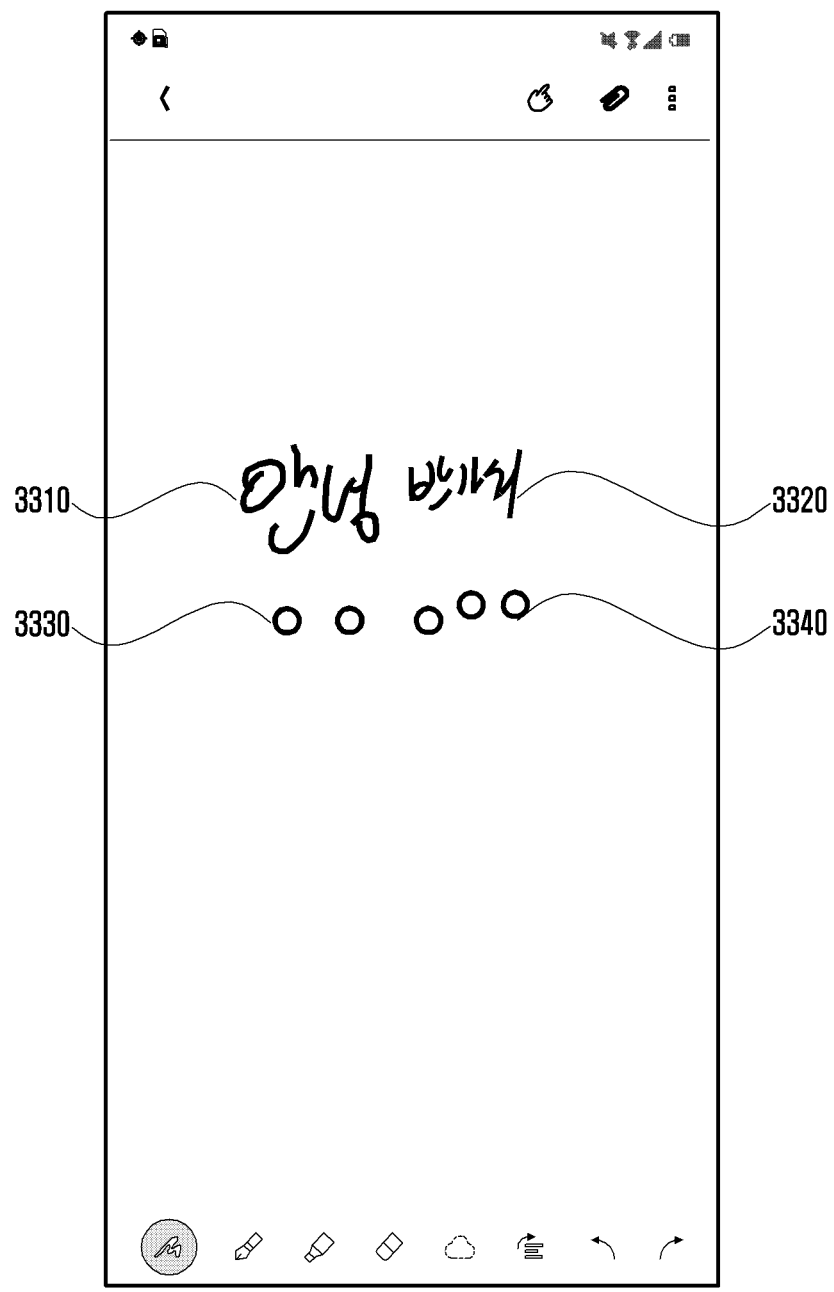
FIGS. 33 and 34 are diagrams explaining an example of size correction in an electronic device according to various embodiments.
Figure 34:
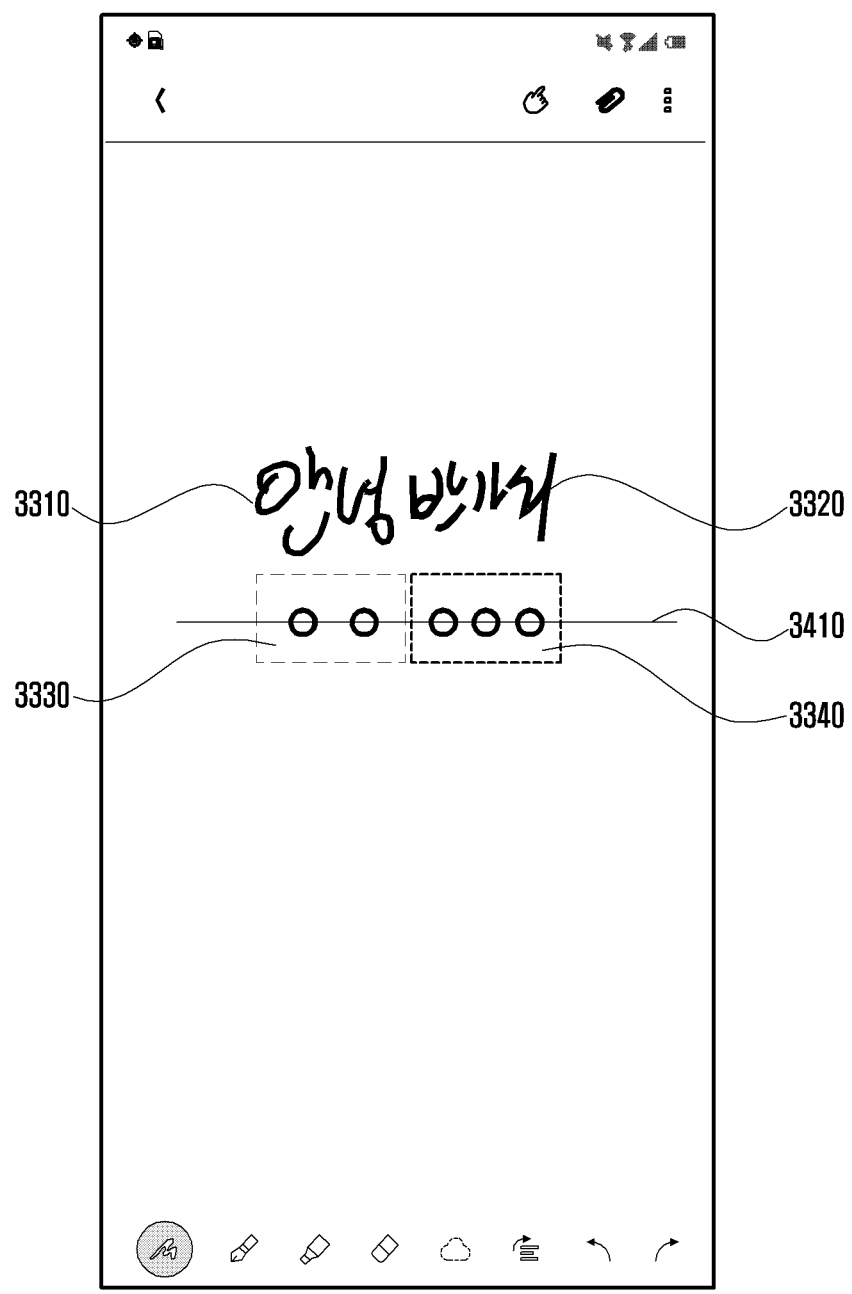

FIGS. 33 and 34 are diagrams explaining an example of size correction in an electronic device according to one or more embodiments.

According to an embodiment, FIG. 33 may represent an example before the size correction is applied with respect to the second handwriting 3320 and the fourth handwriting 3340, and FIG. 34 may represent an example in which the size correction is applied with respect to the second handwriting 3320 and the fourth handwriting 3340 to correspond to the first handwriting 3310 and the third handwriting 3330. According to an embodiment, the size correction of the handwriting may include correction of an average height of the handwriting.

According to an embodiment, the size (e.g., refer to FIG. 33) of the second handwriting 3320 may be changed (e.g., refer to FIG. 34) to be similar to the size of the first handwriting 3310. As another embodiment, the size (e.g., average height) (e.g., refer to FIG. 33) of the fourth handwriting 3340 may be changed (e.g., refer to FIG. 34) to be similar to the size (e.g., average height) of the third handwriting 3330.

According to an embodiment, the electronic device 101 may change the size of the handwriting (e.g., second handwriting 3320 or the fourth handwriting 3340) of the recent action to be similar to the size of the handwriting (e.g., first handwriting 3310 or the third handwriting 3330) of the existing action. For example, the electronic device 101 may change the size of the newly input handwriting to correspond to the average size of the existing input handwriting. According to an embodiment, the electronic device 101 may change the size by using the center of gravity (e.g., center of gravity of DirtyRect) for each handwriting.

With reference to the example of FIGS. 33 and 34, the third handwriting 3330 may be input from the previous action (e.g., third action), and the fourth handwriting 3340 may be input from the recent action (e.g., fourth action). As exemplified in FIG. 33, for the fourth handwriting 3340, a deviation of the center of gravity may exist as compared with the third handwriting 3330.

According to an embodiment, when the deviation of the center of gravity exists between the handwriting (e.g., first handwriting 3310 or the third handwriting 3330) of the previous action and the handwriting (e.g., second handwriting 3320 or the fourth handwriting 3340) of the recent action, as exemplified in FIG. 34, the electronic device 101 may adjust the size of the handwriting of the recent action by rearranging the center of gravity of the handwriting (e.g., second handwriting 3320 or the fourth handwriting 3340 to match the center of gravity 3410 of the handwriting (e.g., first handwriting 3310 or the third handwriting 3330) of the previous action and by equalizing (or averaging) the size thereof. Examples thereof will be described with reference to FIGS. 35 to 37).

Figure 35:
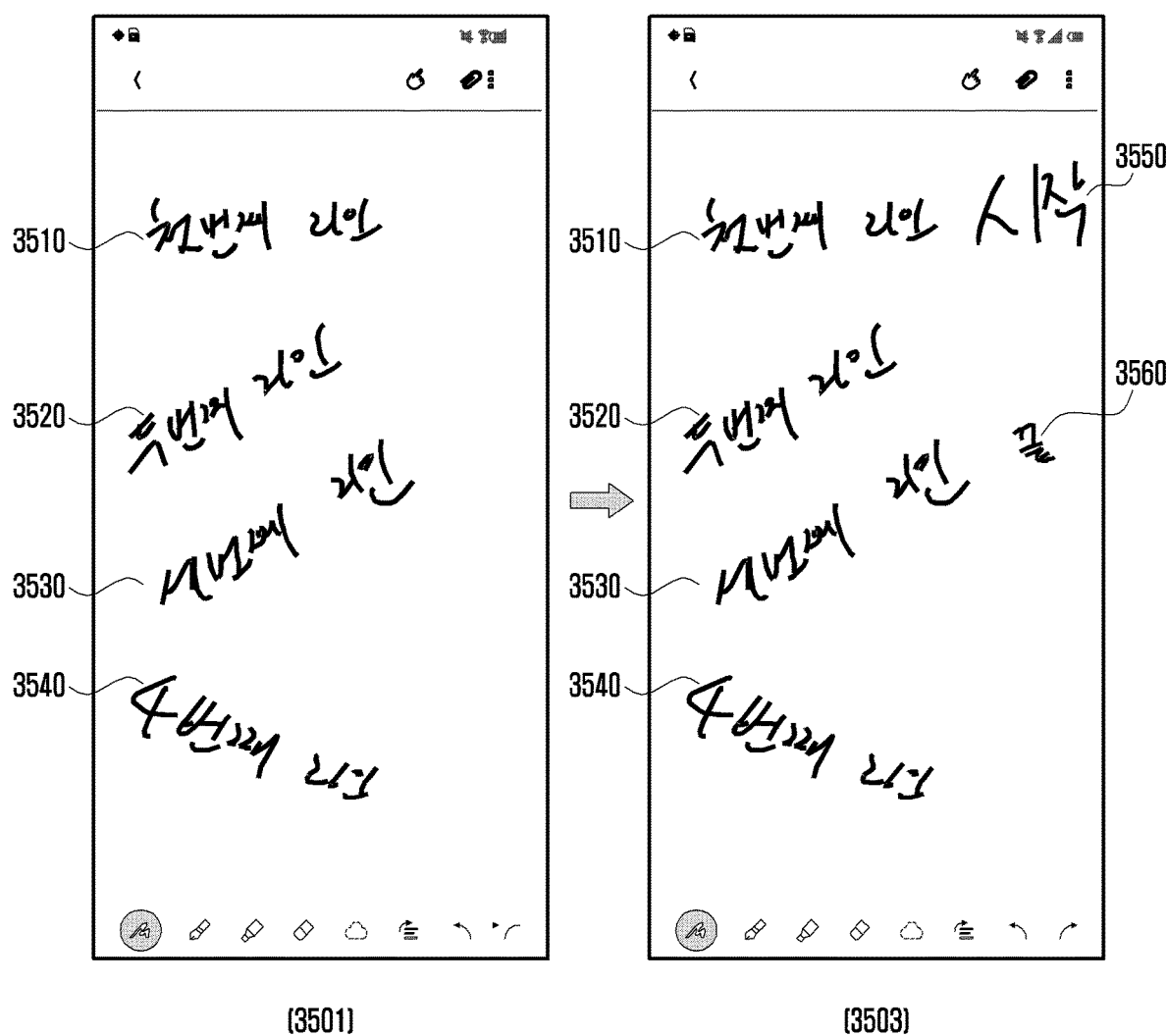
FIGS. 35 to 37 are diagrams explaining an operation example of size correction in an electronic device according to various embodiments.
Figure 36:
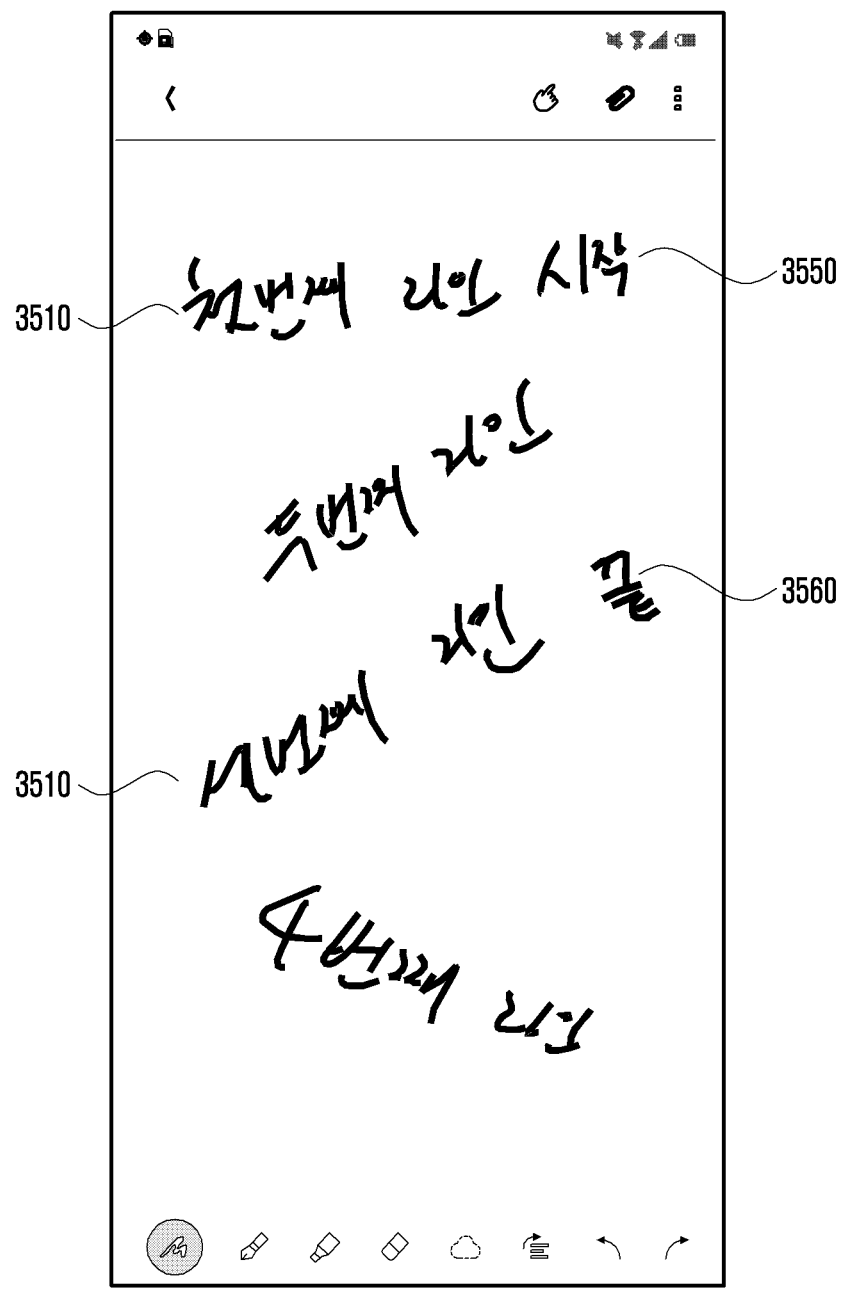
Figure 37:
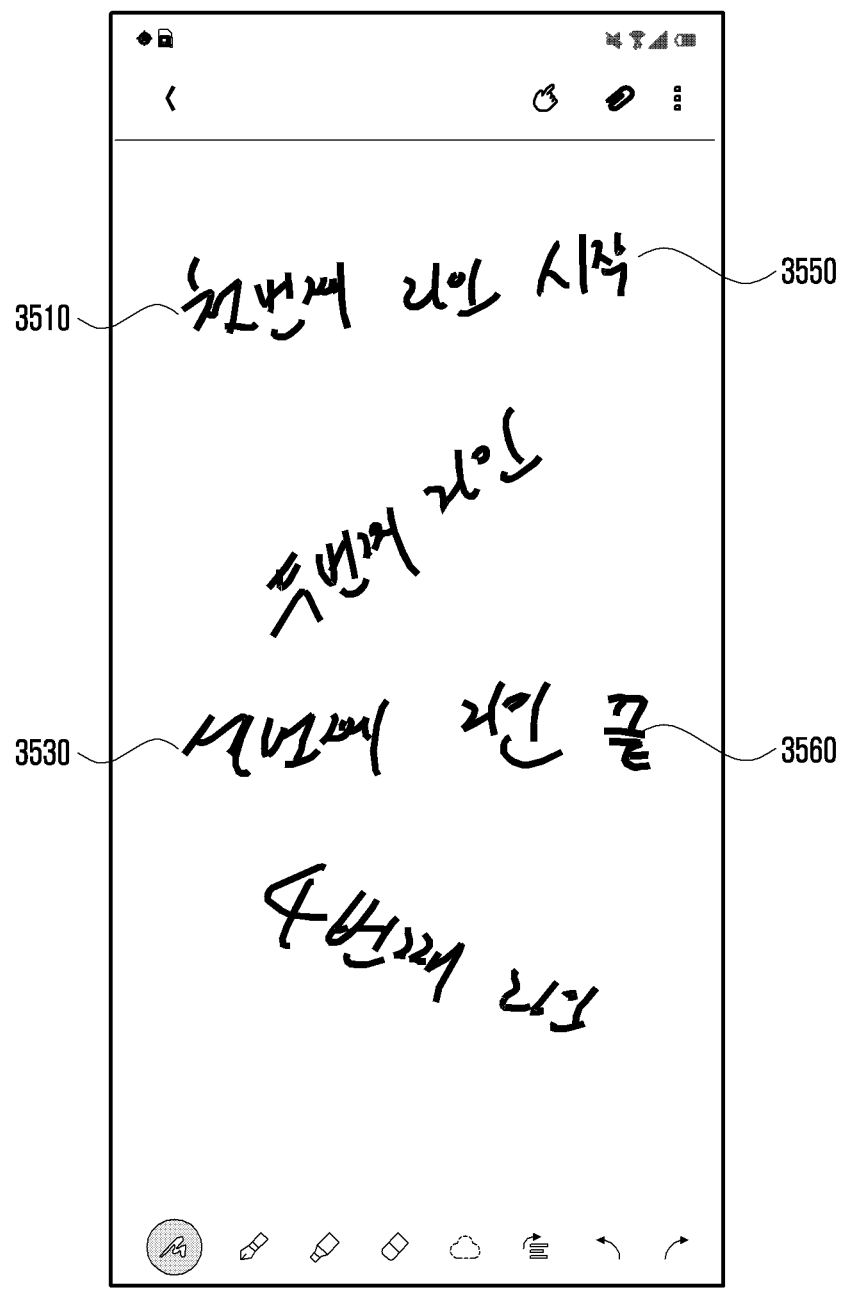

FIGS. 35, 36, and 37 are diagrams explaining an operation example of size correction in an electronic device according to one or more embodiments.

With reference to FIG. 35, as exemplified in an example screen 3501, after the first handwritings 3510, 3520, 3530, and 3540 according to the previous action (e.g., at least one first action), the user may input the second handwritings 3550 and 3560 in association with certain lines (e.g., handwriting 3510 of the first line and the handwriting 3530 of the third line among the first handwritings 3510, 3520, 3530, and 3540) of the first handwritings 3510, 3520, 3530, and 3540 as exemplified in the example screen 3503.

For example, as exemplified in the example screen 3503, the user may input the second handwriting 3550 having a relatively large size in association with the handwriting 3510 of the first line, and may input the second handwriting 3560 having a relatively small size in association with the handwriting 3530 of the third line. According to an embodiment, the user may input the second handwritings 3550 and 3560, and may perform the second action (e.g., alignment command).

According to an embodiment, the electronic device 101 may process size correction (e.g., perform size-based equalization correction) with respect to the second handwritings 3550 and 3560 in response to the second action (e.g., alignment command). For example, the electronic device 101 may simultaneously apply the size-based equalization and alignment for each line. According to an embodiment, examples of the result of applying the size correction (e.g., size-based equalization) and the alignment result performed in accordance with application of the size correction are illustrated in FIGS. 36 and 37.

With reference to FIG. 36, FIG. 36 may represent an example of the result for the electronic device 101 to perform the size correction (e.g., size-based equalization correction) with respect to the second handwritings 3550 and 3560 in response to the second action (e.g., alignment command). As exemplified in FIG. 36, the electronic device 101 may perform the size correction with respect to the second handwritings 3550 and 3560 in association with the corresponding handwritings 3510 and 3530 among the first handwritings 3510, 3520, 3530, and 3540.

For example, FIG. 36 may represent an example in which the size-based equalization is applied in accordance with the second action, and the second handwritings 3550 and 3560 may be adjusted to correspond to the size of the handwritings 3510 and 3530 of the corresponding lines. For example, the electronic device 101 may adjust the size of the handwriting of the recent action to the same size as the surrounding line by adjusting the handwriting of the recent action based on the size of the handwriting of the corresponding line among the handwriting of the previous action.

With reference to FIG. 37, FIG. 37 may represent an example of the result of the alignment for each line in accordance with the application of the size correction. As exemplified in FIG. 37, when the alignment is performed after application of the size correction (e.g., size-based equalization) with respect to the second action is completed, the second handwritings 3550 and 3560 are aligned and provided together with the first line for first handwriting 3510 and the third line for first handwriting 3530 in a state where the size of the second handwritings 3550 and 3560 is corrected in accordance with the designation of the target area of interest by the second handwritings 3550 and 3560. For example, FIG. 37 may represent a case where the second handwritings 3550 and 3560 are aligned after being automatically adjusted to match the size of the corresponding lines.

A method for operating an electronic device 101 according to various embodiments of the disclosure may include: displaying an execution screen of an application supporting a handwriting input; detecting the handwriting input from a user input based on the execution screen; determining at least one area of interest based on at least one object corresponding to the handwriting input; identifying a target object based on the at least one area of interest in response to a user's action; and performing a handwriting alignment based on the target object.

According to one or more embodiments of the disclosure, configuring the area of interest may include: dividing the at least one object corresponding to the handwriting input in the unit of the user's action; and determining the at least one area of interest based on at least one object corresponding to at least one handwriting input related to a recent action wherein the user's action includes a user input related to switching of the application and/or executing a function based on a function object.

According to one or more embodiments of the disclosure, performing the alignment may include aligning the target object related to a user's intention based on the target object of the at least one handwriting input related to the recent action.

According to one or more embodiments of the disclosure, recognizing the target object may include: identifying a first object of the at least one area of interest; identifying a second object related to the first object among objects of handwriting inputs in accordance with a previous action; determining the first object and the second object as the target object; configuring a target area of interest including the first object and the second object; and aligning the first object and the second object together based on the target area of interest.

According to one or more embodiments of the disclosure, aligning may include correcting the first object to correspond to the second object.

According to one or more embodiments of the disclosure, aligning may include: determining whether to perform line correction and/or size correction of the first object based on the second object; correcting at least one of a line and/or a size of the first object based on the result of determination; and aligning the first object and the second object in a state where correction of the first object is applied.

According to one or more embodiments of the disclosure, an operation method performed by the electronic device 101 may include: configuring a first area of interest based on at least one first object corresponding to a first handwriting input and mapping the first object onto a first action; aligning the first object mapped onto the first action based on a first alignment trigger for the first action; configuring a second area of interest based on at least one second object corresponding to a second handwriting input and mapping the second object onto a second action; and aligning the second object mapped onto the second action based on a second alignment trigger for the second action in a state where the first object mapped onto the first action is maintained.

According to one or more embodiments of the disclosure, the first handwriting input and the second handwriting input may be divided in the unit of an action in accordance with the first action and the second action, and at least a part of the first object of the first action, crossing the second object of the second action, may be related to the second object, and may be aligned together with the second object.

According to one or more embodiments of the disclosure, an operation method performed by the electronic device 101 may include: identifying at least one third object related to the second object among the first object; correcting the second object based on the third object; and performing alignment in association with the second object having been corrected and the third object.

Various embodiments of the disclosure that are disclosed in the specification and drawings are merely for easy explanation of the technical contents of the disclosure and proposal of specific examples to help understanding of the disclosure, but are not intended to limit the scope of the disclosure. Accordingly, it should be construed that all changes or modifications derived based on the technical concept of the various embodiments of the disclosure are included in the scope of the disclosure in addition to the embodiments disclosed herein.

What is claimed is:

1. An electronic device comprising:
a display;
memory for storing instructions; and
a processor operatively connected to the display and the memory,
wherein the instructions, when executed by the processor, cause the electronic device to:
display an execution screen of an application that supports a handwriting input,
receive the handwriting input through the display while displaying the execution screen,
display at least one object corresponding to the handwriting input on the execution screen,
configure at least one area of interest based on the at least one object,
detect a user input based on a specified object for executing a handwriting alignment,
determine a recent action from a user's action in response to detecting the user input,
determine a target area of interest corresponding to the recent action from the at least one area of interest,
identify a target object for alignment based on the target area of interest, and
perform the handwriting alignment using a specified alignment method for the target object in a state where at least a part of objects different from the target object is maintained.

2. The electronic device of claim 1, wherein the instructions, further comprising:
dividing the at least one object corresponding to the handwriting input in a unit of the user's action, and
determining the at least one target area of interest based on at least one object corresponding to at least one handwriting input related to the recent action,
wherein the user's action includes a user input related to switching of the application and/or executing a function based on a function object.

3. The electronic device of claim 2, wherein the instructions, further comprising aligning the target object related to a user's intention based on the target object of the at least one handwriting input related to the recent action.

4. The electronic device of claim 2, wherein the instructions, further comprising:
identifying a first object of the at least one area of interest,
identifying a second object related to the first object among objects of handwriting inputs in accordance with a previous action,
determining the first object and the second object as the target object,
configuring a target area of interest including the first object of the at least one area of interest and the second object, and
aligning the first object and the second object together based on the target area of interest.

5. The electronic device of claim 4, wherein the instructions, further comprising correcting the first object to correspond to the second object.

6. The electronic device of claim 5, wherein the instructions, further comprising:
determining whether to perform line correction and/or size correction of the first object based on the second object,
correcting at least one of a line and/or a size of the first object based on a result of determination, and
aligning the first object and the second object in a state where correction of the first object is applied.

7. The electronic device of claim 2, wherein the instructions, further comprising:
configuring a first area of interest related to a first action based on a first object corresponding to a first handwriting input,
performing alignment of the first object related to the first action based on a first alignment trigger for the first action,
configuring a second area of interest related to a second action based on a second object corresponding to a second handwriting input, and
performing alignment of the second object related to the second action based on a second alignment trigger for the second action in a state where at least a part of the first object is maintained.

8. The electronic device of claim 7, wherein the instructions, further comprising:
identifying a third object related to the second object among the first object,
correcting the second object based on the third object, and
performing alignment in association with the second object having been corrected and the third object.

9. The electronic device of claim 2, wherein the instructions, further comprising:
configuring a first area of interest based on a first object corresponding to a first handwriting input and map the first object onto a first action,
aligning the first object mapped onto the first action based on a first alignment trigger for the first action,
configuring a second area of interest based on a second object corresponding to a second handwriting input and map the second object onto a second action, and
aligning the second object mapped onto the second action based on a second alignment trigger for the second action in a state where the first object mapped onto the first action is maintained,
wherein the first handwriting input and the second handwriting input are divided in the unit of an action in accordance with the first action and the second action, and
wherein at least a part of the first object of the first action, crossing the second object of the second action, is related to the second object, and is aligned together with the second object.

10. A method for operating an electronic device comprising:
displaying an execution screen of an application that supports a handwriting input;

receiving the handwriting input through a display while displaying the execution screen;

displaying at least one object corresponding to the handwriting input on the execution screen:

configuring at least one area of interest based on the at least one object;

detecting a user input based on a specified object for executing a handwriting alignment;

determining a recent action from a user's action in response to detecting the user input;

determining a target area of interest corresponding to the recent action from the at least one area of interest;

identifying a target object for alignment based on the target area of interest; and performing the handwriting alignment using a specified alignment method for the target object in a state where at least a part of objects different from the target object is maintained.

11. The method of claim 10, wherein configuring the at least one area of interest comprises:

dividing the at least one object corresponding to the handwriting input in a unit of the user's action; and determining at least one target area of interest based on at least one object corresponding to at least one handwriting input related to the recent action, wherein the user's action includes a user input related to switching of the application and/or executing a function based on a function object.

12. The method of claim 11, wherein performing the handwriting alignment comprises aligning the target object related to a user's intention based on the target object of the at least one handwriting input related to the recent action.

13. The method of claim 11, wherein identifying the target object comprises:

identifying a first object of the at least one area of interest;

identifying a second object related to the first object among objects of handwriting inputs in accordance with a previous action;

determining the first object and the second object as the target object;

configuring a target area of interest including the first object and the second object; and aligning the first object and the second object together based on the target area of interest.

14. The method of claim 13, wherein aligning comprises:

determining whether to perform line correction and/or size correction of the first object based on the second object;

correcting at least one of a line and/or a size of the first object based on a result of determination; and aligning the first object and the second object in a state where correction of the first object is applied.

15. The method of claim 11, comprising:

configuring a first area of interest based on a first object corresponding to a first handwriting input and mapping the first object onto a first action;

aligning the first object mapped onto the first action based on a first alignment trigger for the first action;

configuring a second area of interest based on a second object corresponding to a second handwriting input and mapping the second object onto a second action; and aligning the second object mapped onto the second action based on a second alignment trigger for the second action in a state where the first object mapped onto the first action is maintained, wherein the first handwriting input and the second handwriting input are divided in the unit of an action in accordance with the first action and the second action, and wherein at least a part of the first object of the first action, crossing the second object of the second action, is related to the second object, and is aligned together with the second object.

16. A non-transitory computer-readable medium storing instructions that, when executed by a processor of an electronic device, cause the processor to at least:

display an execution screen of an application that supports a handwriting input, receive the handwriting input through a display while displaying the execution screen, display at least one object corresponding to the handwriting input on the execution screen, configure at least one area of interest based on the at least one object, detect a user input based on a specified object for executing a handwriting alignment, determine a recent action from a user's action in response to detecting the user input, determine a target area of interest corresponding to the recent action from the at least one area of interest, identify a target object for alignment based on the target area of interest, and perform the handwriting alignment using a specified alignment method for the target object in a state where at least a part of objects different from the target object is maintained.

* * * * *